US012581156B2

(12) United States Patent
Hong et al.

(10) Patent No.: US 12,581,156 B2
(45) Date of Patent: Mar. 17, 2026

(54) DISPLAY APPARATUS AND RECORDING METHOD

(71) Applicant: VIDAA (NETHERLANDS) INTERNATIONAL HOLDINGS B.V., Duiven (NL)

(72) Inventors: Xiaoling Hong, Duiven (NL); Xiaobing Li, Duiven (NL); Jing Guo, Duiven (NL); Ziping Luo, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 0 days.

(21) Appl. No.: 18/964,107

(22) Filed: Nov. 29, 2024

(65) Prior Publication Data

US 2025/0097518 A1     Mar. 20, 2025

Related U.S. Application Data

(63) Continuation of application No. PCT/EP2023/086100, filed on Dec. 15, 2023.

(30) Foreign Application Priority Data

| | | |
|---|---|---|
| Feb. 27, 2023 | (CN) | 202310175070.X |
| Jun. 27, 2023 | (CN) | 202310770395.2 |
| Jun. 30, 2023 | (CN) | 202310800315.3 |

(51) Int. Cl.
*H04N 21/433* (2011.01)
*H04N 21/422* (2011.01)
(Continued)

(52) U.S. Cl.
CPC ... *H04N 21/4334* (2013.01); *H04N 21/42225* (2013.01); *H04N 21/44016* (2013.01); *H04N 21/47217* (2013.01)

(58) Field of Classification Search
CPC ......... H04N 21/4334; H04N 21/42225; H04N 21/44016; H04N 21/47217
See application file for complete search history.

(56) References Cited

U.S. PATENT DOCUMENTS 11,134,278 B2 * 9/2021 Lintz .................. H04N 21/8456
2003/0093790 A1   5/2003 Logan et al.
(Continued)

FOREIGN PATENT DOCUMENTS

KR     20070079193 A  *  8/2007  ............. A61H 39/04

OTHER PUBLICATIONS

The World Intellectual Property Organization (WIPO) International Search Report for PCT/EP2023/086100 Mar. 18, 2024 2 Pages.

*Primary Examiner* — Thai Q Tran
*Assistant Examiner* — Jose M Mesa
(74) *Attorney, Agent, or Firm* — ANOVA LAW GROUP, PLLC

(57) ABSTRACT

The disclosure provides a display apparatus and a recording method. The display apparatus can obtain a scheduled recording task queue in response to an instruction for adding a scheduled recording task; query recording time information of one or more adjacent scheduled recording tasks in the scheduled recording task queue, wherein the recording time information comprises recording start time, recording end time, pre-recording time and post-recording time; then set task execution time and/or task completion time of the scheduled recording task according to the recording time information of the one or more adjacent scheduled recording tasks; and finally, execute the scheduled recording task according to the task execution time and/or the task completion time.

20 Claims, 29 Drawing Sheets

(51) Int. Cl.
   *H04N 21/44*     (2011.01)
   *H04N 21/472*    (2011.01)

(56)                References Cited

U.S. PATENT DOCUMENTS

2003/0198462  A1     10/2003  Bumgardner et al.
2006/0168625  A1 *    7/2006  Gildred ................... H04N 5/76
                                                725/58
2015/0052568  A1 *    2/2015  Glennon ........... H04N 21/4147
                                                725/100
2018/0359517  A1 *   12/2018  Hasek ............. H04N 21/47202

* cited by examiner

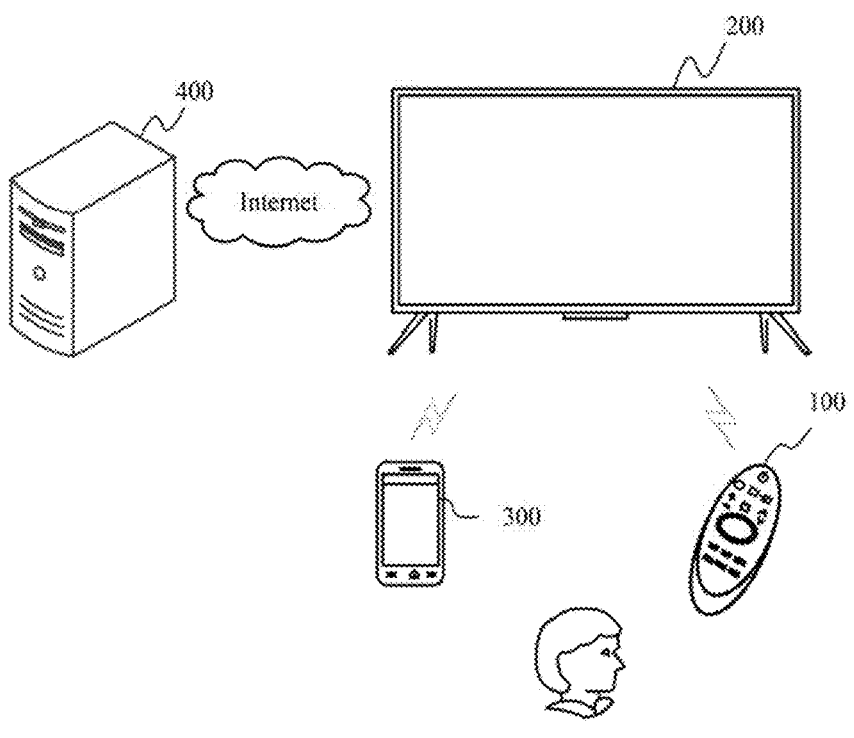

210
tuning demodulator

Controller

260
Display 220
communicating device
WiFi module
Bluetooth module
Wire Ethernet module

RAM

CPU

270

ROM

First interface

Audio output interface
loudspeaker

230
Detector
Sound collector
Image collector

Video processor

Second interface

External speaker output terminal

240
External device interface
HDMI
CVBS
Component
USB

Graphic processor

......

Power supply

Audio processor

Nth interface

Memory

280

User interface

FIG. 2

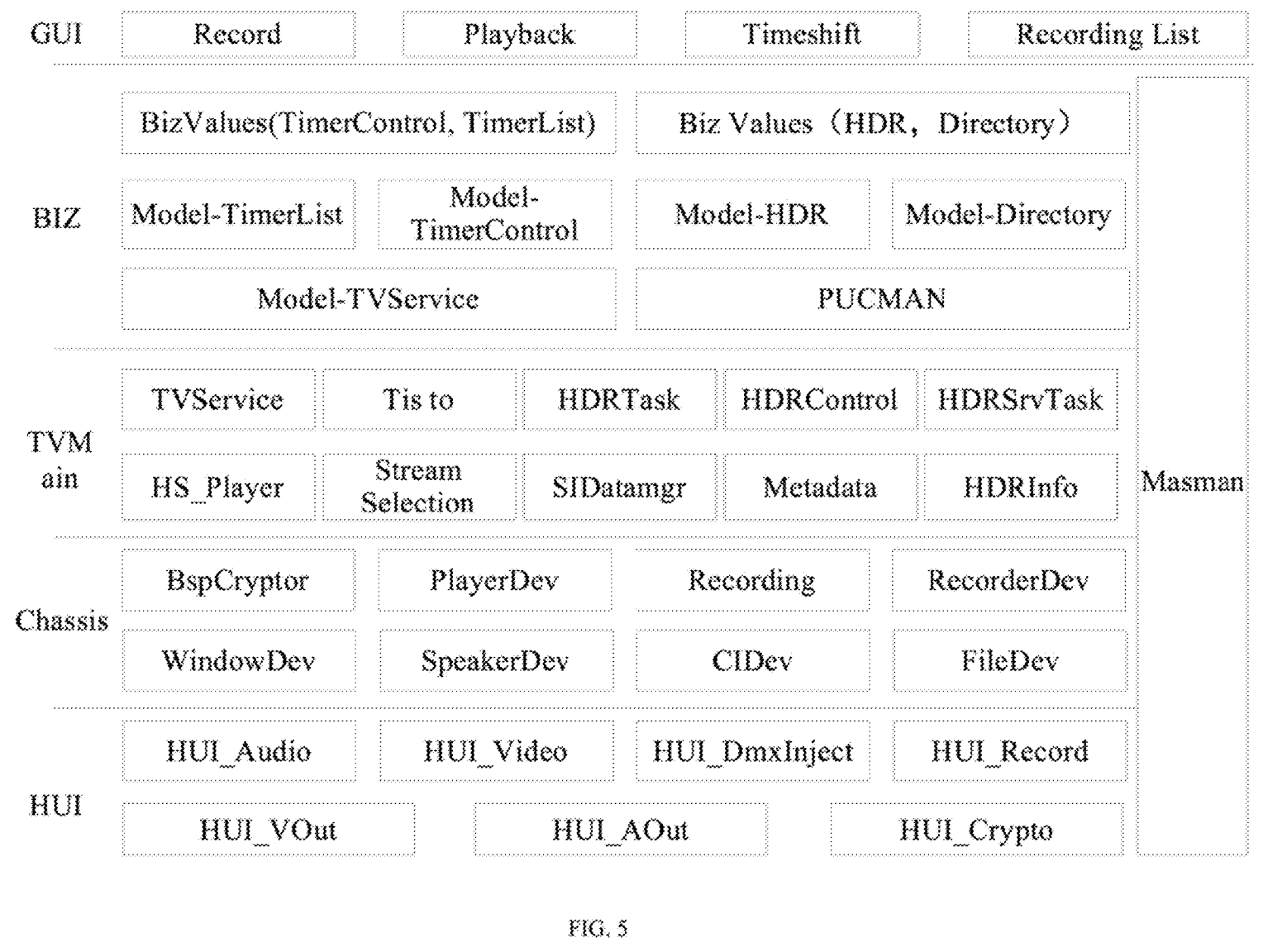

| GUI | Record | Playback | Timeshift | Recording List |
|---|---|---|---|---|
| | BizValues(TimerControl, TimerList) | | Biz Values (HDR, Directory) | |
| BIZ | Model-TimerList | Model-TimerControl | Model-HDR | Model-Directory |
| | Model-TVService | | PUCMAN | |
| TVM ain | TVService | Tis to | HDRTask | HDRControl | HDRSrvTask |
| | HS_Player | Stream Selection | SIDatamgr | Metadata | HDRInfo |
| Chassis | BspCryptor | PlayerDev | Recording | RecorderDev |
| | WindowDev | SpeakerDev | CIDev | FileDev |
| HUI | HUI_Audio | HUI_Video | HUI_DmxInject | HUI_Record |
| | HUI_VOut | HUI_AOut | | HUI_Crypto |

Masman

FIG. 5

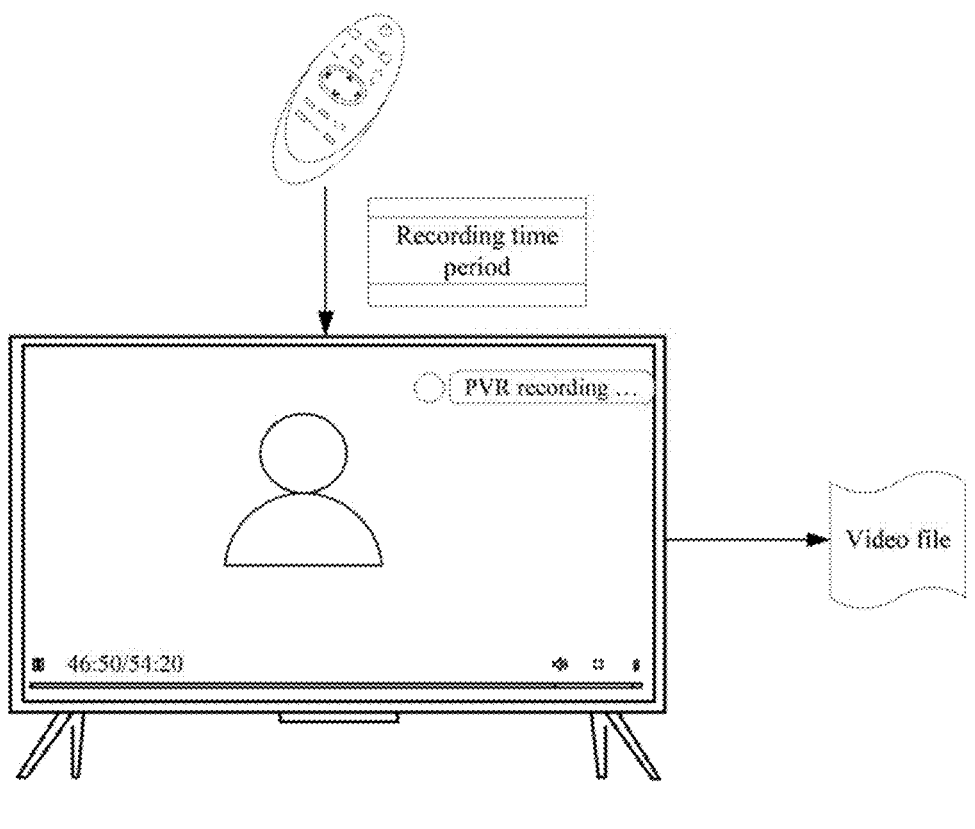
FIG. 6
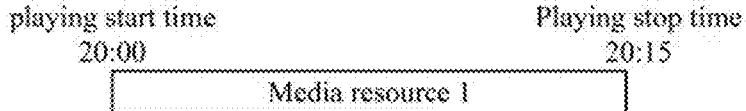
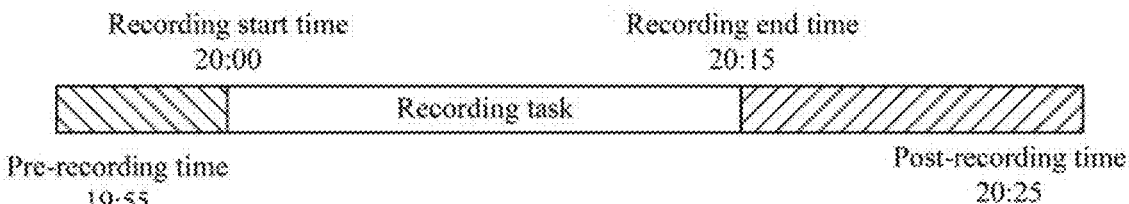
FIG. 7 the scheduled recording added currently conflicts with the
scheduled recording from 20:00 to 20:15. You can ...

Delete the conflicted
scheduled recording

Delete the added scheduled
recording

Modify the time of the
scheduled recording

FIG. 10

There is a conflicted scheduled recording

Start time   20:00     End time     20:15

Pre-time   19:55     Post-time    20:25

Current scheduled recording

Start time   20:10     End time     22:00

Pre-time   20:05     Post-time    22:10

FIG. 11

In a first recording mode, in response to a time point request from a user, inserting a time point in a first video, and displaying the time point on a progress bar — S1701

In response to a cutting command from the user, cutting a video clip from a second video according to a time point group when the second video contains a time point meeting a preset condition — S1702

In response to a splicing command from the user, splicing a third video according to a specified order to obtain a spliced video, and displaying a splicing point on a progress bar of the spliced video — S1703

FIG. 17

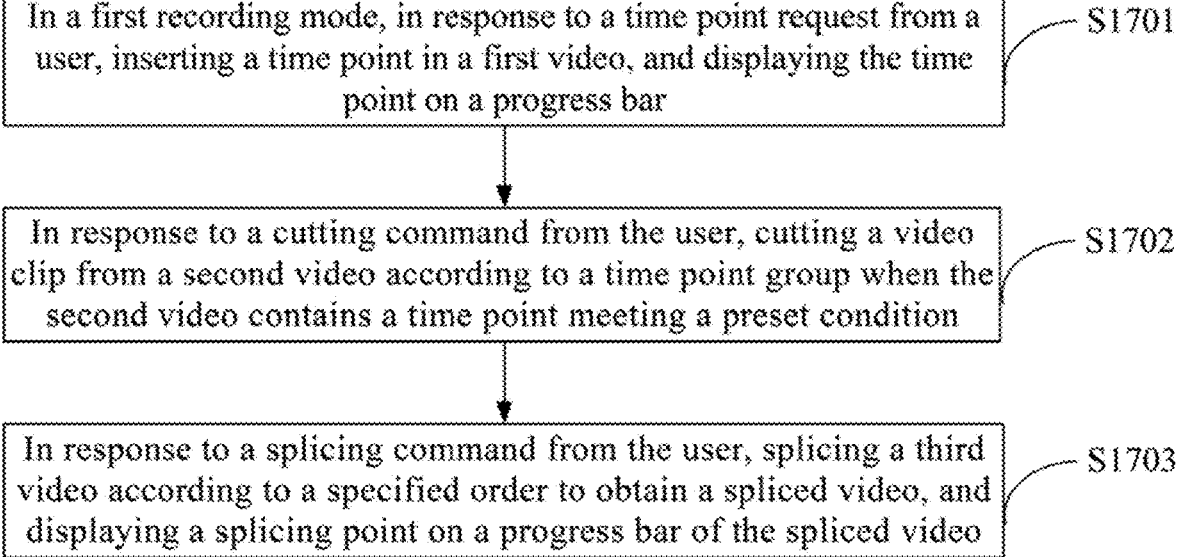

FIG. 18

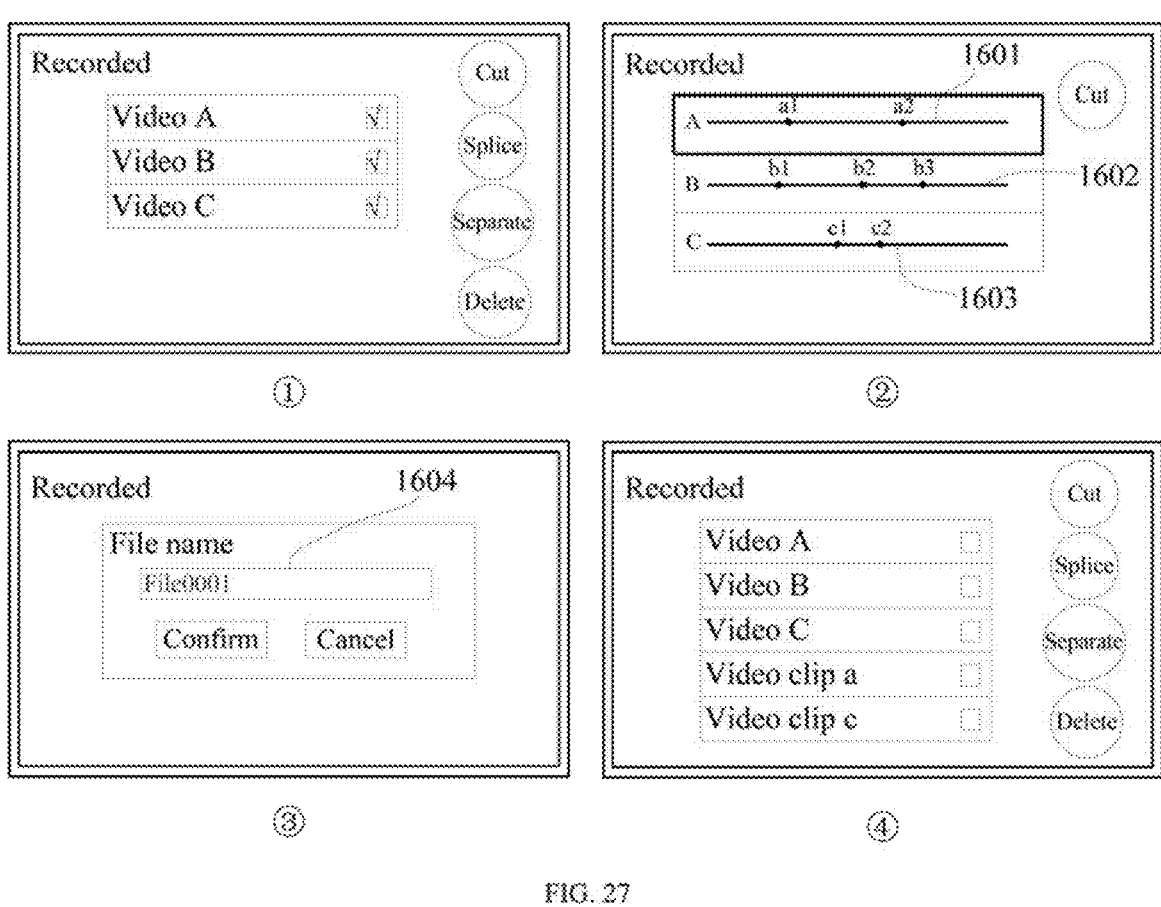

FIG. 27

Determining the number of video clips to be spliced in response to a splicing command — S2801

If the number is determined as a positive integer greater than 1, creating a splicing file — S2802

Copying the video clips to be spliced into the splicing file, and splicing the video clips to be spliced in a specified order — S2803

Deleting the video files after completing the splicing of all the video clips to be spliced — S2804

FIG. 28

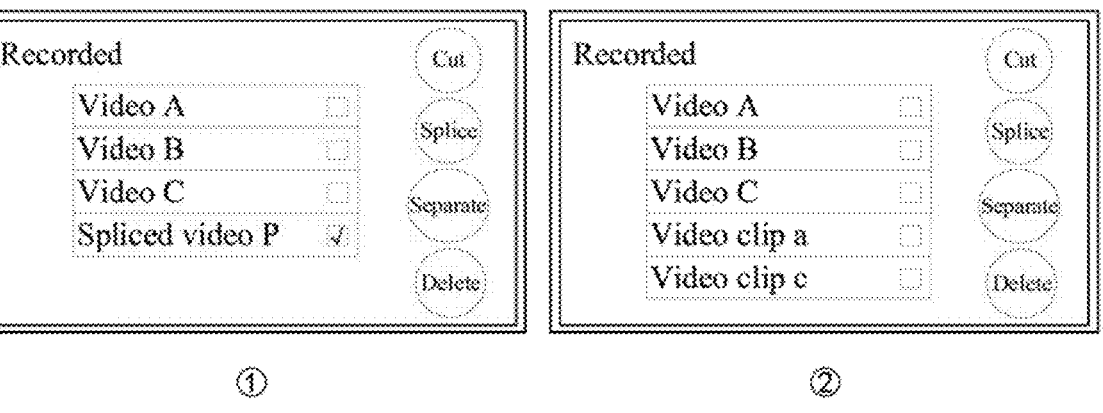

While displaying an interface from a first channel on a display of the display apparatus, in response to a first turning-on operation input from a user, turning on a first time-shift function of the display apparatus and recording the content from the first channel

S3802

In response to a first switching operation input from the user through a communicating device, if a second application supports a background time-shift function, displaying an interface of the second application on the display and recording the content from the first channel based on the first switching operation

If the second application does not support the background time-shift function, determining a time-shift state of the display apparatus before receiving the first switching operation input from the user

S3902

If the display apparatus is in the implicit time-shift state before receiving the first switching operation input from the user, controlling the display to display the interface of the second application, and stopping recording the content from the first channel

S3903

If the display apparatus is in the explicit time-shift state before receiving the first switching operation input from the user, displaying a prompt information for stopping time shift on the display of the display apparatus; and, in response to an operation of confirmation for stopping the time shift input from the user through the prompt information from stopping the time shift, displaying the interface of the second application on the display, and stopping recording the content from the first channel

FIG. 39

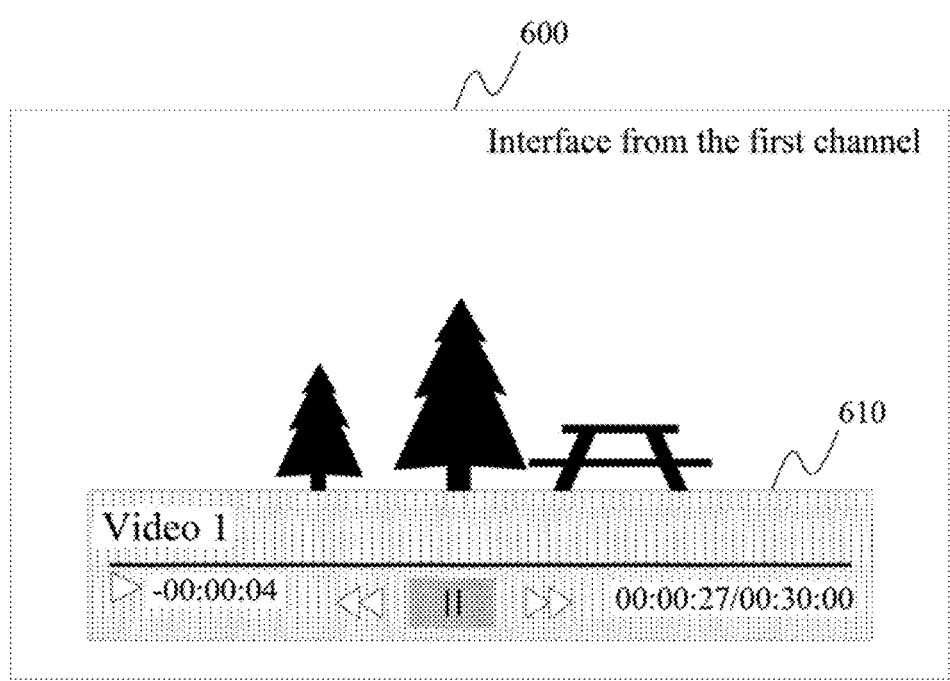

Receiving a first switching operation input from a user when it is determined that a display apparatus is in an explicit time-shift state

S4302

Whether a second application supports a background time-shift function when receiving the first switching operation input from the user?

Yes            No

S4303

Displaying an interface of the second application on the display and recording the content from the first channel based on the first switching operation

S4304

Displaying the prompt information for stopping time shift on the display

S4306

Receiving a second switching operation input from the user through the communicating device

S4305

In response to an operation of confirming to stop time shift input from the user through the prompt information for stopping the time shift, displaying the interface of the second application on the display, and stopping recording the content from the first channel

S4307

Controlling the display to switch back to the interface from the first channel, and recording the content from the first channel

FIG. 43

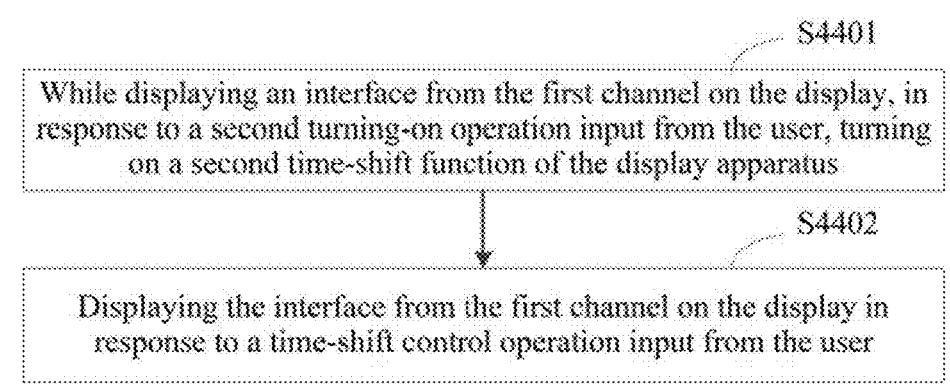

S4401

While displaying an interface from the first channel on the display, in response to a second turning-on operation input from the user, turning on a second time-shift function of the display apparatus

S4402

Displaying the interface from the first channel on the display in response to a time-shift control operation input from the user

FIG. 44

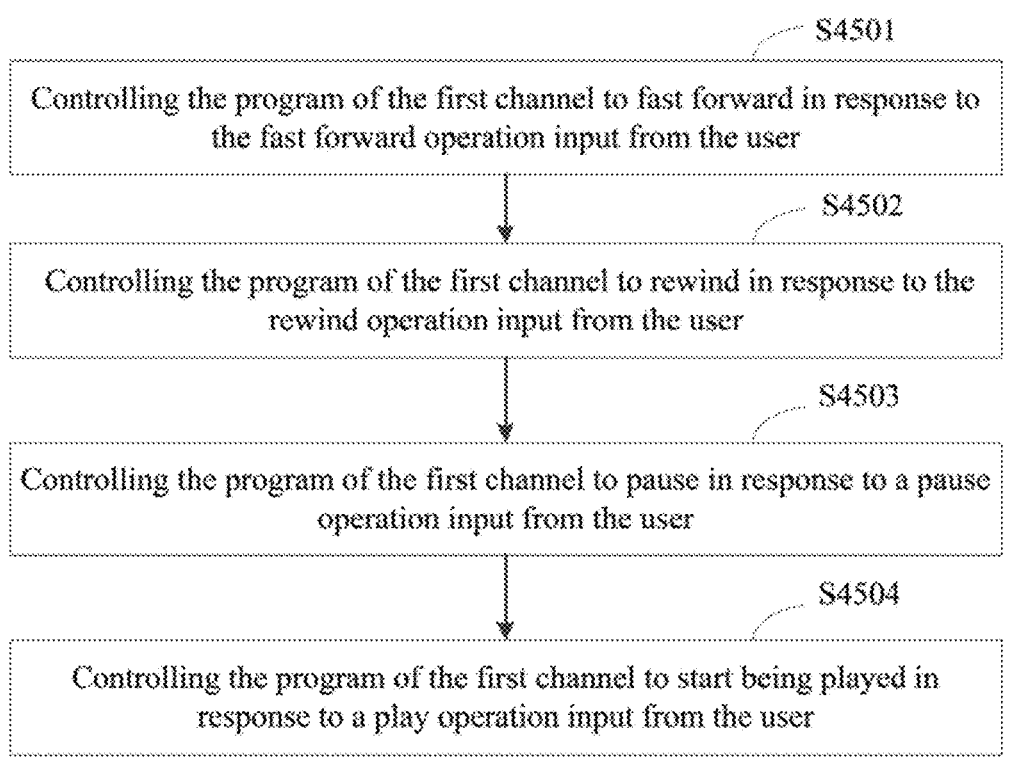

S4501

Controlling the program of the first channel to fast forward in response to the fast forward operation input from the user

S4502

Controlling the program of the first channel to rewind in response to the rewind operation input from the user

S4503

Controlling the program of the first channel to pause in response to a pause operation input from the user

S4504

Controlling the program of the first channel to start being played in response to a play operation input from the user

Displaying the prompt information for stopping the time shift in response to a third switching operation input from the user through the communicating device, where the third switching operation is used to switch the display apparatus from the first channel to a second channel

S4602

Stopping recording content from a first channel in response to an operation of confirming to stop time shift input from the user through the prompt information for stopping the time shift, and switching to an interface from the second channel

FIG. 46

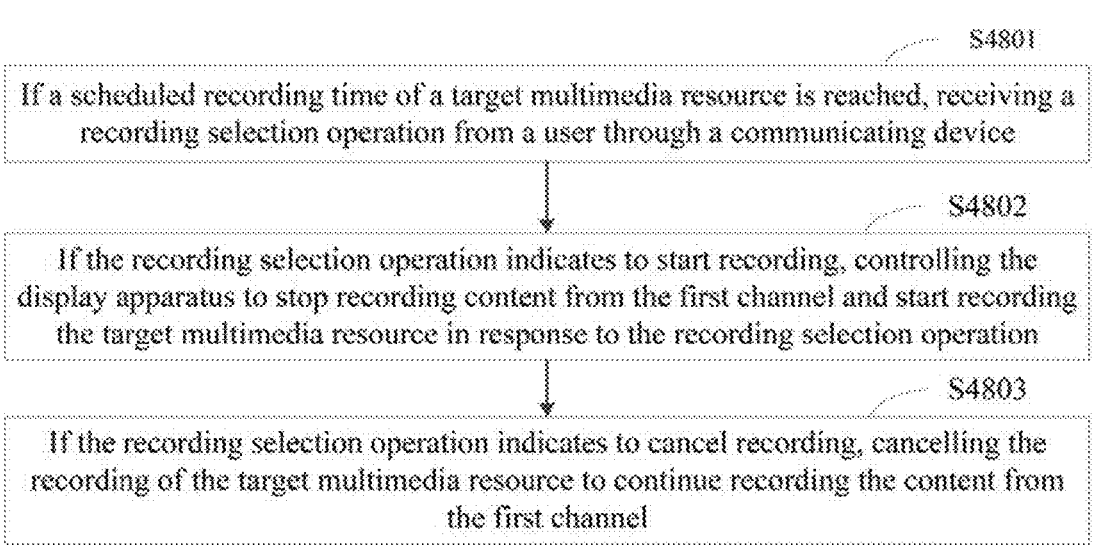

S4801

If a scheduled recording time of a target multimedia resource is reached, receiving a recording selection operation from a user through a communicating device

S4802

If the recording selection operation indicates to start recording, controlling the display apparatus to stop recording content from the first channel and start recording the target multimedia resource in response to the recording selection operation

S4803

If the recording selection operation indicates to cancel recording, cancelling the recording of the target multimedia resource to continue recording the content from the first channel

FIG. 48

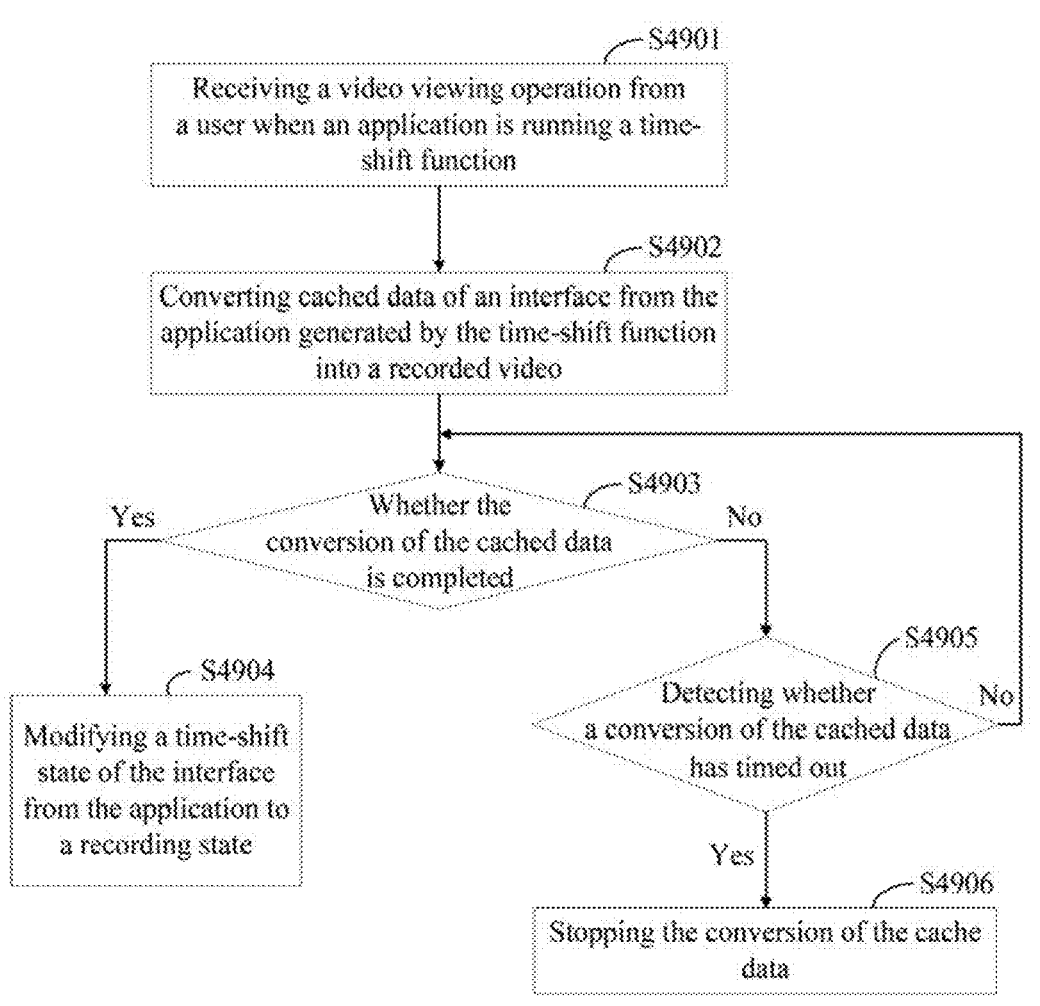

S4901

Receiving a video viewing operation from a user when an application is running a time-shift function

S4902

Converting cached data of an interface from the application generated by the time-shift function into a recorded video

S4903

Whether the conversion of the cached data is completed

Yes

No

S4904

Modifying a time-shift state of the interface from the application to a recording state

S4905

Detecting whether a conversion of the cached data has timed out

No

Yes

S4906

Stopping the conversion of the cache data

FIG. 49

DISPLAY APPARATUS AND RECORDING METHOD

CROSS-REFERENCE TO RELATED APPLICATIONS

The disclosure is a continuation application of International Application No. PCT/EP2023/086100, filed on Dec. 15, 2023, which claims priorities from Chinese Patent Application No. 202310175070.X filed on Feb. 27, 2023, Chinese Patent Application No. 202310770395.2 filed on Jun. 27, 2023, and Chinese Patent Application No. 202310800315.3 filed on Jun. 30, 2023, which are hereby incorporated by reference in their entirety.

TECHNICAL FIELD

The disclosure relates to the technical field of display apparatuses, and particularly to a display apparatus and a recording method.

BACKGROUND

A display apparatus is an intelligent device that can present media resource images and support user interaction. Taking a smart TV as an example, the smart TV is a television that is based on the internet application technology, has an open operating system and chip, has an open application platform, is able to realize the two-way human-computer interaction function, and integrates various functions such as audio and video, entertainment and data; and is used to meet the diversified and personalized demands of users. Some display apparatuses can support the Personal Video Recorder (PVR) function, that is, the video resource management module built in the display apparatus is used to record media resource images in a selected period of time as a video file for users to watch later.

SUMMARY

An embodiment of the disclosure provides a display apparatus, including: a display and at least one processor, where the display is configured to display an image and/or a user interface; and the at least one processor is configured to execute instructions to cause the display apparatus to: obtain a scheduled recording task queue in response to an instruction for adding a scheduled recording task, where the scheduled recording task queue includes at least one scheduled recording task; query recording time information of one or more adjacent scheduled recording tasks in the scheduled recording task queue, where the recording time information includes recording start time, recording end time, pre-recording time and post-recording time; set task execution time and/or task completion time for the scheduled recording task according to the recording time information of the one or more adjacent scheduled recording tasks; and execute the scheduled recording task according to the task execution time and/or task completion time.

In some embodiments, the user interface includes a time point setting page that includes a progress bar of a first video; and after executing the scheduled recording task according to the task execution time and/or the task completion time to obtain a video, the at least one processor is configured to execute the instructions to cause the display apparatus to: in a first recording mode, in response to a time point request from a user, insert a time point in the first video, and display the time point on the progress bar; in response to a cutting command from the user, cut a video clip from a second video according to a time point group when the second video contains a time point meeting a preset condition, where the second video is the first video to be cut, the time point group includes two adjacent time points, and each time point group has no repeated time point; and in response to a splicing command from the user, splice a third video according to a specified order to obtain a spliced video, and display a splicing point on a progress bar of the spliced video, where the third video includes video clips to be spliced, and the video clips to be spliced belong to the same first video or different first videos.

In some embodiments, the user interface includes a video list that includes an option of the first video; and the at least one processor is configured to execute the instructions to cause the display apparatus to: receive a splicing command from the user, where the splicing command indicate the first video to be spliced; and in response to the splicing command, splice the first video to be spliced in a specified order to obtain a spliced video.

In some embodiments, the user interface includes: an interface from the first channel that is a channel corresponding to the scheduled recording task; and the at least one processor is configured to execute the instructions to cause the display apparatus to: display the interface from the first channel on the display, turn on a first time-shift function of the display apparatus and record content from the first channel in response to a first turning-on operation input from a user; and in response to a first switching operation input from the user, if an second application supports a background time-shift function, displaying an interface of the second application on the display and record the content from the first channel based on the first switching operation; where the first switching operation is used to switch from a first application to the second application, and the first application includes the first channel.

BRIEF DESCRIPTION OF THE DRAWINGS

FIG. 1 is a schematic diagram of an operation scenario of a display apparatus according to an embodiment of the disclosure.

FIG. 2 is a block diagram of a hardware configuration of the display apparatus according to an embodiment of the disclosure.

FIG. 5 is a schematic diagram of a system architecture of the display apparatus to implement the PVR function according to an embodiment of the disclosure.

FIG. 6 is a schematic diagram of the media resource recording function according to an embodiment of the disclosure.

FIG. 7 is a schematic diagram of the recording time information according to an embodiment of the disclosure.

FIG. 10 is a schematic diagram of a task adjustment interface according to an embodiment of the disclosure.

FIG. 11 is a schematic diagram of a time modification interface according to an embodiment of the disclosure.

FIG. 17 is a flowchart of recording a program by the display apparatus according to an embodiment of the disclosure.

FIG. 18 is a schematic diagram of the PVR&Timeshift menu according to an embodiment of the disclosure.

FIG. 27 is a schematic diagram of the interface change when the display apparatus cuts a video clip according to an embodiment of the disclosure.

FIG. 28 is a flowchart of splicing video clips in the display apparatus according to an embodiment of the disclosure.

FIG. 37 is a schematic diagram of the interface change when the display apparatus splits a spliced video according to an embodiment of the disclosure.

FIG. 38 is a flowchart of a display control method according to an embodiment of the disclosure.

FIG. 39 is a flowchart of another display control method according to an embodiment of the disclosure.

FIG. 40 is a schematic diagram of a display interface according to an embodiment of the disclosure.

FIG. 43 is a flowchart of yet another display control method according to an embodiment of the disclosure.

FIG. 44 is a flowchart of yet another display control method according to an embodiment of the disclosure.

FIG. 45 is a flowchart of yet another display control method according to an embodiment of the disclosure.

FIG. 46 is a flowchart of yet another display control method according to an embodiment of the disclosure.

FIG. 48 is a flowchart of yet another display control method according to an embodiment of the disclosure.

FIG. 49 is a flowchart of yet another display control method according to an embodiment of the disclosure.

DETAILED DESCRIPTION

Figures 3, 4:
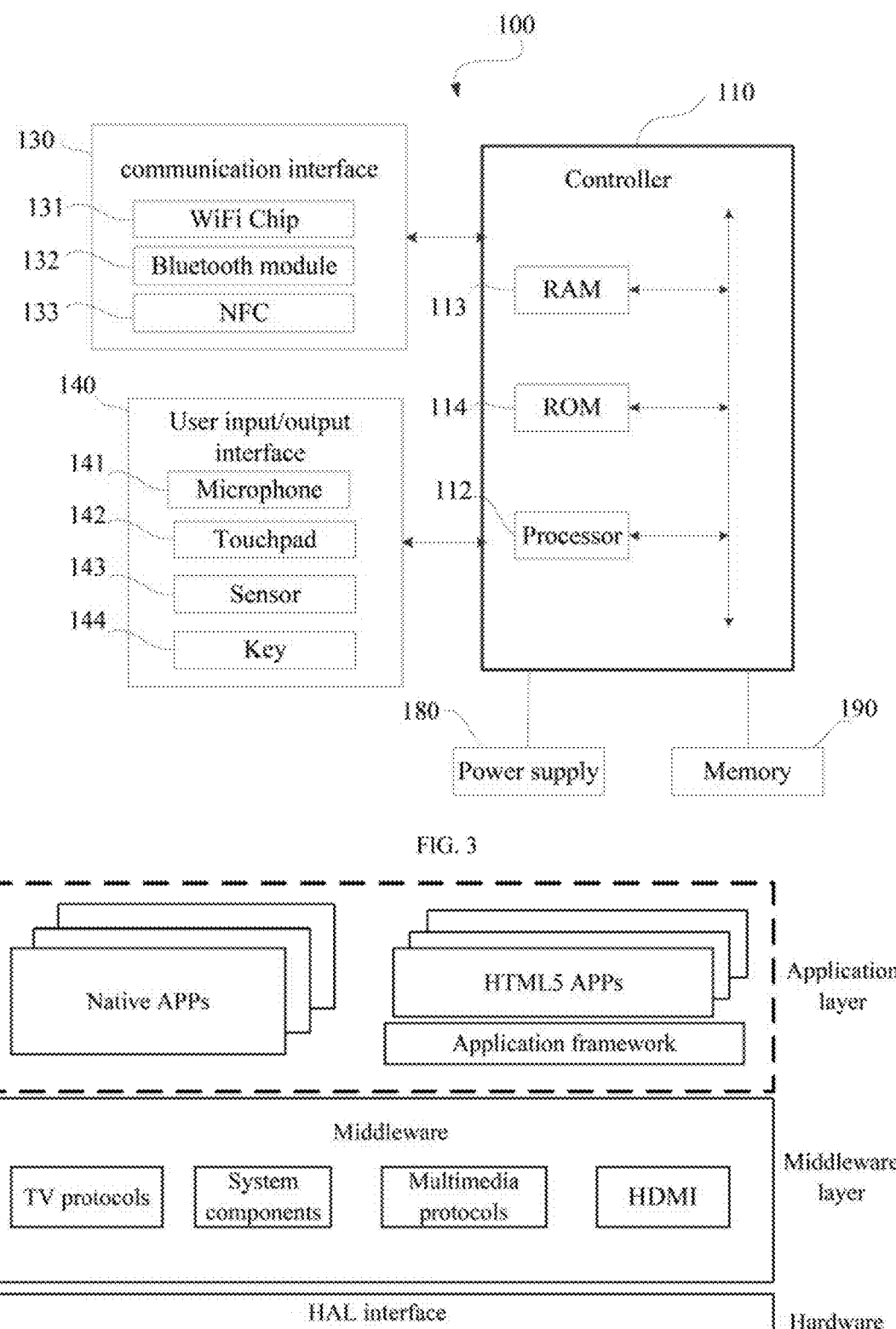
FIG. 3 is a block diagram of a hardware configuration of a control device according to an embodiment of the disclosure.
FIG. 4 is a schematic diagram of a software configuration in the display apparatus according to an embodiment of the disclosure.

In order to make the purposes, implementations and advantages of the embodiments of the disclosure clearer, the embodiments of the disclosure will be clearly and completely described below with reference to specific embodiments of the disclosure and corresponding drawings. Obviously the described embodiments are merely some embodiments of the disclosure but not all the embodiments.

FIG. 1 is a schematic diagram of an operation scenario between a display apparatus and a control device according to an embodiment of the disclosure. As shown in FIG. 1, a user can operate the display apparatus 200 through the mobile terminal 300 and the control device 100.

In some embodiments, the control device 100 may be a remote controller, and the remote controller and the display apparatus 200 may communicate through an infrared protocol or a Bluetooth protocol, or the remote controller may also control the display apparatus 200 in wireless or other wired manners. The user may input a command through a key on the remote controller, a voice input, a control panel input, etc. to control the display apparatus 200. In some embodiments, the user may also use a mobile terminal, a tablet computer, a computer, a laptop and other smart devices to control the display apparatus 200.

In some embodiments, the mobile terminal 300 and the display apparatus 200 may install software applications, and implement the connection and communication through a network communication protocol, achieving the purpose of one-to-one control operation and data communication. The audio and video content displayed on the mobile terminal 300 may also be transmitted to the display apparatus 200 to realize the synchronous display function.

As also shown in FIG. 1, the display apparatus 200 further performs the data communication with a server 400 through various communication methods. The display apparatus 200 may be allowed to perform the communication and connection through a Local Area Network (LAN), a Wireless Local Area Network (WLAN), and other networks. The server 400 may provide various contents and interactions to the display apparatus 200. For example, the display apparatus 200 receives the software program updates or accesses a remotely stored digital media library by sending and receiving messages, and interacting with an Electrical Program Guide (EPG).

The display apparatus 200 may be a liquid crystal display, an Organic Light-Emitting Diode (OLED) display, a projection display apparatus, a smart terminal, such as a mobile phone, a tablet computer, a smart TV, a laser projection device, an electronic table, etc.

In addition to the broadcast receiving TV function, the display apparatus 200 may additionally provide the smart network TV function that a computer supports, including but not limited to, an internet television, a smart TV, an Internet Protocol TV (IPTV), etc.

FIG. 2 is a block diagram of a hardware configuration of the display apparatus 200 in FIG. 1 according to an embodiment of the disclosure.

In some embodiments, the display apparatus 200 includes at least one of a tuning demodulator 210, a communicating device 220, a detector 230, an external device interface 240, a controller 250, a display 260, an audio output interface 270, a memory, a power supply, and a user interface.

The tuning demodulator 210 may receive the broadcast television signals by a wired or wireless receiving method, and demodulate audio and video signals, such as EPG data signals, from a plurality of wireless or wired broadcast television signals.

In some embodiments, the frequency demodulated by the tuning demodulator 210 is controlled by the controller 250, and the controller 250 may send a control signal according to the user's selection, so that the tuning demodulator responds to the frequency of a television signal selected by the user and modulates/demodulates the television signal carried by the frequency.

In some embodiments, the detector 230 is configured to collect signals of an external environment or signals for interaction with outside. For example, the detector 230 includes a light receiver, which is a sensor for collecting the intensity of the ambient light; or the detector 230 includes an image collector, such as a camera, which may be used to collect external environment scenes, attributes of the user or interaction gestures of the user; or the detector 230 includes a sound collector, such as a microphone, which is used to receive external sounds.

In some embodiments, the display 260 includes: a display panel component for presenting an image, a driver component for driving the image display, a component for receiving an image signal output from the controller to display the video content and image content as well as a menu control interface, and a user control UI interface, etc.

In some embodiments, the communicating device 220 is a component for communicating with an external device or the server 400 according to various types of communication protocols. For example, the communicating device may include at least one of a Wifi chip, a Bluetooth communication protocol chip, a wired Ethernet communication protocol chip, other network communication protocol chip or near-field communication protocol chip, and an infrared receiver.

In some embodiments, the external device interface 240 may include, but is not limited to, any one or more of a High Definition Multimedia Interface (HDMI), an analog or data high-definition component input interface, a composite video input interface, a Universal Serial Bus (USB) input interface, an RGB port, etc.; or may be a composite input/output interface formed by multiple of the above-mentioned interfaces.

In some embodiments, the controller 250 includes a central processing unit (CPU), a video processor, an audio processor, a graphic processor, an RAM, an ROM, and first to nth interfaces for input/output. The controller 250 controls the operations of the display apparatus and responds to the user's operations through various software control programs stored in the memory. The controller 250 controls the overall operation of the display apparatus 200.

In some embodiments, the video processor may be configured to receive an external video signal, and perform decompression, decoding, scaling, noise reduction, frame rate conversion, resolution conversion, transparency setting, image synthesis and other video processing according to the standard codec protocol of the input signal, to obtain a signal that can be displayed or played directly on the display apparatus 200.

In some embodiments, the graphics processor may be used to generate various graphics objects, such as icons, operation menus, display graphics of user input instructions, etc. In some embodiments, the graphics processor may be integrated with or arranged separately from the video processor.

In some embodiments, the controller 250 and the tuning demodulator 210 may be located in different separate devices, that is, the tuning demodulator 210 may also be located in an external device (such as an external set-top box, etc.) of the main device where the controller 250 is located.

In some embodiments, the user may input a user command on the Graphical User Interface (GUI) displayed on the display 260, and the user input interface receives a command input from the user through the Graphical User Interface (GUI).

In some embodiments, the user interface 280 may be an interface for receiving a control input.

FIG. 3 is a block diagram of a hardware configuration of the control device in FIG. 1 according to an embodiment of the disclosure. As shown in FIG. 3, the control device 100 includes a controller 110, a communication interface 130, a user input/output interface, a memory, and a power supply.

The control device 100 is configured to control the display apparatus 200, receive operation commands input from the user, and convert the operation commands into instructions that can be recognized and responded by the display apparatus 200, playing an intermediary role between the user and the display apparatus 200.

In some embodiments, the control device 100 may be a smart device. For example, the control device 100 may install various applications for controlling the display apparatus 200 according to the user requirement.

In some embodiments, as shown in FIG. 1, the mobile terminal 300 or another smart electronic device may perform the function similar to the control device 100 after installing an application that manipulates the display apparatus 200.

The controller 110 includes at least one processor 112, an RAM 113, an ROM 114, a communication interface 130 and a communication bus. The controller 110 is used to control the running and operations of the control device 100, and the communication cooperation among internal components as well as data processing functions of the external and internal.

The communication interface 130 realizes the communications of control signals and data signals with the display apparatus 200 under the control of the controller 110. The communication interface 130 may include at least one of a WiFi chip 131, a Bluetooth module 132, an NFC module 133 and other near field communication modules, and the communication interface 130 and can encode the command input from the user through the WiFi protocol or Bluetooth protocol or NFC protocol and send it to the display apparatus 200.

In the user input/output interface 140, the input interface includes at least one of a microphone 141, a touch panel 142, a sensor 143, a key 144 and other input interfaces.

The memory 190 is configured to store various operating instructions, data and applications that are used to drive and control the control device 100 under the control of the controller. The memory 190 may store various kinds of commands input from the user.

The power supply 180 is configured to provide operating power support for all the elements of the control device 100 under the control of the controller.

FIG. 4 is a schematic diagram of the software configuration in the display apparatus in FIG. 1 according to an embodiment of the disclosure. In some embodiments, the system of the display apparatus 200 may be divided into three layers, which are an application layer, a middleware layer and a hardware layer respectively from top to bottom.

The application layer mainly includes common applications on TV and Application Framework, where the common applications are mainly applications developed based on Browser, such as: HTML5 APPs; and native applications (Native APPs).

The Application Framework is a complete program model, with all the basic functions required by the standard application software, such as file access, data exchange, etc., and the use interfaces (toolbar, status bar, menu, dialog) of these functions.

The Native APPs can support online or offline, message push or local resource access.

The middleware layer includes middleware such as various TV protocols, multimedia protocols and system components. The middleware can use the basic services (functions) provided by the system software to connect various parts of the application system or different applications on the network, to achieve the purpose of resource sharing and function sharing.

The hardware layer mainly includes an HAL interface, hardware and a driver, where the HAL interface is a unified interface for all TV chips, and the specific logic is implemented by the chips. The drivers mainly include: an audio driver, a display driver, a Bluetooth driver, a camera driver, a WIFI driver, an USB driver, an HDMI driver, a sensor driver (such as fingerprint sensor, temperature sensor, pressure sensor, etc.), and a power driver, etc.

In some embodiments, the display apparatus 200 may implement the PVR function based on the system architecture as shown in FIG. 5. The system architecture includes: GUI, BIZ, main process (TVMain), plug-in (Chassis), HUI and Masman.

The GUI includes: Record module, Playback module, Timeshift module, and Recording List module.

The BIZ includes: Biz Values (TimerControl, TimerList) module, Biz Values (High Dynamic Rendering (HDR), Directory) module, clock list model (Model-TimerList), clock control model (Model-TimerControl), Model-HDR, Model-Directory, Model-TVService, and Package Manager (PUCMAN).

The TVMain includes: display service (TVService), a backup (Tis to) module, an HDR task, an HDR control, an HDR port (Srv) task, an HS_Player, a stream selection, SIDatamgr, Metadata, and HDR Parameters (Info).

The Chassis includes: a board-level support package (BspCryptor), a player device (PlayerDev), Recording, a video recorder (RecorderDev), a video window (WindowDev), voice (SpeakerDev), continuous integration (CIDev), and file (FileDev).

The HUI includes: an audio (HUI_Audio), a video (HUI_Video), demultiplexing (HUI_DmxInject), recording (HUI_Record), video output (HUI_VOut), audio output (HUI_AOut), and encryption (HUI_Crypto).

Here, the Record module, the Biz Values (HDR, Directory) module, the Model-HDR, the HDRTask, the HDRControl and the RecorderDev are modules mainly involved in the embodiments of the disclosure.

The Playback module, the Timeshift module, the Recording List module, the BizValues (TimerControl, TimerList) module, the Model-TimerControl, the Model-TimerList, Model-Directory, the HDRSrvTask, SIDatamgr, the Metadata, the HDRInfo, the Recording, the HUI_DmxInject and the HUI_Record are PVR internal modules.

The Model-TVService, the PUCMAN, the TVService, the Tis to, the HS_Player, the Stream Selection, the BspCryptor, the PlayerDev, the WindowDev, the SpeakerDev, the CIDev, the FileDev, the HUI_Audio, the HUI_Video, the HUI_VOut, the HUI_AOut and the HUI_Crypto are PVR related modules.

In some embodiments, the application layer of the display apparatus 200 includes at least one application, such as a live TV application, a video-on-demand application, a media center application, an application center, etc. Different applications are used to implement different functions. By running different applications in the display apparatus 200, different applications can be executed to achieve different functions. For example, a corresponding played image can be displayed on the display apparatus 200 through the above-mentioned live TV application or video-on-demand application.

In some embodiments, the live TV application can provide live TV and broadcast TV through different signal sources. For example, the live TV application may use the inputs from a cable television, a wireless broadcast, a satellite service, or other types of live TV services to provide television signals, and the live TV application may display a media resource image from a live TV signal on the display apparatus 200.

In some embodiments, the video-on-demand application may provide videos from different storage sources. Unlike the live TV application, the video-on-demand application provides the media resource data from certain storage sources. For example, the video that is on-demand may come from the server side of cloud storage, or from a local hard disk storage containing the stored video programs, etc.

Based on the above-mentioned applications, the display apparatus 200 can present a media resource image from an application by running the application. In order to adapt to different requirements of the user, the display apparatus 200 may support a recording function of media resource images in some embodiments. The recording function may also be implemented based on the built-in system application and the installed third-party application of the display apparatus 200. That is, as shown in FIG. 6, a user can control the display apparatus 200 to start and run the PVR application, and set a time period to be recorded in the interface of the PVR application. Then the display apparatus 200 can run the PVR application to record the images displayed and the sounds played during the period within the set time period, to generate a video file and save the video file in the local storage.

A specific media resource item may be broadcast in a specific time period according to a specific broadcast plan. During this time period, the display apparatus 200 can present a media resource image from the media resource item by running the relevant application. Meanwhile, if an application for recording is running, the media resource images during this time period may be recorded to generate a recording video according to the media resource images. Therefore, a media resource item may include corresponding playing start time and stop time, and when mapped to the recording process, one recording task may include recording start time and recording end time. Moreover, when the user sets the pre-start and delayed end functions, one recording task also includes pre-recording time and post-recording time.

In some embodiments, the recording start time, the recording end time, the pre-recording time and the post-recording time corresponding to the recording task may be collectively referred to as recording time information. It should be noted that the recording time information described in the embodiments of the disclosure is used to represent a specific time point. Obviously, in chronological order, the above time points can be arranged as follows: "pre-recording time" earlier than "recording start time" earlier than "recording end time" earlier than "post-recording time". The recording time information can also have a specific calculation relationship, that is, the user can uniformly set an advance duration and a delay duration of the recording task. Then, when the recording start time and the recording end time of the recording task are the playing start time and the playing stop time of the media resource item, respectively, the pre-recording time is equal to the recording start time minus the advance duration; while the post-recording time is equal to the recording end time plus the delay duration. For example, as shown in FIG. 7, the playing start time of the media resource 1 is 20:00, the playing stop time is 20:15, the advance duration set by the user is 5 minutes, and the delay duration set by the user is 10 minutes. Then, the recording start time is 20:00; the recording end time is 20:15; the pre-recording time is 19:55; and the post-recording time is 20:25.

Figures 8, 9:
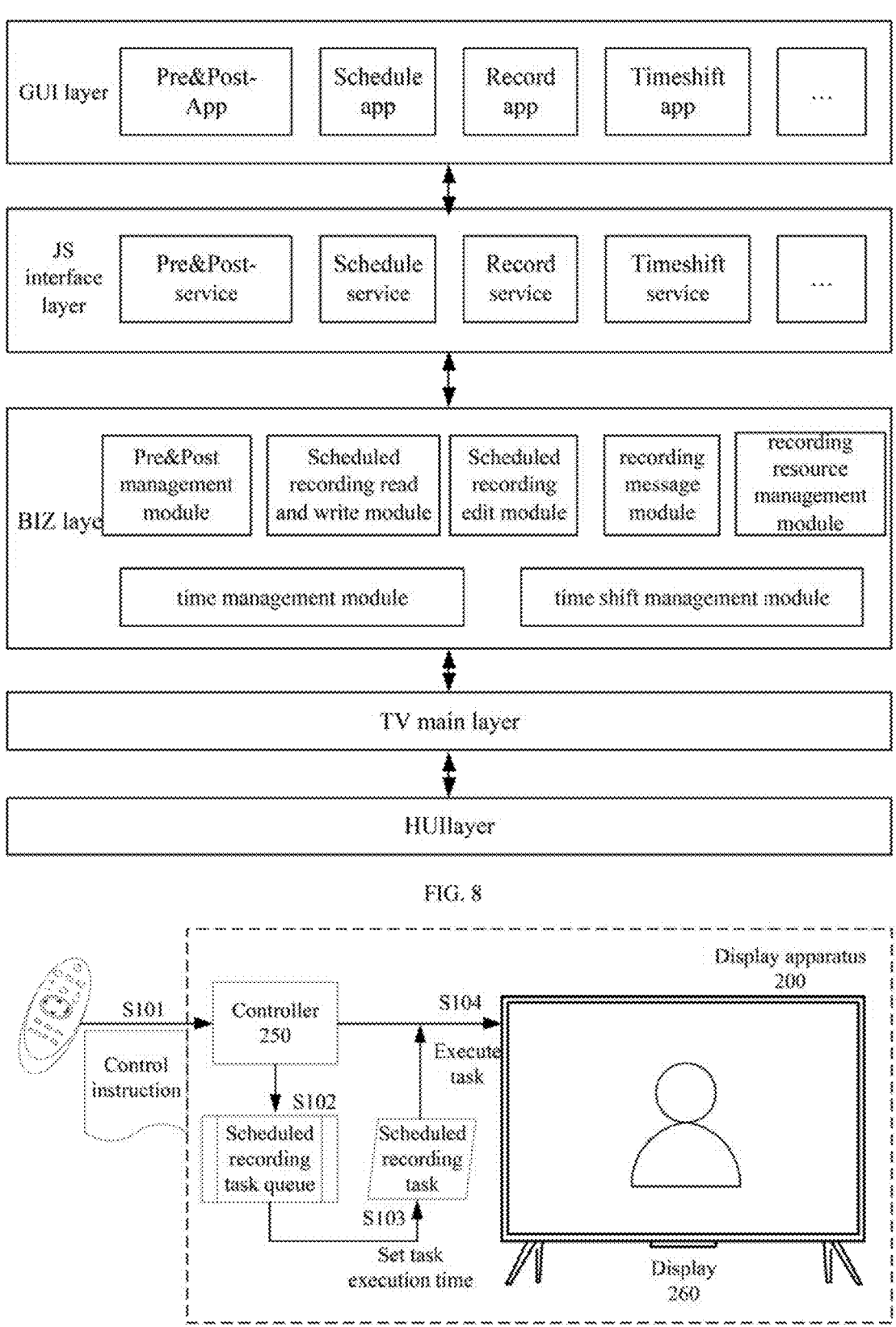
FIG. 8 is a schematic diagram of a recording function module according to an embodiment of the disclosure.
FIG. 9 is a schematic structural diagram of a display apparatus according to an embodiment of the disclosure.

In order to realize the above recording function, the display apparatus 200 may have built-in functional modules related to the media resource recording function in some embodiments. For example, as shown in FIG. 8, the display apparatus 200 may set up the related applications (Apps), such as a Pre&Post application (Pre&Post App), a schedule application (schedule app), a recording application (record app), a time shift application (timeshift app), etc., in the GUI layer. Moreover, a plurality of service modules, such as a Pre&Post service module, a schedule service module, a recording service module, a time shift service module, etc., are set up in the JS interface layer. Meanwhile, a Pre&Post management module, a module for reading and writing a scheduled recording, a module for editing a scheduled recording, a recording message module, a recording resource management module, a time management module, and a time shift management module, etc. are set up in the BIZ layer. Then the recording function is realized in cooperation with the TV main layer and HUI layer. The TV main layer is used to implement functions related to a platform service, especially a function related to Device. The HUI layer is a hardware abstraction layer.

The user can set the recording process through the PVR application, for example, the advance time of recording and the delay time of recording can be set through the PVR application. After the setting is completed, the display apparatus 200 can call the above function modules through the PVR application and apply the set parameters to each recording task. For example, in the scene of setting scheduled recording and starting recording, after the user sets the pre-recording time and the post-recording time and triggers the Schedule App, the user can set the scheduled recording through the Schedule service. The module for editing the scheduled recording will save the scheduled recording into the corresponding database through the module for reading and writing scheduled recording. When the start-time for the scheduled recording is reached, the time management module will notify the GUI layer of the arrival of the recording through the recording message module, so that a corresponding prompt pops up in the user interface to interact with the user. When the user confirms the recording, the recording resource management module will request a resource to start recording. When the recording end time arrives, the recording resource management module will release the resource and notify the GUI that the current recording has been completed through the recording message module.

In some embodiments, the display apparatus 200 can also support a scheduled recording function. The scheduled recording function controls the display apparatus 200 to perform the recording function when the set time is reached by setting a period of time in the future. In order to facilitate the implementation of the recording function, the user can set multiple scheduled recording tasks through the display apparatus 200, and different recording time information can be set correspondingly for different scheduled recording tasks. For example, the recording start time of Task A is 20:00 and the recording end time of Task A is 20:15; the recording start time of Task B is 20:16 and the recording end time of Task B is 22:00.

Since different media resource items may be played sequentially according to the chronological order of the playing plan, the playing start times and the playing stop times of different media resource items will not overlap, so that the recording start times and the recording end times of different recording tasks will not overlap, either. However, when the user sets the advance duration and the delay duration for the scheduled recording task, the execution time periods of different recording tasks may overlap, that is, two or more tasks need to be executed in some periods, causing conflict between the tasks and making it impossible to form a screen recording file containing complete content. For example, after uniformly setting the advance duration to 5 minutes and the delay duration to 10 minutes, the pre-recording time of the task A is 19:55, and the post-recording time of the task A is 20:25. The pre-recording time of the task B is 20:11, and the post-recording time of the task B is 22:10. In this case, there will be an intersection between the task execution periods of the task A and task B, so that both the task A and task B need to be executed within the period from 20:11 to 20:25, causing conflict between tasks, and affecting the recording function.

In order to deal with the conflict problem caused by setting the advance duration and the delay duration, in some embodiments, when the scheduled recording is added, the module for editing the scheduled recording will obtain a current advance duration and a current delay duration from the Pre&Post management module, and apply them to the upcoming scheduled recording task, but not all scheduled recording tasks. After setting the pre-recording time and the post-recording time, the Pre&Post management module will notify the module for editing the scheduled recording that the pre-recording time and the post-recording time have changed. Then the module for editing the scheduled recording will re-apply the pre-recording time and the post-recording time to the upcoming scheduled recording task, and likewise not to all scheduled recording tasks.

Thus, the pre-recording time and the post-recording time are only applied to the upcoming scheduled recording task. After adding the pre-recording time and the post-recording time to the upcoming scheduled recording task, there is only a need to ensure that the scheduled recording is recorded according to the pre-recording time and the post-recording time, and the next scheduled recording is started according to the start-time.

Obviously, the pre-recording time and the post-recording time are only applied to the upcoming scheduled recording task, but not all scheduled recording tasks, which does not comply with the setting logic of the advance duration and the delay duration. When the scheduled recording task is being executed, the next scheduled recording task cannot reflect the pre-recording time and the post-recording time, and then the next scheduled recording task cannot be recorded according to the pre-recording time and the post-recording time. In this way, it seems that the interaction between the pre-recording time and the post-recording time and the scheduled recording task is too monotonous and cannot meet the requirements of users.

In some embodiments, another processing method for the interaction between the pre-recording time and the post-recording time and the scheduled recording task is: when adding scheduled recording, the module for editing the scheduled recording will obtain the current advance duration and delay duration from the Pre&Post management module and apply them to all scheduled recording tasks. The same is also applied when setting the pre-recording time and the post-recording time. After setting the pre-recording time and the post-recording time, the Pre&Post management module will notify the module for editing the scheduled recording that the pre-recording time and the post-recording time have changed. Then the module for editing the scheduled recording will re-apply the pre-recording time and post-recording time to all scheduled recording tasks.

In view of handling conflicts, when adding scheduled recording, the module for editing the scheduled recording will obtain the current advance duration and the current delay duration from the Pre&Post management module. After calculating the start time and end time and the pre-recording time and the post-recording time of all scheduled recordings in the schedule list and a scheduled recording to be added, the module for editing the scheduled recording will check whether there is a conflict between the scheduled recording tasks in the scheduled recording list and this scheduled recording. If there is a conflict, a conflict prompt will pop up. The user can choose to save the scheduled recording task based on the conflict prompt. If the user chooses to save the scheduled recording task, the module for reading and writing the scheduled recording will delete other scheduled recording tasks that conflict with the scheduled recording task; if the user chooses to cancel, the module for reading and writing the scheduled recording will not save the scheduled recording task. After the user sets the pre-recording time and the post-recording time, the Pre&Post management module will notify the module for editing the scheduled recording that the pre-recording time and the post-recording time have changed. In this case, the module for editing the scheduled recording will check whether there is a scheduled recording in the scheduled recording list whose pre-recording time and post-recording time conflict with the set pre-recording time and the set post-recording time. If there is, the Pre&Post management module is notified to pop up the corresponding prompt information to inform the user that the setting cannot be made because there is a conflicting scheduled recording. Meanwhile, the Pre&Post management module does not save this setting. If not, the Pre&Post management module saves this setting.

It can be seen that it is unreasonable to set the pre-recording time and the post-recording time to all scheduled recording tasks and detect conflicts, and then delete other set scheduled recording tasks when choosing to save the scheduled recording. Because after other set scheduled recording tasks being forcibly deleted, the user needs to reset these scheduled recordings. When setting the pre-recording time and the post-recording time, there will obviously be a problem of setting failure. Similarly, for the scheduled recording that has been set by the user, only the pre-recording time and the post-recording time can be changed, but the settings are not allowed. Such a processing method cannot fully realize the interaction between the pre-recording time and the post-recording time and the scheduled recording tasks, and will also lead to poor user's experience of this function.

In order to deal with the problem of conflict of multiple tasks that occurs after setting the advance duration and the delay duration, and further improve the user experience, some embodiments of the disclosure also provide a display apparatus 200 that can perform a scheduled recording method to reduce conflicts between recording tasks and improve the user experience. In order to meet the implementation of the scheduled recording method, the display apparatus 200 should at least include: a display and at least one processor, where the display is configured to display an image from broadcast system or network and/or a user interface. As shown in FIG. 9, at least one processor is configured to execute instructions to cause the display apparatus to perform the above scheduled recording method, including the following steps.

S101: obtaining a scheduled recording task queue in response to an instruction for adding a scheduled recording task.

The display apparatus 200 can generate instructions for indicating different functions according to interactive actions from the user. Some instructions can be used to add scheduled recording tasks. For example, the user can trigger the display apparatus 200 to start the PVR application through the "record" button on the control device 100. After starting the PVR application, the display apparatus 200 may present the PVR application interface through the display 260. The PVR application interface can include an interactive control named "recording schedule". The user can control the focus cursor to select the interactive control and press the "confirm" key to add a new scheduled recording task. That is, in this case, the display apparatus 200 can obtain and respond to the instruction for adding a scheduled recording task.

In some embodiments, different types of display apparatuses 200 can support different forms of interactions, and the instruction for adding a scheduled recording task can be input in different interactive ways. For example, for the display apparatus 200 that supports touch interaction, the user can click the PVR application (or control) through the touch screen, to trigger the display apparatus 200 to add a new scheduled recording task and respond to the instruction for adding the scheduled recording task.

After the display apparatus 200 obtains the instruction for adding a scheduled recording task, the display apparatus 200 may obtain the scheduled recording task queue according to the instruction, where the scheduled recording task queue includes at least one scheduled recording task. The scheduled recording task queue can comprise at least one scheduled recording task set by the user within a detection cycle. The scheduled recording tasks in the scheduled recording task queue can be arranged in order according to the set recording start time, that is, the task with the earliest recording start time is arranged at the head position so as to be executed first. It can be understood that the scheduled recording task queue includes the current scheduled recording task and the historical scheduled recording task. The current scheduled recording task is a scheduled recording task added corresponding to the above instruction for adding a scheduled recording task; and the historical scheduled recording task is a scheduled recording task that has been added by the user but has not been executed before the above instruction for adding a scheduled recording task. Therefore, the scheduled recording task queue includes at least one scheduled recording task, that is, the current scheduled recording task; or may include a plurality of scheduled recording tasks, i.e., the current scheduled recording task and the historical scheduled recording task.

In some embodiments, after obtaining the scheduled recording task queue, the display apparatus 200 can detect the number of tasks included in the scheduled recording task queue, that is, the display apparatus 200 can obtain the number of tasks in the scheduled recording task queue. If the number of tasks is equal to 1, the task execution time of the current scheduled recording task is set to the pre-recording time of the current scheduled recording task, and the task completion time of the current scheduled recording task is set to the post-recording time of the current scheduled recording task.

That is, after obtaining the instruction for adding a scheduled recording task, the display apparatus 200 can detect the recording task that has been currently scheduled and determine whether there is more than one scheduled recording task in the current scheduled recording task queue. When there is no more than one scheduled recording task, it means that the current scheduled recording task queue only includes one scheduled recording task added currently and no other scheduled recording tasks, so the display apparatus 200 can directly execute the scheduled recording task according to the recording time information of the current scheduled recording task. That is, the display apparatus 200 can start recording at the pre-recording time of the current scheduled recording task, and end recording at the post-recording time of the current scheduled recording task.

S102: querying recording time information of one or more adjacent scheduled recording tasks in the scheduled recording task queue.

Here, the recording time information includes the recording start time, the recording end time, the pre-recording time and the post-recording time. When the number of tasks in the scheduled recording task queue is greater than 1, it means that the user has already scheduled a recording task before adding the scheduled recording task this time, that is, there may be a conflict between the scheduled recording task added currently and the historical scheduled recording task that has been added, so the display apparatus 200 needs to query the recording time information of the one or more adjacent scheduled recording tasks in the scheduled recording task queue.

For the convenience of description, two adjacent scheduled recording tasks in the scheduled recording task queue are called the first recording task and the second recording task. In the embodiments of the disclosure, the first recording task is placed first and the second video task is placed second after the first by default in the scheduled recording task queue, unless otherwise stated. That is, when executing recording tasks in the order of the scheduled recording task queue, the first recording task is executed firstly, and the second recording task is executed after the execution of the first recording task is completed.

Obviously, the first recording task and the second recording task are two adjacent tasks in the scheduled recording task queue, and may be current scheduled recording tasks or historical scheduled recording tasks. For example, the tasks in the scheduled recording task queue are sorted according to the recording start time, where the recording start time of task A is 20:00, the recording start time of task B is 20:15, and the recording start time of task 3 is 22:10. Then, when the user adds a task 4 with the recording start time of 21:25 through the command, the task 4 is newly added between task B and task 3 in the scheduled recording task queue, that is, a new scheduled recording task queue is formed as "task A-task B-task 4-task 3". Through the scheduled recording task queue, multiple groups of adjacent scheduled recording tasks can be determined, namely "task A and task B", "task B and task 4", "task 4 and task 3".

After determining the adjacent scheduled recording tasks, the display apparatus 200 can query the recording time information of the adjacent recording tasks, for example, query the recording time information of "task A and task B", "task B and task 4", and "task 4 and task 3", respectively. In some embodiments, since the display apparatus 200 will perform conflict detection every time when a scheduled recording task is added, the conflict detection has already been performed between historical scheduled recording tasks when the scheduled recording task queue only contains historical scheduled recording tasks, that is, the historical scheduled recording tasks retained in the scheduled recording task queue usually have no conflicts or conflicts of the historical scheduled recording tasks retained in the scheduled recording task queue have been resolved. Therefore, when querying the recording time information of one or more adjacent scheduled recording tasks, the display apparatus 200 can only check the recording time information of a historical scheduled recording task adjacent to the scheduled recording task added currently. For example, when the newly added scheduled recording task is task 4, the display apparatus 200 can only query the recording time information of the task B and task 3 adjacent to the task 4. For the task A that is not adjacent to the task 4, the possibility of conflict with the task 4 can be temporarily ignored.

After obtaining the recording time information of the adjacent scheduled recording tasks, the display apparatus 200 can detect whether there is a conflict between two adjacent tasks among the scheduled recording tasks. In order to detect the conflict between adjacent tasks, the display apparatus 200 may firstly obtain a conflict determination interval of each scheduled recording task in the scheduled recording task queue in some embodiments. Here, the conflict determination interval is a time interval including the recording start time and the recording end time of the scheduled recording task. For example, the recording time information of the adjacent scheduled recording tasks obtained by the display apparatus 200 is: the pre-recording time of task A is 19:55, the recording start time of task A is 20:00, the recording end time of task A is 20:15, and the post-recording time of task A is 20:25; the pre-recording time of task B is 20:05, the recording start time of task B is 20:10, the recording end time of task B is 22:00, and the post-recording time of task B is 22:10. In this case, the conflict determination interval of task A is from 20:00 to 20:15, and the conflict determination interval of task B is from 20:10 to 22:00.

After obtaining the conflict determination intervals of adjacent tasks, the display apparatus 200 can determine whether there is an intersection between the conflict determination intervals. If there is an intersection between the conflict determination intervals of any two scheduled recording tasks, it means that there is a conflict between tasks in the current scheduled recording task queue, so the display 260 can display the conflict prompt information. Here, the conflict prompt information can be used to prompt the user that there is a conflict between the scheduled recording task added currently and the historical scheduled recording task in the scheduled recording task queue, and the scheduled recording tasks need to be adjusted to overcome the conflict problem.

Exemplarily, based on the above task A and task B, there is an intersection between the conflict determination intervals of task A and task B, that is, the interval from 20:10 to 20:15. In this case, the display apparatus 200 determines that there is a conflict between the current scheduled recording task (task B) and the historical scheduled recording task (Task A), and then the display apparatus 200 can display a conflict prompt interface that may include conflict prompt information, such as "the scheduled recording task added currently conflicts with a recording task from 20:00 to 20:15. Please adjust time of the scheduled recording task", etc.

In some embodiments, when the display apparatus 200 displays the conflict prompt information, the display apparatus 200 can also guide the user to solve the conflict problem. The user can solve the conflict problem by canceling the addition of the scheduled recording task, deleting the historical scheduled recording task, and modifying the time of scheduled recording tasks. Therefore, the display apparatus 200 can also set and display an operation control in the user interface when displaying the conflict prompt information, and the user can input adjustment commands based on different operation controls.

Figures 10, 11:
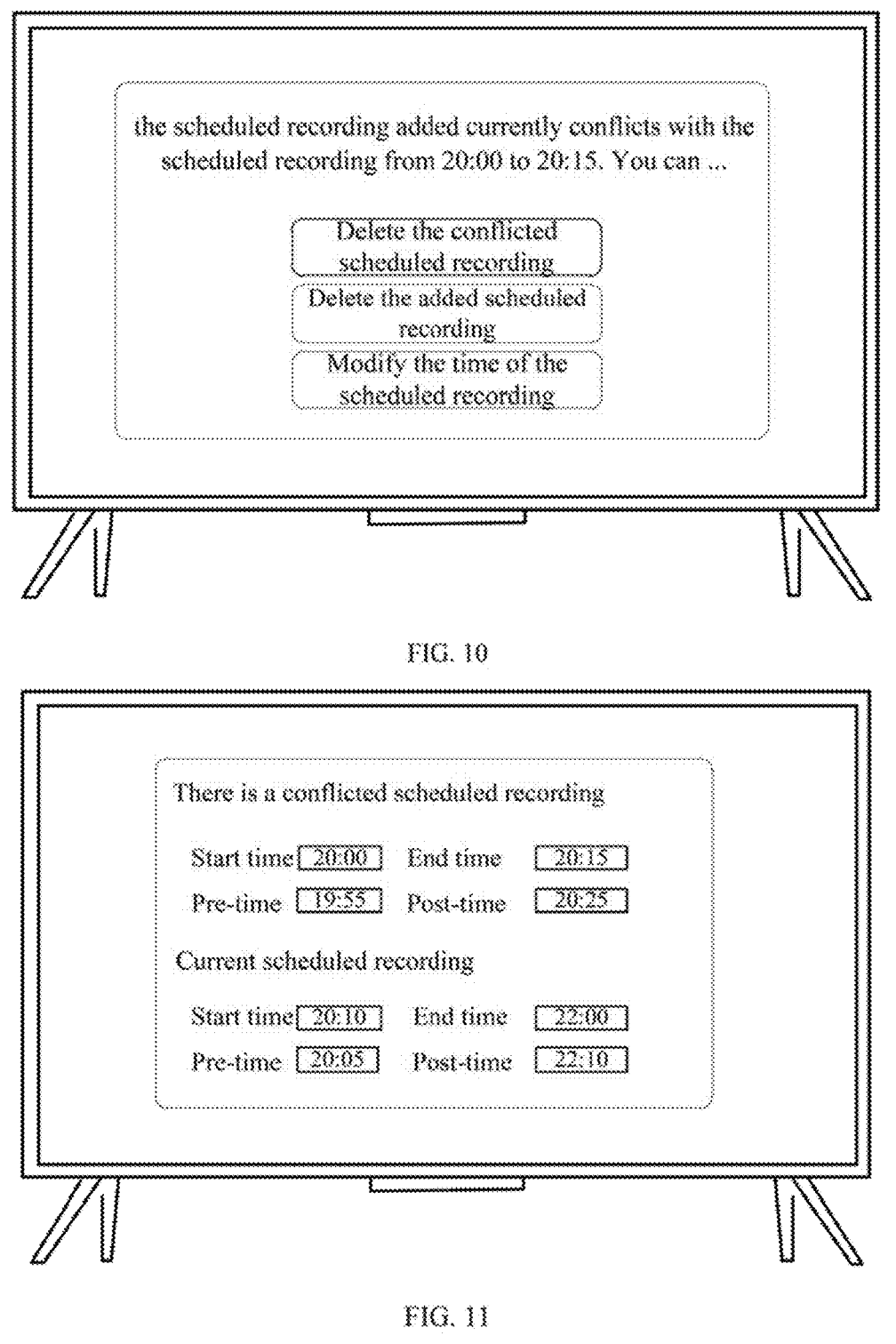

Therefore, in some embodiments, when performing the step of controlling the display to display the conflict prompt information, the display apparatus 200 may also generate a task adjustment interface based on the conflict prompt information, and control the display 260 to display the task adjustment interface. For example, as shown in FIG. 10, the task adjustment interface can include the conflict prompt information "the scheduled recording added currently conflicts with the scheduled recording from 20:00 to 20:15. You can . . . " and a first operation control named "Delete conflicted scheduled recording"; a second operation control named "Delete the added scheduled recording"; and a third operation control named "Modify the time of the scheduled recording".

Based on the task adjustment interface displayed on the display apparatus 200, the user can input different adjustment commands based on different operation controls. That is, the user can input a first adjustment command based on the first operation control, and the display apparatus 200 deletes the conflicted recording task in the scheduled recording task queue in response to the first adjustment command input from the user based on the task adjustment interface. Here, the conflicted recording task is a historical scheduled recording task having an intersection with the conflict determination interval of the scheduled recording task added currently. For example, when determining that the scheduled recording task (Task B) added currently conflicts with the historical scheduled recording task (Task A), the display apparatus 200 displays the task adjustment interface, the user clicks the control named "Delete the conflicted scheduled recording" based on the task adjustment interface, and then the display apparatus 200 can delete task A in the scheduled recording task queue and retain task B in the scheduled recording task queue in response to the corresponding interactive operation.

Similarly, when the user inputs a second adjustment command based on the second operation control in the task adjustment interface, the display apparatus 200 may delete the scheduled recording task added currently in the scheduled recording task queue in response to the second adjustment command. For example, when the user clicks on the control named "Delete the added scheduled recording" in the task adjustment interface, the display apparatus 200 can delete task B in the scheduled recording task queue and retain task A in the scheduled recording task queue in response to the adjustment command.

In some embodiments, the user can also input a third adjustment command based on the third operation control in the task adjustment interface, and the display apparatus 200 modifies the recording start time and/or the recording end time of a target scheduled recording task in response to the third adjustment command from the user based on the task adjustment interface, where the target scheduled recording task is the scheduled recording task added currently and/or a historical scheduled recording task having an intersection with the conflict determination interval of the scheduled recording task added currently. For example, as shown in FIG. 11, when the user clicks on the control named "Modify the time of the scheduled recording" in the task adjustment interface, the display apparatus 200 can pop up a time modification interface that can include the recording time information corresponding to task A and the task time information corresponding to task B, and display the conflicting time through an eye-catching mark, to facilitate the user to modify the time.

S103: setting task execution time and/or task completion time for the scheduled recording task according to the recording time information of the one or more adjacent scheduled recording tasks.

During the process of detecting the conflict, if there is no intersection among conflict determination intervals of all scheduled recording tasks in the scheduled recording task queue, it is determined that there is no conflict among tasks in the current scheduled recording task queue. Therefore, the task execution time and/or the task completion time of the scheduled recording task can be set according to the recording time information of the adjacent scheduled recording tasks, to deal with the conflict problem caused by setting the advance duration and the delay duration.

It should be noted that the task execution time and the task completion time of the scheduled recording task refer to the specific time of subsequently executing the recording task and the specific time of stopping executing the recording task. That is, in order to take into account the playing start time and the playing stop time of the media resource item as well as the advance duration and the delay duration set by the user, the display apparatus 200 can reset the specific task execution time and/or task completion time of the scheduled recording task according to the specific time relationship between adjacent scheduled recording tasks.

Since adjacent tasks may have different time relationships, when the task execution time and task completion time are set, the task execution time can be reset (for example, task B is set to start in advance or in delay, etc.) or the task completion time can be reset (for example, task A is set to end in advance or in delay, etc.) according to the specific time relationship; or the task execution time and the task completion time can be reset at the same time according to the specific time relationship, for example, task A is set to end in advance and task B is set to start in delay at the same time, etc.

In some embodiments, in order to set the task execution time and/or the task completion time of the scheduled recording task, the display apparatus 200 may compare the recording end time of a first recording task with the recording start time of a second recording task. Here, the first recording task and the second recording task are two adjacent scheduled recording tasks in the scheduled recording task queue.

Figure 12:
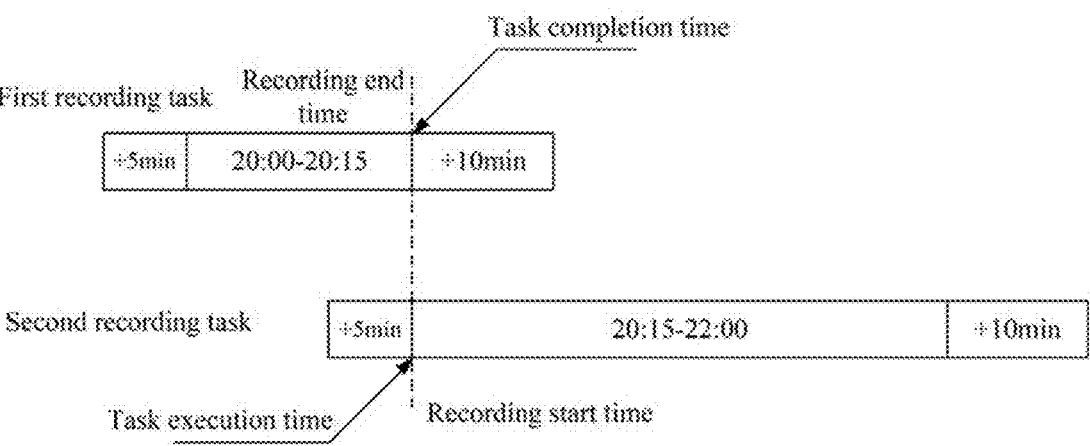
FIG. 12 is a schematic diagram of task setting when the recording end time of the first recording task is equal to the recording start time of the second recording task according to an embodiment of the disclosure.

If the recording end time of the first recording task is the same as the recording start time of the second recording task, the task execution time of the second recording task is set to the recording start time of the second recording task. That is, as shown in FIG. 12, the end-time of the first recording task is equal to the start-time of the second recording task. Then, when the first recording task records to the end-time of this scheduled recording, the display apparatus 200 can start the second recording task to start recording from the start-time of this scheduled recording. For example, the recording interval of the first recording task is from 20:00 to 20:15, and the recording interval of the second recording task is from 20:15 to 22:00. Then the first recording task will stop when recording to the start-time (20:15) of the second recording task, and the second recording task is controlled to start recording from the start-time (that is, 20:15) of the second recording task.

If the recording end time of the first recording task is earlier than the recording start time of the second recording task, the task completion time of the first recording task and the task execution time of the second recording task are further set according to the post-recording time of the first recording task and the recording start time of the second recording task. In some embodiments, if the recording end time of the first recording task is earlier than the recording start time of the second recording task, the display apparatus 200 can obtain the advance duration and the delay duration uniformly set by the user for recording tasks, calculate the pre-recording time according to the recording start time and the advance duration, and calculate the post-recording time according to the recording end time and the delay duration.

For example, the recording interval of the first recording task is 20:00 to 20:15, the recording interval of the second recording task is 20:20 to 22:00, the advance duration is 5 min, and the delay duration is 10 min. Then, the pre-recording time of the first recording task is 19:55, and the post-recording time of the first recording task is 20:25; the pre-recording time of the second recording task is 20:15, and the post-recording time of the second recording task is 22:10.

After obtaining the pre-recording time and the post-recording time by calculation, the display apparatus 200 can obtain all recording time information of the first recording task and the second recording task. In this case, the display apparatus 200 may compare the post-recording time of the first recording task with the recording start time of the second recording task. If the post-recording time of the first recording task is later than the recording start time of the second recording task, the task completion time of the first recording task is set to the recording start time of the second recording task, and the task execution time of the second recording task is set to the recording start time of the second recording task.

Figure 13:
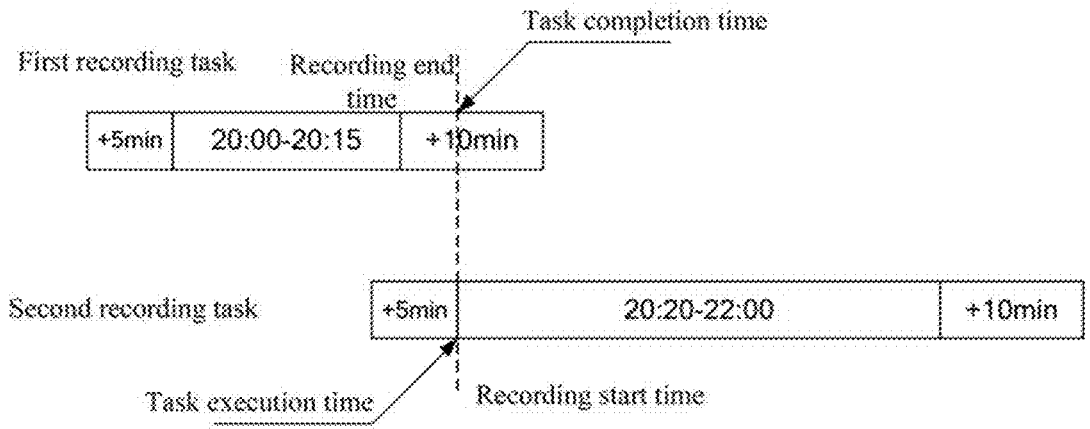
FIG. 13 is a schematic diagram of task setting when the recording start time of the second recording task is later than the recording end time of the first recording task according to an embodiment of the disclosure.

That is, the end-time of the first recording task is earlier than the start-time of the second recording task, and the post-recording time of the first recording task is later than the start-time of the second recording task, so the second recording task will start recording from the start-time of this scheduled recording, and the first recording task will record to a part of the post-recording time. For example, as shown in FIG. 13, the recording interval of the first recording task is 20:00 to 20:15, the recording interval of the second recording task is 20:20 to 22:00, the advance duration is 5 min, and the delay duration is 10 min. Then the display apparatus 200 can control the first recording task to stop recording at 20:20, and control the second recording task to start recording at 20:20.

If the post-recording time of the first recording task is earlier than the recording start time of the second recording task, the display apparatus 200 may set the task execution time of the second recording task according to the post-recording time of the first recording task. That is, in some embodiments, the display apparatus 200 can compare the post-recording time of the first recording task with the pre-recording time of the second recording task.

If the post-recording time of the first recording task is later than the pre-recording time of the second recording task, the task execution time of the second recording task is set to the post-recording time of the first recording task. That is, the post-recording time of the first recording task is earlier than the start-time of the second recording task, and the post-recording time of the first recording task is later than the pre-recording time of the second recording task, so the first recording task will record to the post-recording time, and the second recording task will start recording in advance.

Figure 14:
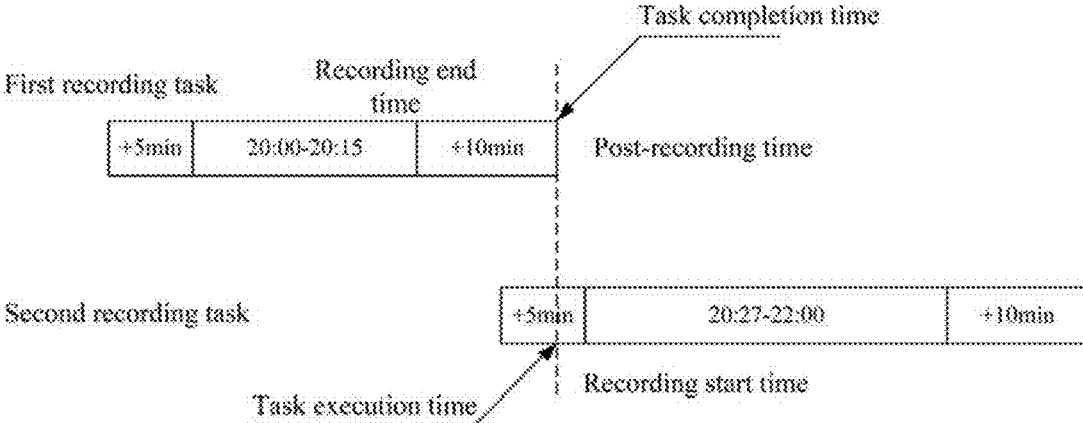
FIG. 14 is a schematic diagram of task setting when the recording start time of the second recording task is later than the post-recording time of the first recording task according to an embodiment of the disclosure.

For example, as shown in FIG. 14, the recording interval of the first recording task is 20:00 to 20:15, the recording interval of the second recording task is 20:27 to 22:00, the advance duration is 5 min, and the delay duration is 10 min. Then the display apparatus 200 can control the first recording task to stop recording at 20:25, and simultaneously control the second recording task to start recording at 20:25.

If the post-recording time of the first recording task is earlier than or equal to the pre-recording time of the second recording task, the task execution time of the second recording task is set to the pre-recording time of the second recording task. That is, the post-recording time of the first recording task is earlier than the start-time of the second recording task, and the post-recording time of the first recording task is earlier than or equal to the pre-recording time of the second recording task, so the first recording task will record to the post-recording time, and the second recording task will start recording in advance at the pre-recording time of the second recording task.

For example, the recording interval of the first recording task is 20:00 to 20:15, the recording interval of the second recording task is 20:35 to 22:00, the advance duration is 5 min, and the delay duration is 10 min. Then the display apparatus 200 can control the first recording task to stop recording at 20:25, and simultaneously control the second recording task to start recording at 20:30.

S104: executing the scheduled recording task according to the task execution time and/or the task completion time.

After setting the task execution time and/or the task completion time of the scheduled recording task, the display apparatus 200 may execute the scheduled recording task according to the task execution time and/or the task completion time. It can be seen that the display apparatus 200 can determine an initial conflict by using the start-time and end-time of the scheduled recording task, and determine a conflict of the advance duration and the delay duration in combination with the pre-recording time, start-time, end-time and the post-recording time. The interaction of the pre-recording time and the post-recording time with the scheduled recording task can be enhanced, so that the scheduled recording task includes adding scheduled recording, recording start, recording end, recording time shift and other functions. Moreover, when the scheduled recording is added, the start of the scheduled recording, the recording duration and other aspects can be processed separately, which is more in line with the setting tendency of the pre-recording time and the post-recording time, realizes the original intention of setting scheduled recording tasks, and brings users more convenient experience.

In some embodiments, when executing the scheduled recording task according to the task execution time, at least one processor of the display apparatus 200 may further monitor the task execution progress of the first recording task; if an end identifier of the first recording task is monitored before the task execution time of the second recording task, the task completion time is obtained from the end identifier; and the task execution time of the second recording task is reset according to the task completion time.

For example, if the first recording task ends in advance, the second recording task starts recording according to the pre-recording time. In the same way, if the user chooses to cancel recording when the second recording task is started, the first recording task will continue recording according to the post-recording time.

Based on the above display apparatus 200, some embodiments of the disclosure also provide a scheduled recording method, including:

S101: obtaining a scheduled recording task queue in response to an instruction for adding a scheduled recording task, where the scheduled recording task queue includes at least one scheduled recording task;

S102: querying recording time information of one or more adjacent scheduled recording tasks in the scheduled recording task queue, where the recording time information includes recording start time, recording end time, pre-recording time and post-recording time;

S103: setting task execution time and/or task completion time for the scheduled recording task according to the recording time information of the one or more adjacent scheduled recording tasks;

S104: executing the scheduled recording task according to the task execution time and/or the task completion time.

Figure 15:
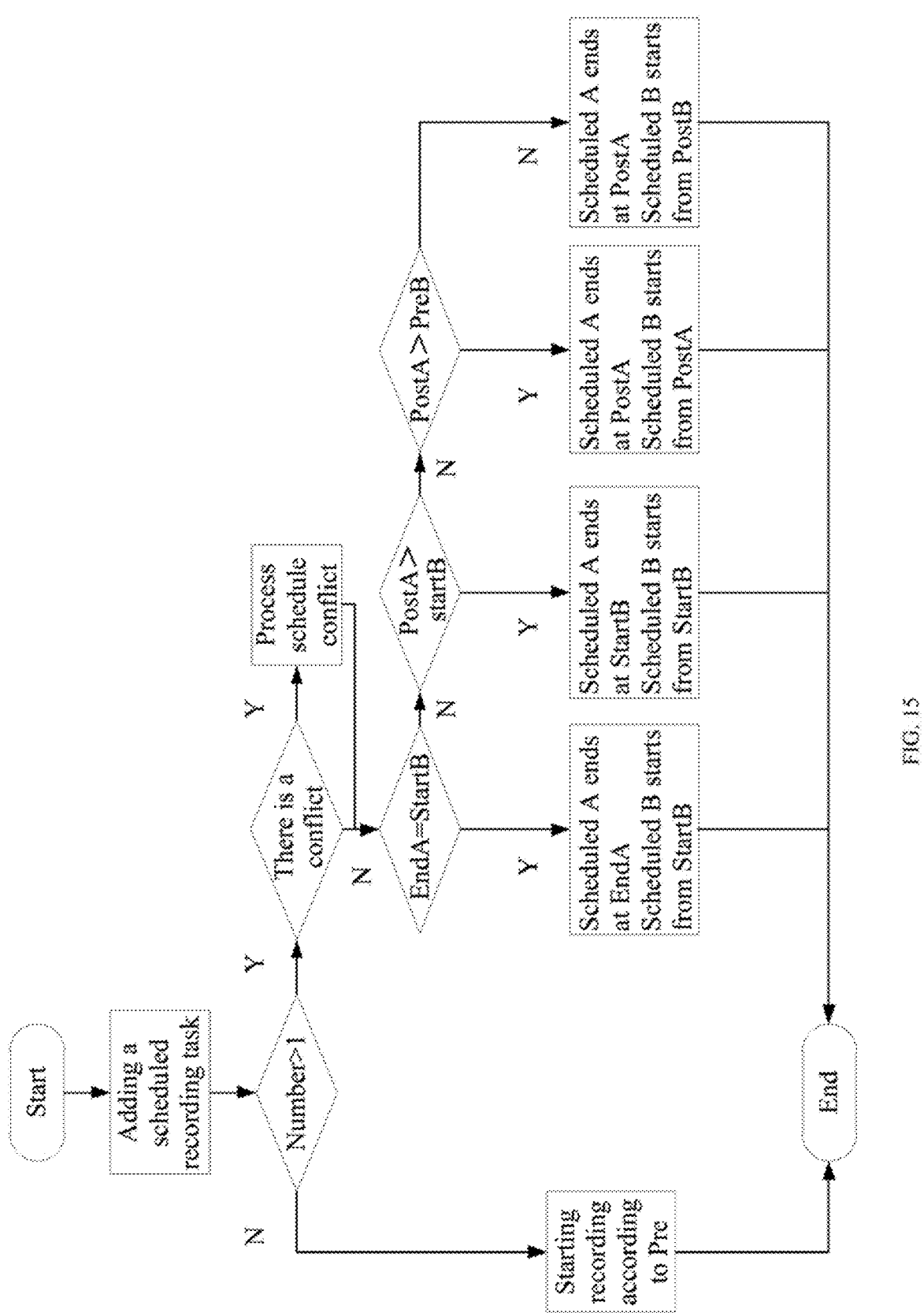
FIG. 15 is a schematic flowchart of a scheduled recording method according to an embodiment of the disclosure.

For convenience of description, in some embodiments, the first recording task can be recorded as schedule A, the second recording task can be recorded as schedule B; for the first recording task, the start-time is denoted as startA, the end-time is denoted as endA, the pre-recording time is denoted as PreA, and post-recording time is denoted as PostA; and for the second recording task, the start-time is denoted as startB, the end-time is denoted as endB, the pre-recording time is denoted as PreB, and the post-recording time is denoted as PostB. Then the flowchart of the above scheduled recording method is shown in FIG. 15.

In some embodiments, when the start-time of the scheduled recording B is reached, the display apparatus 200 may pop up a prompt box. If the "cancel" option is selected, in this case, the scheduled recording B will not be started, and the scheduled recording task B will be deleted. The scheduled recording A continues to end recording according to the post-recording time. When the scheduled recording A ends in advance, for example at 20:13, the scheduled recording B starts according to the pre-recording time, that is, starts at 20:13.

Figure 16:
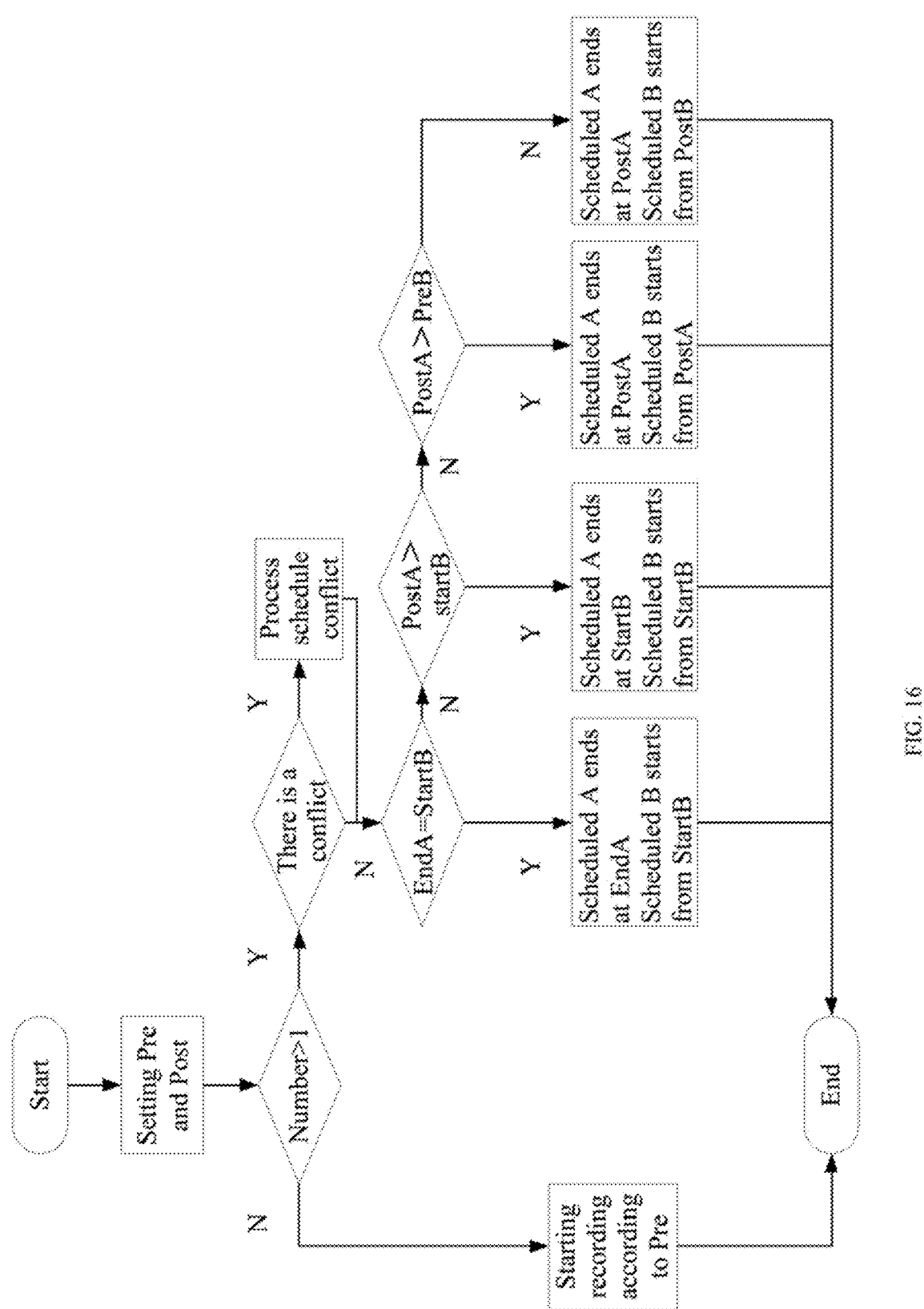
FIG. 16 is a schematic flowchart of a scheduled recording method when setting an advance duration and a delay duration according to an embodiment of the disclosure.

It should be noted that the display apparatus 200 can also detect and improve the conflict of scheduled recording tasks when the user sets the advance duration and the delay duration. That is, in some embodiments of the disclosure, the display apparatus 200 can also receive an instruction for setting the advance duration and the delay duration, and the display apparatus 200 can obtain the scheduled recording task queue in response to the instruction for setting the advance duration and the delay duration, and perform the corresponding conflict detection and improvement according to subsequent steps. When the user sets the advance duration and the delay duration, the display apparatus 200 can perform the conflict detection and set the task execution time and/or the task completion time according to the process shown in FIG. 16, which will not be described again here.

The scheduled recording method according to the above embodiments can include: obtaining the scheduled recording task queue in response to an instruction for adding the scheduled recording task; querying the recording time information of the one or more adjacent scheduled recording tasks in the scheduled recording task queue, where the recording time information includes recording start time, recording end time, pre-recording time and post-recording time; then setting the task execution time and/or the task completion time of the scheduled recording task according to the recording time information of the one or more adjacent scheduled recording tasks; and finally, executing the scheduled recording task according to the task execution time and/or the task completion time. The display apparatus can comprehensively set the actual task execution time and the actual task completion time of the scheduled recording task based on the recording time information, and adapt to the advance time and the delay time set by the user on the premise of ensuring the integrity of the recording content, thereby solving the problem of conflict of multiple recording tasks in the process of recording the media resources.

In some embodiments, after the display apparatus obtains a corresponding video by recording a played program (for example, a video obtained by executing the aforementioned scheduled recording task), the user can repeatedly watch this program by playing back the video at any time after the program is played. However, when reviewing the video, the user can only adjust the playing progress of the video through functions such as fast forward and rewind, dragging the progress bar, and double-speed playback. If the duration of the video is relatively long, the above adjustment process will waste more time. Moreover, in the same video, if there are a plurality of clips that the user is interested in, the user needs to make multiple adjustments to adjust the playing progress of the video to the clips of his or her interest. If the user wants to play back a plurality of videos, the user needs to switch between different videos. In the above playback process, the user needs to interact with the display apparatus multiple times. The operation is complicated, resulting in poor user experience.

In view of the above-mentioned issues in the recording function, an embodiment of the disclosure also provides a display apparatus. The display apparatus may be the display apparatus 200 as shown in FIG. 1, FIG. 2 or FIG. 4, or other display apparatus. The embodiment of the disclosure is described by taking the display apparatus 200 shown in FIG. 1, FIG. 2 or FIG. 4 as an example. The display apparatus 200 in the embodiments of the disclosure is configured with a Personal Video Recorder (PVR) function.

In order to deal with the above problems, an embodiment of the disclosure also provides a recording method. This method can be applied to the display apparatus 200 including the system architecture shown in FIG. 5. By performing this recording method, the user can customize to cut a video clip from a video, splice videos, and play back the spliced videos.

The display apparatus 200 can record a program according to the process shown in FIG. 17. The specific steps are as follows.

S1701: in a first recording mode, in response to a time point request from a user, inserting a time point in a first video, and displaying the time point on a progress bar.

The display apparatus 200 is configured with two recording modes, which are a normal recording mode and a custom recording mode respectively. Here, the normal recording mode is the mode discussed above in which a program is recorded to obtain a video and the complete video is played back. The custom recording mode is a mode where the user can customize cutting, splicing, and playback of videos. For ease of distinction, the custom recording mode is called the first recording mode, and the normal recording mode is called the second recording mode.

The display apparatus 200 may be configured to use the second recording mode as the default recording mode, that is, preferentially use the second recording mode to record programs. The display apparatus 200 may also be configured to use the first recording mode as the default recording mode, that is, preferentially use the first recording mode to record programs. The user can manually set the recording mode, taking the user setting the first recording mode as an example. The user can enter a page for setting the first recording mode through an advanced settings menu. The advanced settings menu includes TV name, PVR&Timeshift, Power Indicator, Screensaver, Input Labels, Custom PVR&Playback, Fast Power On, and Power On Mode. Here, the option PVR&Timeshift is an entrance to the page for setting the first recording mode. The user controls the remote control to adjust the focus (shown in gray) to the option PVR&Timeshift, and selects this option to enter the page for setting the first recording mode. Taking the PVR&Timeshift menu shown in FIG. 18 as the page for setting the first recording mode as an example, the PVR&Timeshift menu includes a function of Custom Cut&Splice. When the Custom Cut&Splice is in the on state, the display apparatus 200 is in the first recording mode. When the Custom Cut&Splice is in the off state, the display apparatus 200 is in the second recording mode. As shown in FIG. 18, if the Custom Cut&Splice is in the on state, the mark "V" will be displayed on the Custom Cut&Splice. In some embodiments, as shown in FIG. 18, if the Custom Cut&Splice is in the on state, when the focus is on the Custom Cut&Splice in the on state (shown in gray), a prompt may also be displayed, such as "The user can cut and splice video files through cutting and splicing functions", to indicate the state and function of Custom Cut&Splice to the user. The PVR&Timeshift menu may also include functions of PVR Setup, Time Shift Setup, Start in advance, Delay Ending, and Permanent Timeshift.

When the display apparatus 200 is in the first recording mode, the user can customize cutting, splicing and playback of the video. When cutting the video, the user needs to firstly determine a clip to be cut in the video. The user can mark the video clip to be cut through time points by setting the time points at the start position and end position of the clip to be cut.

The user can set a time point in the video based on a page for setting the time point. The page for setting the time point includes the progress bar of the first video, the first video is a video in which the time point can be set, and the first recording is the original video of the original program, that is, the complete video of the program. The progress bar of the first video is used to display the duration and playing progress of the first video. The user sends a time point request to the display apparatus 200 to instruct the display apparatus 200 to insert a time point in the corresponding playing progress of the first video. In response to the time point request, the display apparatus 200 inserts a time point in the first video, that is, creates a corresponding relationship between the time point and the corresponding playing progress of the first video, so that the corresponding playing progress in the first video can be determined based on the time point and this corresponding relationship. The display apparatus 200 also displays the time point on the progress bar, so that the user can quickly grasp the set time point based on the progress bar.

The time point is displayed in a highlighted style on the progress bar. The highlighted style may be the style of the time point itself, which is different from the progress bar and other indication information on the progress bar. The highlighted style may also be an indicator, an indicator box, a pop-up box, etc. to indicate the style of the time point.

The page for setting the time point can be divided into two categories: one is the recording interface of the first video or the playback interface of the first video, and the other is the video cutting interface. The process of setting the time point based on the two types of pages for setting the time point will be discussed below.

Figure 19:
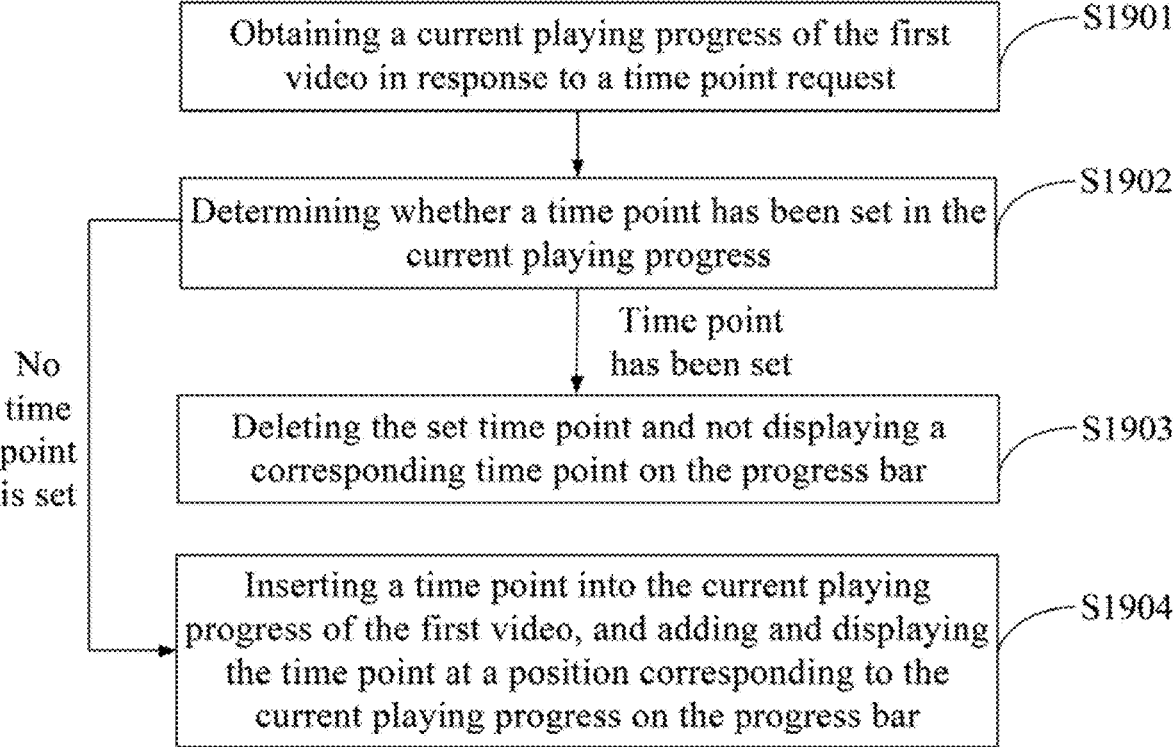
FIG. 19 is a flowchart of setting a time point by the display apparatus according to an embodiment of the disclosure.

If the user inputs the time point request based on the recording interface of the first video or the playback interface of the first video, the display apparatus 200 can set the time point according to the process shown in FIG. 19. The specific steps are as follows.

S1901: obtaining a current playing progress of the first video in response to a time point request.

Figure 20:
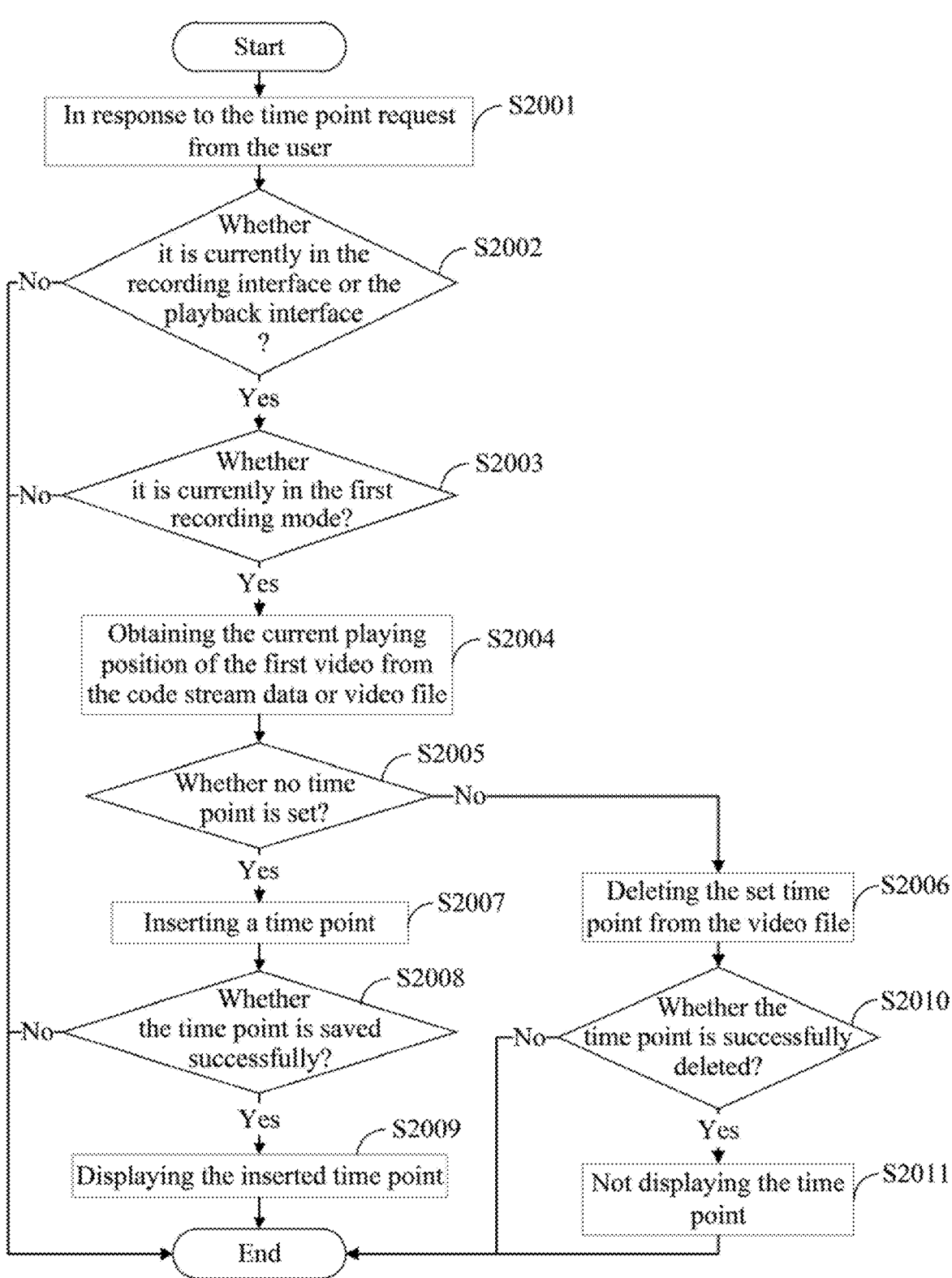
FIG. 20 is a flowchart of setting a time point by the display apparatus according to an embodiment of the disclosure.

With reference to the process shown in FIG. 20, the user sends a time point request to the display apparatus 200 during the process of dynamically playing the first video on the display apparatus, and the time point request has a corresponding relationship with the playing progress of the first video. In response to the time point request from the user (S2001), the display apparatus 200 firstly determines whether it is currently in the recording interface of the first video or the playback interface of the first video (S2002), that is, determines whether the first video is currently in the state in which a time point can be set, such as a recording state or a playback state. If the first video is not currently in the recording state or the playback state, the display apparatus 200 does not respond to the time point request. If the first video is currently in the recording state or the playback state, the display apparatus 200 determines whether it is currently in the first recording mode (S2003), that is, determines whether the user cutting and splicing functions are enabled. If the display apparatus 200 is not in the first recording mode (that is, in the second recording mode), the display apparatus 200 does not respond to the time point request. If the display apparatus 200 is in the first recording mode, the display apparatus 200 obtains the current playing position of the first video from the code stream data or video file (S2004), that is, obtains the current playing progress of the first video, in response to the time point request. The current playing progress is the playing progress into which the user wants to insert the time point.

In some embodiments, the key value of the time point request may be the same as the key value of other command. For example, the time point request and the pause command both correspond to the OK key. When the condition for responding to the time point request is not met, the display apparatus 200 can respond to other command corresponding to this key value. For example, when the condition for responding to the time point request is not met, the display apparatus 200 may respond to the pause command and pause playing the current program.

S1902: determining whether a time point has been set in the current playing progress.

The display apparatus 200 can determine whether there is a corresponding relationship between the current playing progress and the time point by querying the corresponding relationship between the playing progress and the time point stored in the video file of the first video, that is, determine whether no time point is set at the current playing position (S2005). If the corresponding relationship exists, it means that a time point has been set in the current playing progress. If the corresponding relationship does not exist, it means that no time point is set in the current playing progress.

S1903: if a time point has been set, deleting the set time point and not displaying a corresponding time point on the progress bar.

If it is determined that a time point has been set in the current playing progress, the set time point is deleted from the video file (S2006), that is, the set corresponding relationship between the current playing progress and the time point is deleted from the video file. Furthermore, the display apparatus 200 can also determine whether the time point is successfully deleted (S2010). If so, the time point will not be displayed on the progress bar (S2011), to indicate to the user that no time point is set in the current playing progress; if the time point is not successfully deleted, the time point request will not be responded to, that is, the task ends.

S1904: if no time point is set, inserting a time point into the current playing progress of the first video, and adding and displaying the time point at a position corresponding to the current playing progress on the progress bar.

If no time point is set, a time point is inserted into the current playing progress of the first video (S2007), that is, a corresponding relationship between the current playing progress and the time point is created, and this corresponding relationship is stored in the video file. After S2007, the display apparatus 200 can also determine whether the time point is saved successfully (S2008). If not, the time point request will not be responded to, that is, the task ends; if so, the inserted time point is displayed at the position corresponding to the current playing progress on the progress bar (S2009), to indicate that the time point has been set in the current playing progress.

Figure 21:
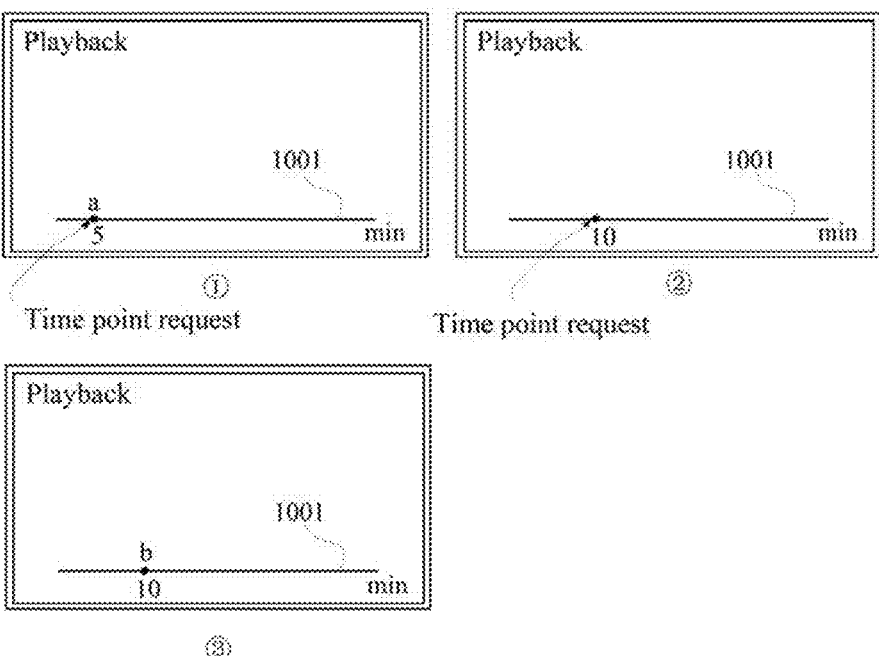
FIG. 21 is a schematic diagram of the interface change when the display apparatus sets a time point according to an embodiment of the disclosure.

In some embodiments, FIG. 21 is a schematic diagram of the interface change when the display apparatus sets a time point according to an embodiment of the disclosure. Taking the playback interface of the first video shown by (1) in FIG. 21 as an example, the playback interface includes a progress bar 1001, and the time point a (highlighted by a solid circle)

is displayed at 5 min on the progress bar 1001. If the user sends a time point request to the display apparatus 200 when the current playing progress of the first video is 5 min, the display apparatus 200 determines that it is currently in the playback state and in the first recording mode in response to the time point request, and the display apparatus 200 obtains the current playing progress, that is, 5 min. The display apparatus 200 queries the corresponding relationship between the playing progress and the time point stored in the video file of the first video, and can determine the corresponding relationship a between 5 min and time point a. Thus, the display apparatus 200 can determine that a time point has been set in the current playing progress, and further delete the time point a (that is, delete the corresponding relationship a in the video file) in response to the time point request, and not display the time point a on the progress bar 1001 as shown by 2 in FIG. 21. If the user sends a time point request to the display apparatus 200 when the current playing progress of the first video is 10 min, the display apparatus 200 determines that it is currently in the playback state and in the first recording mode in response to the time point request, and the display apparatus 200 obtains the current playing progress, that is, 10 min. The display apparatus 200 queries the corresponding relationship between the playing progress and the time point stored in the video file of the first video, but does not identify the corresponding relationship including 10 min. Therefore, the display apparatus 200 can determine that no time point is set in the current playing progress, and further insert a time point b (that is, create a corresponding relationship b between 10 min and time point b) in response to the time point request, store the corresponding relationship b in the video file, and display the time point b at 10 min on the progress bar 1001 as shown by 3 in FIG. 21.

Figure 22:
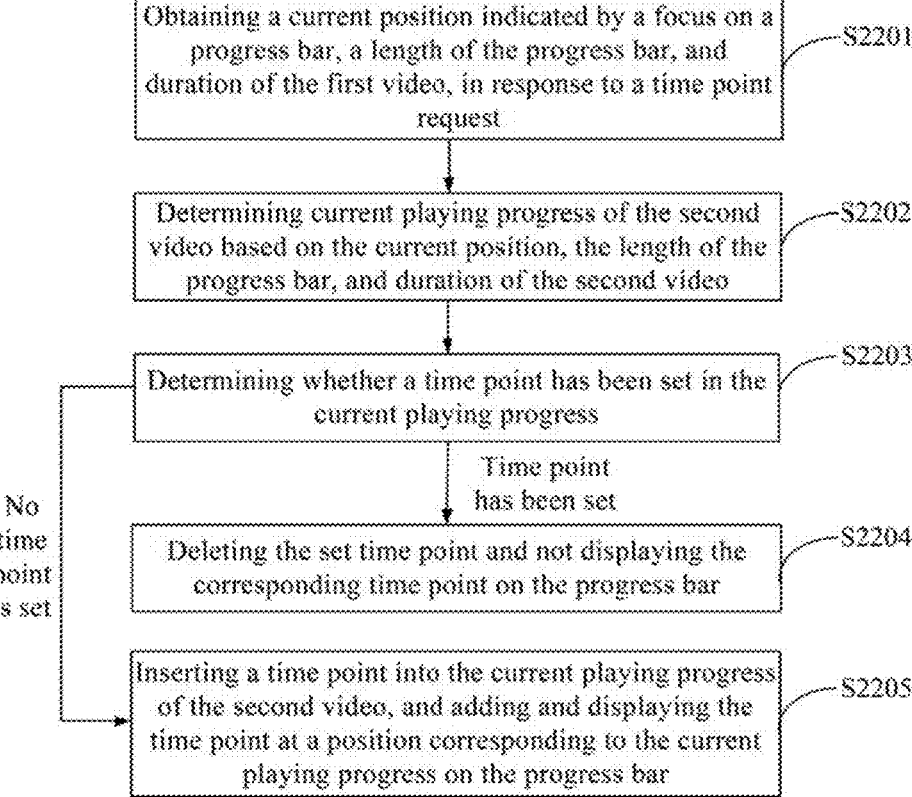
FIG. 22 is a flowchart of setting a time point in the display apparatus according to an embodiment of the disclosure.

If the user inputs the time point request based on a video cutting interface, the display apparatus 200 can set the time point according to the process shown in FIG. 22. The specific steps are as follows.

S2201: obtaining a current position indicated by a focus on a progress bar, a length of the progress bar, and duration of the first video, in response to a time point request.

The video cutting interface includes a first video list, and the first video list includes an option for the first video to be cut, that is, an option for a second video. Each option includes a progress bar of the second video. If each first video is not processed, the video list only includes an option for each first video. If the first video is processed and a new video is obtained, the video list includes an option for each first video and also includes an option for the new video. The video cutting interface is used by the user to cut the second video in the first video list.

S2202: determining current playing progress of the second video based on the current position, the length of the progress bar, and duration of the second video.

The current position indicated by the focus on the progress bar, the length of the progress bar, and the duration of the second video satisfy the following relationship:

the ratio of the current position indicated by the focus on the progress bar to the length of the progress bar is equal to the ratio of the current playing progress of the second video to the duration of the second video. Here, the current position indicated by the focus on the progress bar corresponds to the length from the starting position of the progress bar to the current position of the progress bar. The current playing progress of the second video is the length of time required to play from the starting position of the progress bar to the current position, that is, the playing progress corresponding to the current position indicated by the focus.

The current playing progress corresponding to the current position, that is, the playing progress into which the user wants to insert a time point, can be determined based on the above proportional relationship.

S2203: determining whether a time point has been set in the current playing progress.

S2204: if a time point has been set, deleting the set time point and not displaying the corresponding time point on the progress bar.

S2205: if no time point is set, inserting a time point into the current playing progress of the second video, and adding and displaying the time point at a position corresponding to the current playing progress on the progress bar.

S2203 to S2205 are similar to S1902 to S1904 and will not be described again here.

Figure 23:
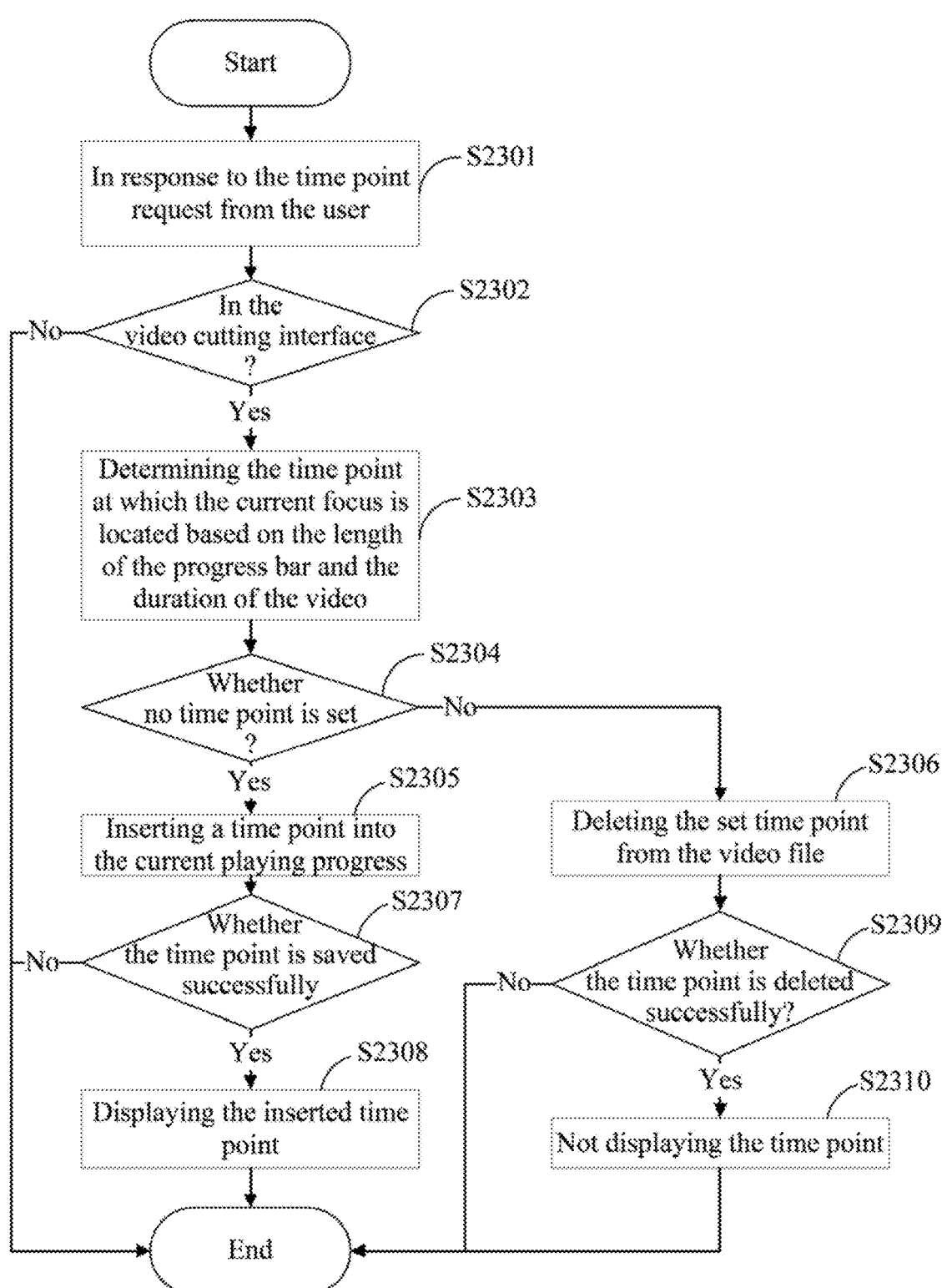
FIG. 23 is a flowchart of setting a time point in the display apparatus according to an embodiment of the disclosure.

The process shown in FIG. 22 will be described in combination with the process shown in FIG. 23. When the display apparatus 200 displays the video cutting interface, the user sends a time point request to the display apparatus 200 based on the progress bar on the option for the second video, and the time point request has a corresponding relationship with the position indicated by the focus on the progress bar. In response to the time point request from the user (S2301), the display apparatus 200 firstly determines whether it is currently in the video cutting interface (S2302), that is, determines whether the second video is currently in the state that can be processed. If the display apparatus 200 is not in the video cutting interface, the display apparatus 200 does not respond to the time point request, that is, the task ends. If the display apparatus 200 is currently in the video cutting interface, the display apparatus 200 obtains the current position indicated by the focus on the progress bar, the length of the progress bar and the duration of the second video in response to the time point request, and then determines the time point at which the current focus is located based on the length of the progress bar and the duration of the video (S2303). After determining the time point at which the current focus is located, the display apparatus 200 can also determine whether no time point is set in the current playing progress (S2304). If so, a time point can be inserted into the current playing progress (S2305). If a time point has been set, the set time point is deleted from the video file (S2306). Further, after S2305, the display apparatus 200 can also determine whether the time point is saved successfully (S2307). If not, the time point request will not be responded to, that is, the task ends; if so, the inserted time point is displayed at the position corresponding to the current playing progress on the progress bar (S2308), to indicate that the time point has been set in the current playing progress. After S2306, the display apparatus can also determine whether the time point is deleted successfully (S2309). If so, the time point is not displayed on the progress bar (S2310), to indicate to the user that no time point is set in the current playing progress; if the time point is not deleted successfully, the time point request will not be responded to, that is, the task ends.

Figure 24:
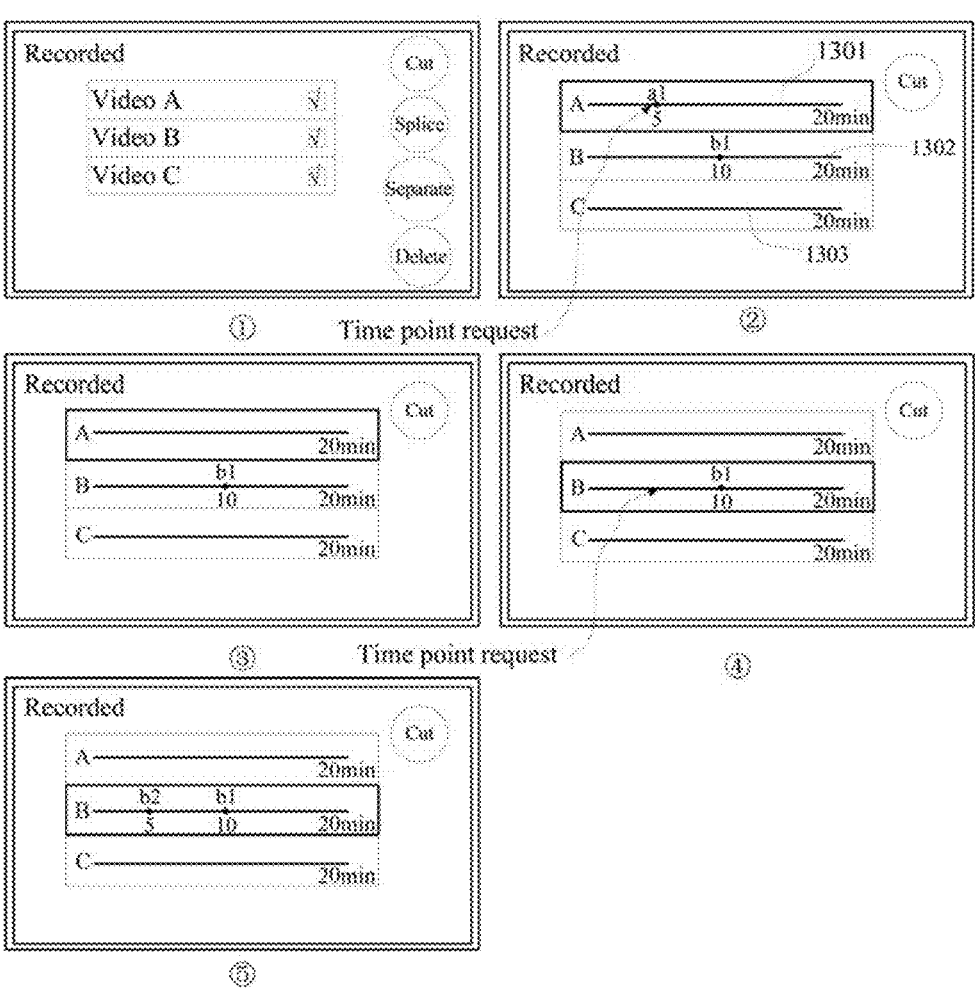
FIG. 24 is a schematic diagram of the interface change when the display apparatus sets a time point according to an embodiment of the disclosure.

In response to a first command from the user, the display apparatus 200 displays a video processing interface as shown by ① in FIG. 24. The video processing interface includes options for video A, video B and video C, and options for Cut, Splice, Separate and Delete. The user selects video A, video B and video C (selected with a "√" mark displayed), and sends a second command to the display apparatus 200 based on the Cut option. In response to the second command, the display apparatus 200 displays a video cutting interface as shown by ② in FIG. 24. The video cutting interface includes options for all second video (the video A, the video B and the video C), and each option includes a corresponding progress bar, for example: the progress bar 1301 of the video A, the progress bar 1302 of the video B, and the progress bar 1303 of the video C. Here, the time point a1 (highlighted by a solid circle) is displayed at 5 min on the progress bar 1301, and the time point b1 (highlighted by a solid circle) is displayed at 10 min on the progress bar 1302. When the video cutting interface is displayed, the focus is displayed on the progress bar of the option for the second video by default. Taking FIG. 24 as an example, the focus is displayed on the progress bar 1301 by default (shown in a thick black solid box). The user can instruct the display apparatus 200 to switch the focus among the progress bars through the up and down keys. The user can instruct the display apparatus 200 to move the focus on the progress bar through the left and right keys. Taking the focus displayed on the progress bar 1301 as an example, the user instructs the display apparatus 200 to move the focus rightwards on the progress bar 1301 through the right key. When the focus moves to 5 cm on the progress bar 1301, the user sends a time point request to the display apparatus 200. After the display apparatus 200 determines that it is currently in the video cutting interface in response to the time point request, the display apparatus 200 obtains the current position (5 cm) indicated by the focus on the progress bar 1301, the length (20 cm) of the progress bar 1301, and the duration (20 min) of the video A. Based on the proportional relationship mentioned above, the display apparatus 200 can further determine that the current playing progress of the video A is 5 min. The display apparatus 200 queries the corresponding relationship between the playing progress of the video A and the time point stored in the PVR video file, and can determine the corresponding relationship a1 between 5 min and time point a1. Thus, the display apparatus 200 can determine that a time point has been set in the current playing progress, and further delete the time point a1, that is, delete the corresponding relationship a1 in the PVR video file, in response to the time point request, and not display the time point a1 on the progress bar 1301 as shown by ③ in FIG. 24. The user instructs the display apparatus 200 to switch the focus downward from the progress bar 1301 to the progress bar 1302 through the down key, as shown by ④ in FIG. 24. The user instructs the display apparatus 200 to move the focus rightwards on the progress bar 1302 through the right key. When the focus moves to 5 cm on the progress bar 1302, the user sends a time point request to the display apparatus 200. After the display apparatus 200 determines that it is currently in the video cutting interface in response to the time point request, the display apparatus 200 obtains the current position (5 cm) indicated by the focus on the progress bar 1302, the length (20 cm) of the progress bar 1302, and the duration (20 min) of video B. Based on the proportional relationship mentioned above, the display apparatus 200 can further determine that the current playing progress of the video B is 5 min. The display apparatus 200 queries the corresponding relationship between the playing progress of the video B and the time point stored in the PVR video file, but does not determine the corresponding relationship including 5 min. Therefore, the display apparatus 200 can determine that no time point is set in the current playing progress, and further insert a time point b2 (that is, create a corresponding relationship b2 between 5 min and time point b2) in response to the time point request, store the corresponding relationship b2 into the PVR video file, and display the time point b2 at 5 min on the progress bar 1302 as shown by ⑤ in FIG. 24.

S1702: in response to a cutting command from the user, cutting a video clip from a second video according to a time point group when the second video contains a time point meeting a preset condition.

If the user sets the time point based on the recording interface of the first video or the playback interface of the first video, the user needs to firstly enter the video cutting interface and then instruct the display apparatus 200 to perform a cutting operation. For example, the user sends a first command to the display apparatus 200 to instruct the display apparatus 200 to display a video processing interface, and the video processing interface includes options for all videos in the PVR video file. The user selects a second video based on these options and sends a second command to the display apparatus 200 based on the cut option in the video processing interface, to instruct the display apparatus 200 to display the video cutting interface. The video cutting interface includes options for all second videos and a cut option. The user sends the cutting command to the display apparatus 200 based on the cut option on the video cutting interface, to instruct the display apparatus 200 to perform the cutting operation on each second video.

If the user sets the time point based on the video cutting interface, the user can directly input the cutting command to the display apparatus 200 based on the cut option in the video cutting interface after setting the time points for all second videos, to instruct the display apparatus 200 to perform the cutting operation on each second video.

In response to the cutting command, the display apparatus 200 performs the cutting operation on each second video in a preset order. The preset order may be the order in which the user selects the second videos, or the order in which the second videos are stored in the PVR video file, or the order of the second videos in the video list.

When performing the cutting operation on each second video, the display apparatus 200 cuts the corresponding video clip from the second video when the second video contains a time point meeting the preset condition. The preset condition that the second video needs to meet includes: the number of time points is greater than 0 and is an even number, and the duration of the second video is greater than a duration threshold. Here, the fact that the number of time points is greater than 0 and is an even number can ensure that there is a time point basis for cutting video clips, and the even number of time points can respectively form a time point group to accurately correspond to each video clip. The time point group includes two adjacent time points, and the time points in each time point group do not overlap. The previous time point in the time point group corresponds to the start time point of the video clip to be cut, and the later time point in the time point group corresponds to the end time point of the video clip to be cut. The fact that the duration of the second video is greater than the duration threshold can ensure the quality of the cut video clip, that is, the cut video clip contains the certain content (guaranteed by the duration), thereby ensuring the user's experience when playing back the video clip.

Figure 25:
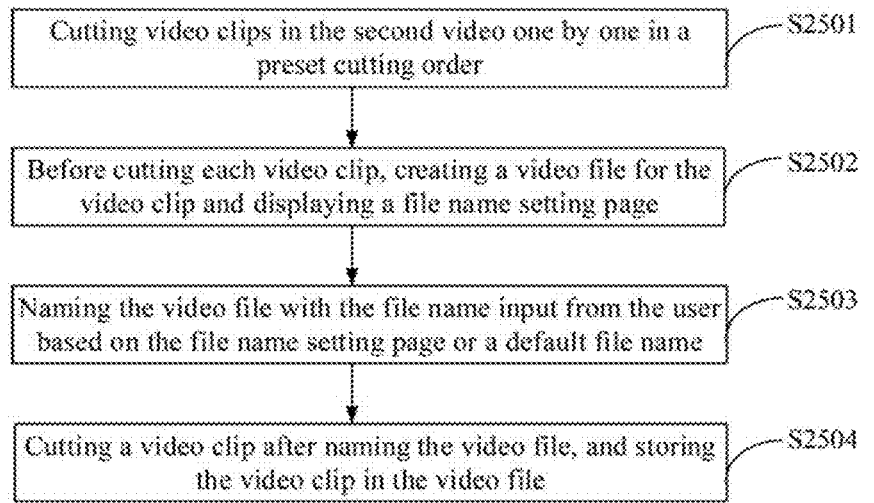
FIG. 25 is a flowchart of cutting a video clip in the display apparatus according to an embodiment of the disclosure.

The display apparatus 200 can cut a video clip according to the process shown in FIG. 25. The specific steps are as follows.

S2501: cutting video clips in the second video one by one in a preset cutting order.

The preset cutting order is the order in which the display apparatus 200 performs the cutting operation on each second video, and can refer to the above preset order, which will not be described again here.

S2502: before cutting each video clip, creating a video file for the video clip and displaying a file name setting page.

Before a video clip is cut, a video file for storing the video clip is firstly created, and the video file is stored in the PVR video file. When the video file is created, the file name setting page is displayed on the video processing interface, where the file name setting page is used for the user to input a file name for the created video file.

S2503: naming the video file with the file name input from the user based on the file name setting page or a default file name.

The user can set the file name according to the personal preference, the clip content, the cutting order, etc. After the user inputs and confirms the file name, the display apparatus 200 will name the video file with the file name.

The default file name is displayed in the file name setting page before the user inputs the file name. If the user directly sends a confirmation command without inputting the file name, the display apparatus 200 will name the video file with the default file name.

S2504: cutting a video clip after naming the video file, and storing the video clip in the video file.

After the video file is named, the creation process of the video file is completed. The display apparatus 200 cuts the corresponding video clip, and stores the cut video clip in the video file. In this case, the file name of the video file is equivalent to the name of the video clip.

After the display apparatus 200 performs the cutting operation on the second video, the display apparatus 200 updates and displays the options in the video list based on all the video files stored in the PVR video file. In this case, the options in the video list not only include options for all first videos, but also include options for video clips. Here, the arrangement order of the options in the video list may be: the options for all first videos are displayed together and the options for all video clips are displayed together, and the options for the first videos are displayed in front of or behind of the options for the video clips; or, the options for the first videos are displayed together with the options for the video clips belonging to the first videos.

Figure 26:
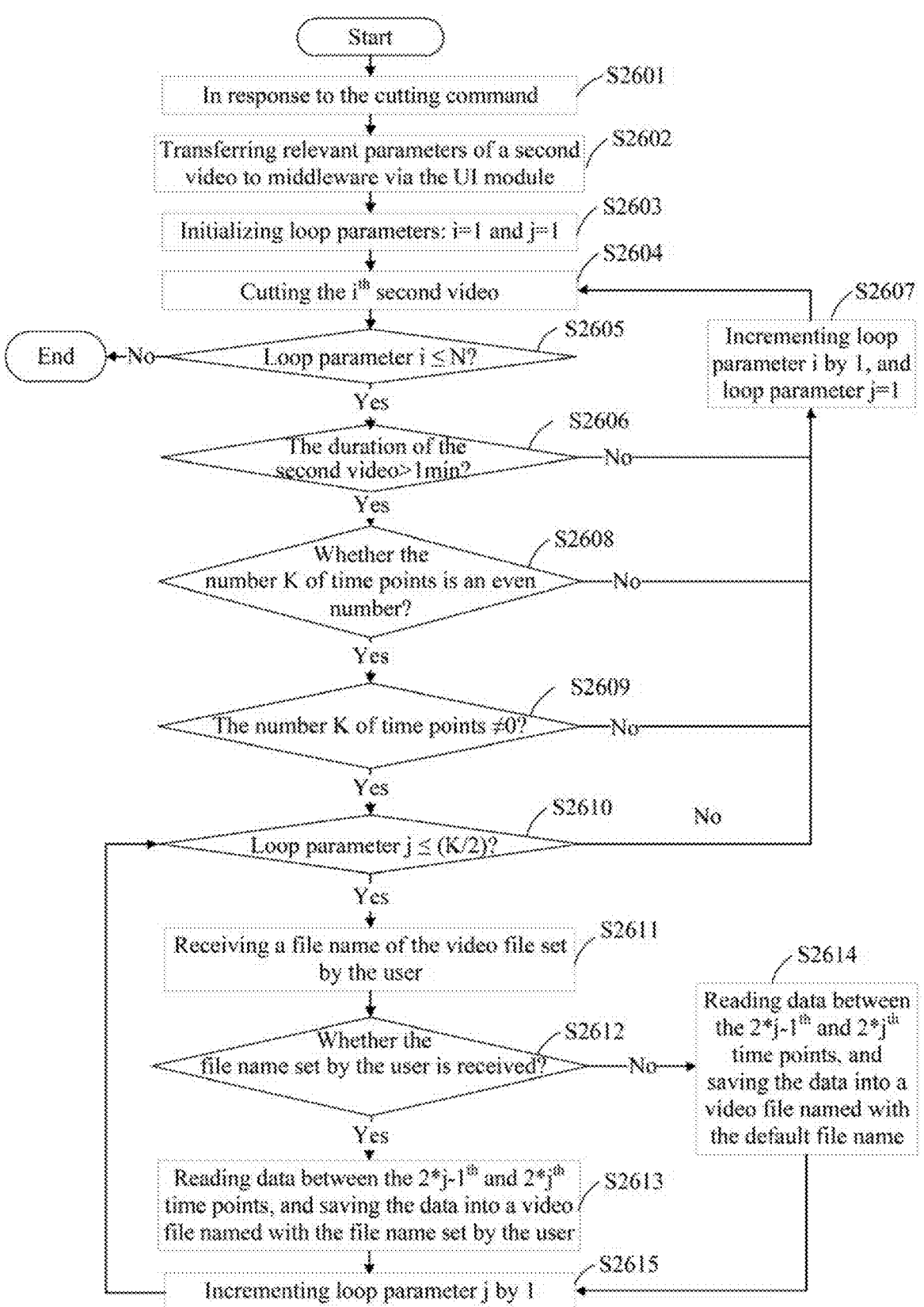
FIG. 26 is a flowchart of cutting a video clip in the display apparatus according to an embodiment of the disclosure.

The process of cutting the second video by the display apparatus 200 will be exemplarily illustrated with reference to the flowchart shown in FIG. 26. The display apparatus 200 displays the video processing interface as shown by ① in FIG. 27 (the same as ① in FIG. 24). The user sends a second command to the display apparatus 200 based on the Cut option. The display apparatus 200 displays the video cutting interface as shown by ② in FIG. 27 in response to the second command, where the video cutting interface includes a progress bar 1601 of the video A, a progress bar 1602 of the video B, and a progress bar 1603 of the video C. Here, the time point a1 and time point a2 are displayed on the progress bar 1601; the time point b1, time point b2 and time point b3 are displayed on the progress bar 1602; and the time point c1 and time point c2 are displayed on the progress bar 1603. The user sends a cutting command to the display apparatus 200 based on the Cut option on the video cutting interface. The display apparatus 200 transfers the relevant parameters of a video selected by the user (i.e., second video) to the middleware via a UI module (S2602) in response to the cutting command (S2601). The relevant parameters include the number of second videos, the number of time points in a second video, and the duration of the second video, etc. N is the number of second videos, and K is the number of time points in each second video. When both N and K are not 0, it means that the user has selected a plurality of second videos, and each second video is provided with a plurality of time points. Correspondingly, multiple cutting operations are required, and the multiple cutting operations can be controlled through loop parameters to control the cutting process. The display apparatus 200 sets and initializes the loop parameters, assuming that the loop parameters are i and j (S2603), and both are initialized to 1.

The cutting operation is performed on the $i^{th}$ second video (S2604), and it is determined whether i≤N (S2605). If i is greater than N, it means that the number i of the second videos processed currently is greater than the total number of second videos, and the cutting operation ends. If i is less than or equal to N, then it is determined whether the duration of the $i^{th}$ second video is greater than a duration threshold. Taking the duration threshold as 1 min as an example, it is determined whether the duration of the second video is greater than 1 min (S2606). If the duration of the second video is less than or equal to the duration threshold, the S2607 is performed: setting j=1, incrementing the loop parameter i by 1, and continuing to process the $i+1^{th}$ second video. If the duration of the second video is greater than the duration threshold, it is determined whether the number K of time points set in the $i^{th}$ second video is an even number (S2608). If K is not an even number, the $i^{th}$ second video will not be cut, that is, the S2607 is performed: setting j=1, incrementing the loop parameter i by 1, and continuing to process the $i+1^{th}$ second video. If K is an even number, it is determined whether K is not 0 (S2609). If K=0, the $i^{th}$ second video will not be cut, that is, the S2607 is performed: setting j=1, incrementing the loop parameter i by 1, and continuing to process the $i+1^{th}$ second video. If K is not 0, it is determined whether the loop parameter j is less than or equal to K/2 (S2610), where K/2 represents the number of video clips that need to be cut in the second video. For example, 10 time points are set in the $i^{th}$ second video, and then 5 video clips need to be cut in the second video. If j>K/2, it means that the cutting operation of the $i^{th}$ second video has been completed. The S2607 is performed: setting j=1, incrementing the loop parameter i by 1, and then continuing to process the $i+1^{th}$ second video. If j≤K/2, the $j^{th}$ video clip in the $i^{th}$ second video is about to be cut, and the display apparatus 200 displays the file name setting page shown by ③ in FIG. 27. The file name setting page includes an input box 1604 that displays a default file name, such as File0001. The user can input a file name of a video file based on the input box 1604, the UI module may receive the file name of the video file set by the user (S2611). After S2611, the UI module can determine whether the file name set by the user is received (S2612). If the UI module determines that the file name set by the user is received, the S2613 is performed: reading a video clip between the $2*j-1^{th}$ and $2*j^{th}$ time points, and saving the video clip into a video file named with the file name set by the user. If the UI module determines that the file name set by the user has not been received, the S2614 is performed: reading a video clip between the $2*j-1^{th}$ and $2*j^{th}$ time points, and saving the video clip into a video file named with the default file name. After the S2613 and the S2614, the display apparatus 200 may perform S2615: incrementing the loop parameter j by 1, and executing the cutting and storage of each video clip in a loop.

Based on the above process, the video clip a between time point a1 and time point a2 is cut from the video A and stored in a video file named AAAA. No video clip is cut from the video B. The video clip c between time point c1 and time point c2 is cut from the video C and stored in a video file named CCCC. In this case, the PVR video file includes a video file A corresponding to the video A, a video file B corresponding to the video B, a video file C corresponding to the video C, the video file AAAA, and the video file CCCC. The display apparatus 200 updates the video list in the video processing interface based on the PVR video file, as shown by ④ in FIG. 27. The video list is added with options for the video clip a and the video clip c.

After cutting the video clips, the user can select the video clips for playback based on the video list. Therefore, the user can directly watch the interesting parts of the video without having to adjust the playing progress to watch the interesting parts in the video, effectively simplifying the user's playback operation and improve the user's playback experience.

S1703: in response to a splicing command from the user, splicing a third video according to a specified order to obtain a spliced video, and displaying a splicing point on a progress bar of the spliced video.

The user can input the splicing command based on the video processing interface. For example, the user can select the video clips to be spliced, that is, the third video, based on the video processing interface, and input the splicing command to the display apparatus 200 based on the splicing option on the video processing interface. In response to the splicing command, the display apparatus 200 splices all video clips nose to tail, to obtain a spliced video. Here, for two adjacent video clips, the end time point of the previous video clip coincides with or is same as the start time point of the latter video clip, to obtain a splicing point. The duration of the splicing point in the spliced video corresponds to the total duration of the previous video clip and the video clips to be spliced before the previous video clip. A correspondence between the splicing point and the duration (the playing progress of the spliced video) is created and stored in a splicing file.

The video clips to be spliced can belong to the same first video, so the spliced video only includes video clips cut from the same video. The user can play these video clips continuously by playing back the spliced video. The video clips to be spliced can belong to different first videos, so the spliced video includes video clips cut from different videos. By playing back the spliced video, the user can play these video clips continuously without having to switch among a plurality of videos.

Also, the display apparatus 200 displays the splicing points on the progress bar of the spliced video, so as to indicate all video clips making up the spliced video to the user through these splicing points.

The display apparatus 200 can splice video clips according to the process shown in FIG. 28. The specific steps are as follows.

S2801: determining the number of video clips to be spliced in response to a splicing command.

If the number of video clips to be spliced is equal to 1, it means that there is only one video clip and no splicing is required. If the number of video clips to be spliced is greater than 1, it means that there are a plurality of video clips that need to be spliced.

S2802: if the number is determined as a positive integer greater than 1, creating a splicing file.

If the number of video clips to be spliced is determined as a positive integer greater than 1, it means that splicing is required. In this case, the display apparatus 200 creates a splicing file for storing the spliced video. The spliced video is stored in the PVR video file. Therefore, after the splicing file is created, a corresponding option for the spliced video will also be displayed in the video list.

S2803: copying the video clips to be spliced into the splicing file, and splicing the video clips to be spliced in a specified order.

The video clips to be spliced are copied into the splicing file for splicing. The display apparatus 200 splices the video clips to be spliced in the specified order. The specified order may be the order in which the user selects the video clips to be spliced, the order of the video clips to be spliced in the video list, or the order in which the video clips to be spliced are stored in the PVR video file. Here, the specified order corresponds to the playback order of the video clips to be spliced, that is, the video clip earlier in the specified order is also earlier in the playback order.

S2804: deleting the video files after completing the splicing of all the video clips to be spliced.

After the spliced video is obtained, the video files storing the video clips to be spliced are deleted to clear the memory space occupied by these video files in the display apparatus 200.

Figure 29:
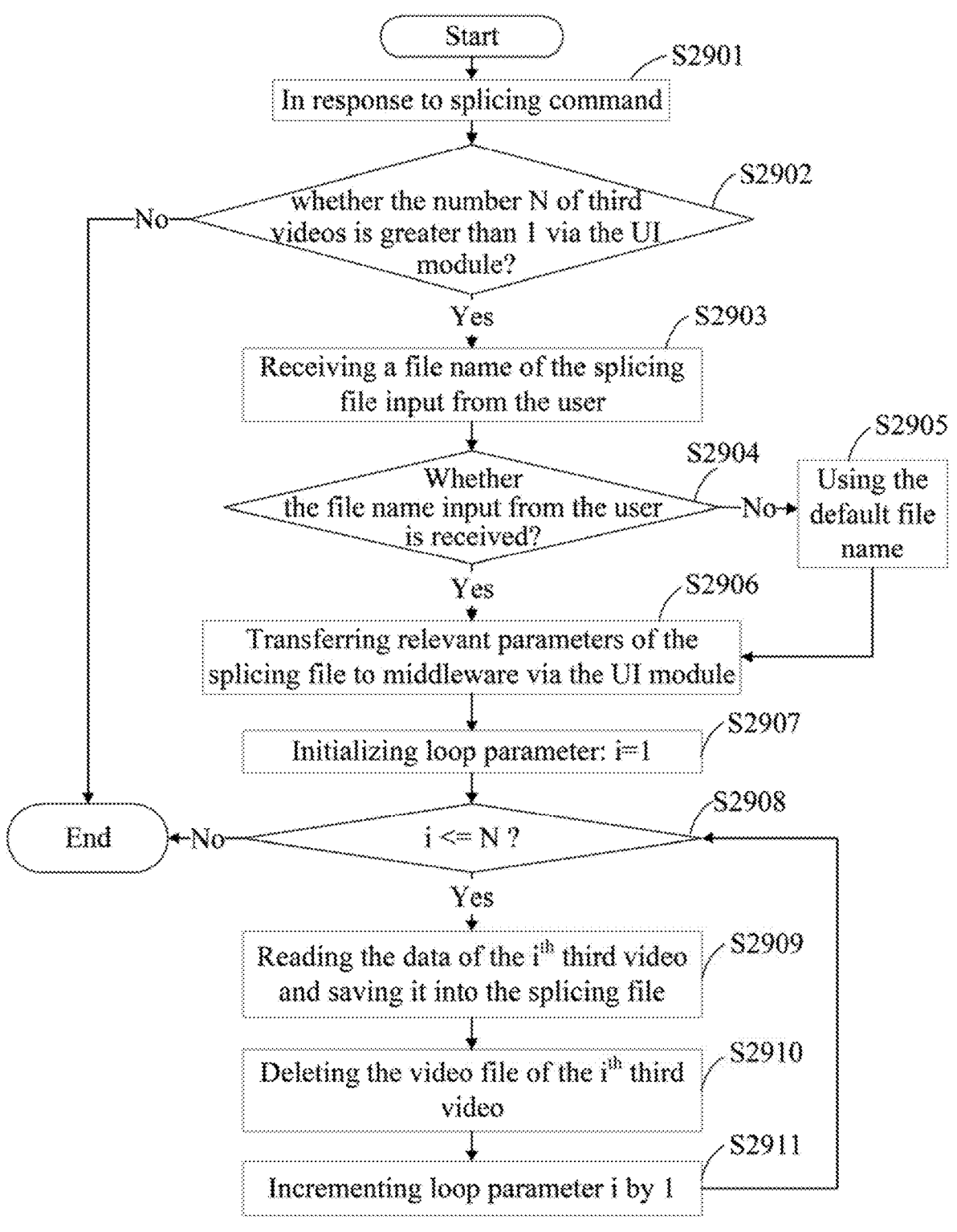
FIG. 29 is a flowchart of splicing video clips in the display apparatus according to an embodiment of the disclosure.
Figure 30:
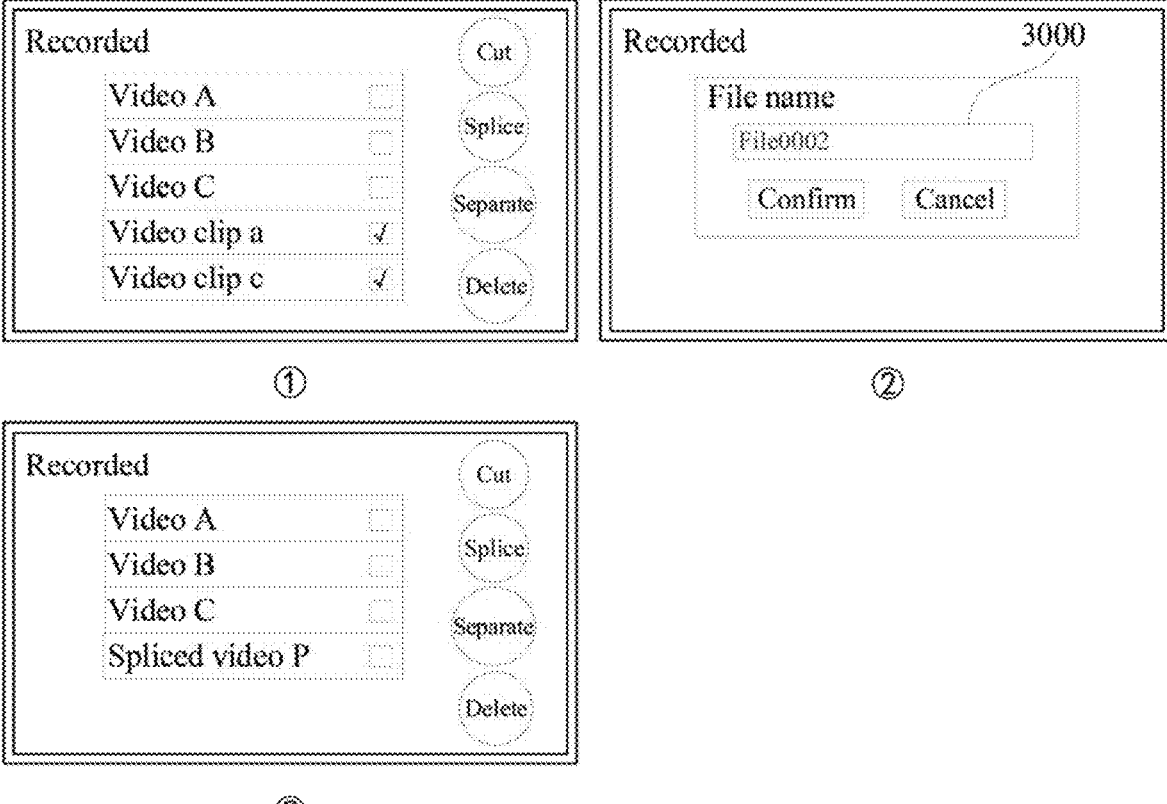
FIG. 30 is a schematic diagram of the interface change when the display apparatus splices video clips according to an embodiment of the disclosure.

The process of splicing the third video by the display apparatus 200 will be illustrated with reference to the flowchart shown in FIG. 29. The display apparatus 200 displays the video processing interface as shown by ① in FIG. 30 (the same as ④ in FIG. 27). The user sends a selection command to the display apparatus 200 based on the options for video clip a and video clip c (the mark "√" is used to indicate selection). The video clip a and the video clip c are third videos. The user sends a splicing command to the display apparatus 200 based on the splicing option in the video processing interface. In response to the splicing command (S2901), the display apparatus 200 determines whether the number N of third videos is greater than 1 via the UI module (S2902). If N≤1, it means that the user has selected 0 or 1 third video, and no splicing operation is required. The splicing process ends. If N>1, it means that the number of third videos selected by the user is at least 2. The display apparatus 200 creates a splicing file, and the UI module displays the file name setting page shown by ② in FIG. 30 (similar to the file name setting page shown by ③ in FIG. 27). The file name setting page includes an input box 3000 that displays a default file name, such as File0002. The user can input a file name defined by the user based on the input box 3000, and then the UI module can receive the file name of the splicing file input from the user (S2903). The UI module can determine whether the file name set by the user is received (S2904). If the UI module determines that the file name set by the user is received, the splicing file is named with this file name. If the UI module determines that the file name set by the user has not been received, the splicing file is named with the default file name (S2905).

After completing the file naming, the UI module transfers the relevant parameters of the third video to the middleware (S2906). The relevant parameters of the third video include: the number of the third video, the file name of the video file, the file name of the splicing file, the duration of the third video, etc. After S2906, S2907 may also be performed: initializing the loop parameter i=1 to control the splicing process, where i represents the $i^{th}$ third video (or video file) currently being spliced. It is determined whether i is less than or equal to the number N of third videos (S2908). If i>N, it means that all third videos have been spliced, and the splicing process ends. If i≤N, the data of the third video numbered i is read and saved into the splicing file (S2909), that is, the data of the third video is written into the splicing file for saving, and after the writing operation is completed, the video file of the third video numbered i is deleted (S2910). The loop parameter i is incremented by 1 (S2911), and the flow goes to S2908 to execute the reading, writing, and deletion operations of each third video in a loop.

Based on the above process, the video clip a and the video clip c are spliced to obtain a spliced video, and the spliced video is stored into a video file named PPPP. Here, the splicing position of the video clip a and the video clip c corresponds to a splicing point P. The splicing file PPPP is stored into the PVR video file, and the video file AAAA and the video file CCCC are deleted from the PVR video file. In this case, the PVR video file includes the video file A, the video file B, the video file C, and the splicing file PPPP. The display apparatus 200 updates the video list in the video processing interface based on the PVR video file, as shown by ③ in FIG. 30. The video list includes options for video A, video B, video C and spliced video P. In some embodiments, the third video indicated by the user may also include the first video, that is, the complete video and the video clips are spliced together. The number of first videos may be one or more, and the number of video clips to be spliced may also be one or more. Here, if there are a plurality of video clips to be spliced, the video clips to be spliced may belong to the same first video, or may belong to different first videos. The process of splicing the first video and video clips by the display apparatus is similar to S2801 to S2804, and will not be described again here.

In some embodiments, the user can directly splice the complete first videos to obtain a spliced video without inserting a time point into the first video or cutting the first video. Therefore, by playing back the spliced video, the user can play the first videos continuously without having to switch playing.

Figure 31:
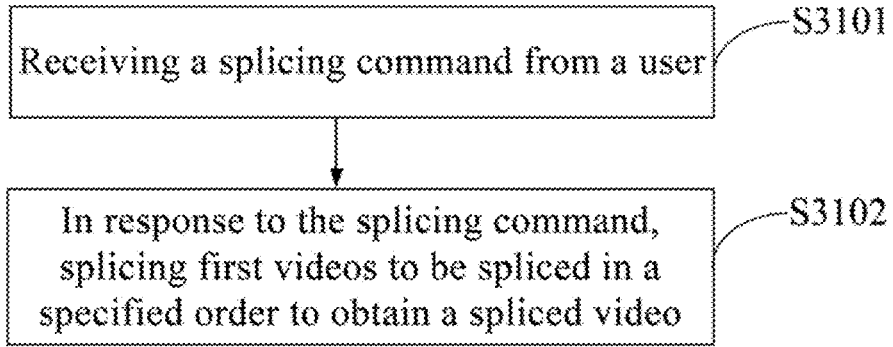
FIG. 31 is a flowchart of splicing the first video in the display apparatus according to an embodiment of the disclosure.

The display apparatus 200 can splice the first videos according to the process shown in FIG. 31. The specific steps are as follows.

S3101: receiving a splicing command from a user.

The splicing command indicates a first video(s) to be spliced.

S3102: in response to the splicing command, splicing first videos to be spliced in a specified order to obtain a spliced video.

S3101 to S3102 are similar to the above S2801 to S2804, and will not be described again here. Here, it should be noted that the original video file is not deleted after the spliced video is obtained, so as to retain each first video.

Figure 32:
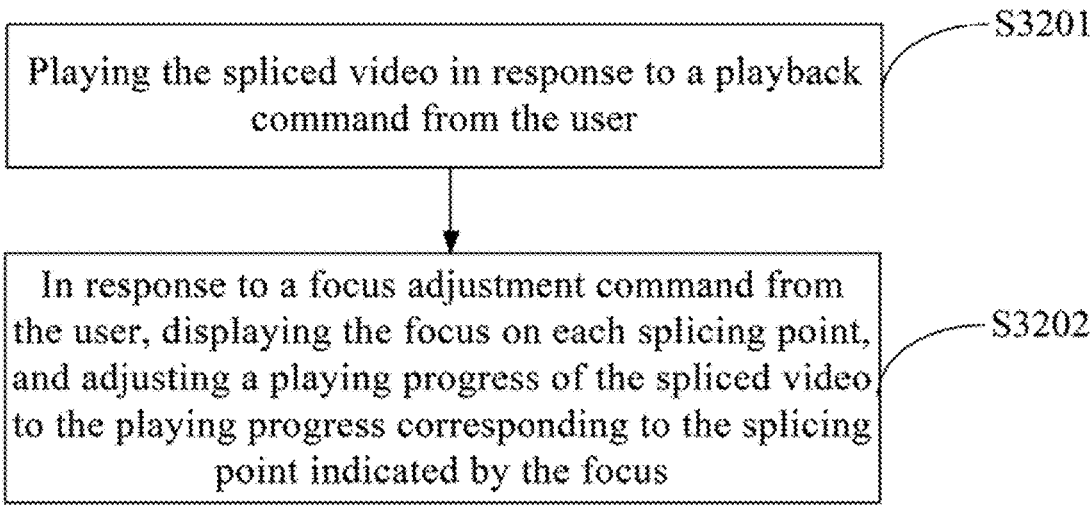
FIG. 32 is a flowchart of playing back a spliced video in the display apparatus according to an embodiment of the disclosure.

Based on the above embodiments, after obtaining the spliced video, the display apparatus 200 can play back the spliced video. The display apparatus 200 can play back the spliced video according to the process shown in FIG. 32. The specific steps are as follows.

S3201: playing the spliced video in response to a playback command from the user.

Figure 33:
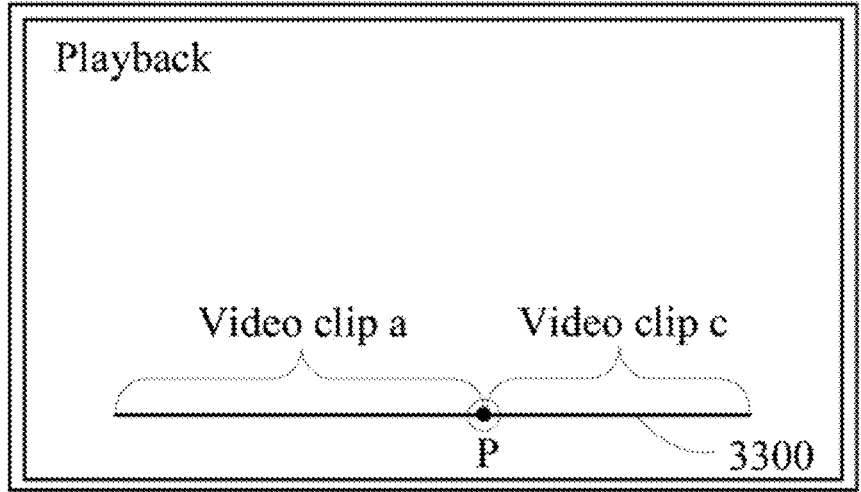
FIG. 33 is a schematic diagram of a playback interface according to an embodiment of the disclosure.

The user can send the playback command to the display apparatus 200 based on the option for the spliced video in the video list, and the display apparatus 200 plays the spliced video in response to the playback command. When playing the spliced video, the display apparatus 200 can display a playback interface as shown in FIG. 33. The playback interface includes a progress bar 3300 of the spliced video. The splicing point of the spliced video is displayed on the progress bar 3300. Taking the spliced video being the spliced video of video clip a and video clip c mentioned above as an example, the splicing point P is displayed on the progress bar 3300.

S3202: in response to a focus adjustment command from the user, displaying the focus on each splicing point, and adjusting a playing progress of the spliced video to the playing progress corresponding to the splicing point indicated by the focus.

The user can send the focus adjustment command to the display apparatus 200 based on a direction key of the remote control, and the display apparatus 200 moves the focus among splicing points for display in response to the focus adjustment command. For example, when the display apparatus 200 displays the playback interface, the focus is firstly displayed at the starting position of the progress bar. If the user sends the focus adjustment command to the display apparatus 200 based on the right key of the remote control, the display apparatus 200 displays the focus on each splicing point on the right starting from the first splicing point on the progress bar in response to the focus adjustment command. The display apparatus 200 adjusts the playing progress of the spliced video to the playing progress corresponding to the splicing point indicated by the focus.

The process of playing back the spliced video on the display apparatus 200 will be described with reference to the flowchart shown in FIG. 34. The display apparatus 200 displays the playback interface of the spliced video, and the user sends a focus adjustment command to the display apparatus 200 through the direction key (such as the left or right key) on the remote control. In response to the focus adjustment command (S3401), the display apparatus 200 determines whether the number K of splicing points in the spliced video is greater than 0 (S3402). If the number K of splicing points≤0, the display apparatus 200 enters the normal playback process (S3403), that is, the spliced video is actually a video without splicing, and the display apparatus 200 plays the video from beginning to end. If K>0, obtaining the splicing point corresponding to the focus adjustment command (S3404) and the playing progress corresponding to the splicing point. It is determined whether the playing progress corresponding to the splicing point is greater than or equal to the duration of the spliced video (S3405); if so, the playback exits (S3406); if not, jumping to the playing progress of this splicing point for playing the spliced video (S3407).

Taking the playback interface shown in FIG. 33 as an example, the display apparatus 200 displays the focus at the starting position of the progress bar 3300 or may hide the focus when displaying the playback interface. If the user sends a focus adjustment command to the display apparatus 200 to instruct the focus to move rightwards, the display apparatus 200 obtains the next splicing point, that is, the first splicing point (i.e., the splicing point P) on the progress bar 3300, in response to the focus adjustment command. The display apparatus 200 directly displays the focus on the splicing point P (the focus is shown by a hollow circle), and starts playing the spliced video from the playing progress indicated by the splicing point P. If the user continues to send the focus adjustment command to the display apparatus 200 to instruct the focus to move rightwards, the display apparatus 200 does not identify the focus, which means the duration corresponding to the position of the splicing point being greater than or equal to the duration of the spliced video, and exits the playback of the spliced video. As a result, the user can quickly switch among video clips by the direction keys on the remote control.

Based on the above embodiments, the user can split the spliced video, to restore the spliced video to the first videos and/or video clips making up the spliced video, and reuse these first videos and/or video clips to recombine them into other spliced videos.

Figures 34, 35:
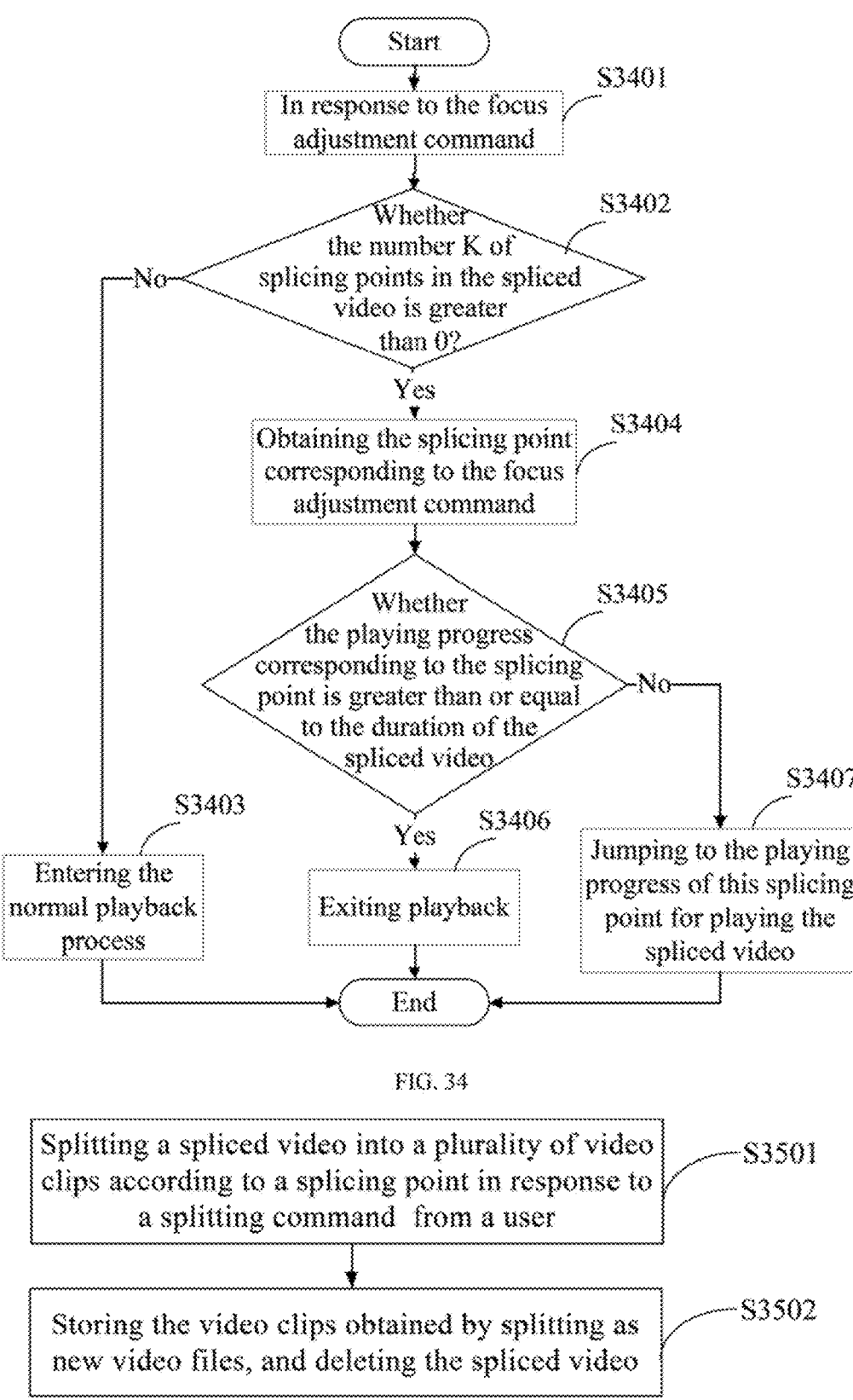
FIG. 34 is a flowchart of playing back a spliced video in the display apparatus according to an embodiment of the disclosure.
FIG. 35 is a flowchart of splitting a spliced video in the display apparatus according to an embodiment of the disclosure.

The display apparatus 200 can split the spliced video according to the process shown in FIG. 35. The specific steps are as follows.

S3501: splitting a spliced video into a plurality of video clips according to a splicing point in response to a splitting command from a user.

The spliced video is split according to the splicing point, to split the spliced video into the third videos corresponding to the spliced video. For example, if the spliced video includes first videos, these first videos will be obtained after splitting. If the spliced video includes video clips, these video clips will be obtained after splitting. If the spliced video includes first videos and video clips, these first videos and video clips are obtained after splitting.

S3502: storing the video clips obtained by splitting as new video files, and deleting the spliced video.

If the videos obtained after splitting are first videos, there is no need to store them as new video files. If the videos obtained after splitting are video clips, the video clips are stored as new video files, that is, the video clips are stored separately again. After each split video is stored, the splicing file corresponding to the spliced video is deleted to prevent the splicing file from occupying the memory space of the display apparatus 200.

Figure 36:
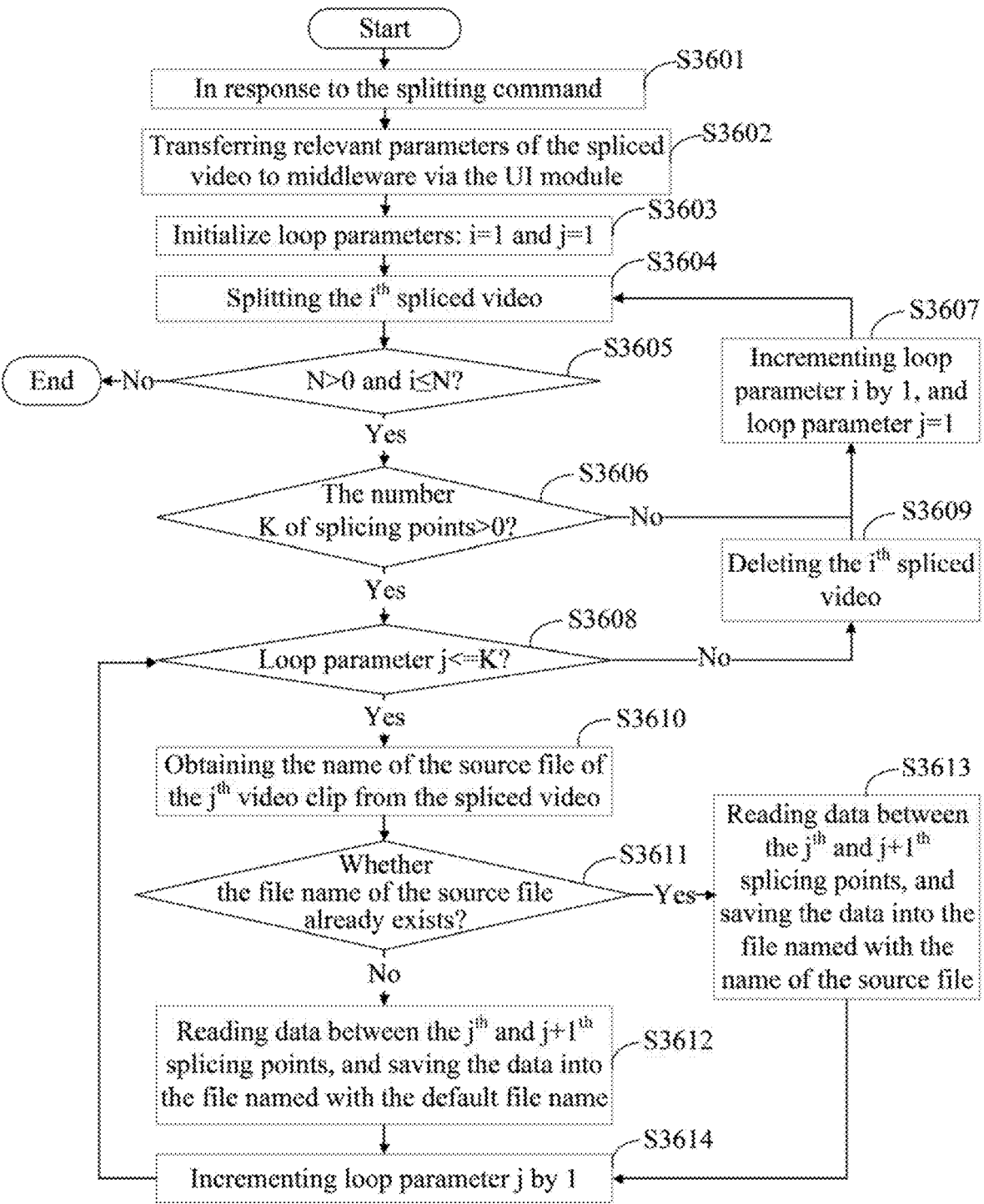
FIG. 36 is a flowchart of splitting a spliced video in the display apparatus according to an embodiment of the disclosure.

The display apparatus 200 can split the spliced video according to the process shown in FIG. 36. The user sends a selection command to the display apparatus 200 based on the option for the spliced video P in the video processing interface as shown by ① in FIG. 37, and sends a split command to the display apparatus 200 based on the split option. In response to the splitting command (S3601), the display apparatus 200 transfers the relevant parameters of the spliced video selected by the user to the middleware through the UI module (S3602). The relevant parameters of the spliced video include: the number N of spliced videos, the number K of splicing points in the spliced video, etc. When both N and K are not 0, it means that the user may have selected a plurality of spliced videos, and each spliced video includes a plurality of splicing points, so that multiple splitting operations may be required. Therefore, the splitting process needs to be controlled through loop parameters. Therefore, before the split operation is started, the loop parameters need to be initialized. Assume that the loop parameters are i and j, and both are initialized to 1, that is, the loop parameters are initialized as i=1 and j=1 (S3603). The splitting operation is performed on the $i^{th}$ spliced video (S3604), and it is determined whether N is greater than 0 and whether i is less than or equal to N (S3605). If N≤0 or i>N, the splitting process ends. If N>0 and i≤N, it is determined whether the number K of splicing points of the $i^{th}$ spliced video is greater than 0 (S3606). If K≤0, meaning that the $i^{th}$ spliced video has no splicing point and is not a spliced video and the splitting operation cannot be performed, then the splitting process of the $i^{th}$ spliced video ends, and S3607 is performed: incrementing the loop parameter i by 1, and continuing to perform the splitting operation on the $i+1^{th}$ spliced video. If K>0, it is determined whether the loop parameter j is less than or equal to the number K of splicing points (S3608), where the loop parameter j represents the $j^{th}$ video clip being split, and the splitting operation of the $j^{th}$ video clip in the $i^{th}$ spliced video is about to start. If j>K, meaning that the splitting operation of the $i^{th}$ spliced video has been completed, the splicing file of the $i^{th}$ spliced video is deleted (S3609), and S3607 is performed: incrementing the loop parameter i by 1, and continuing to perform the splitting process of the $i+1^{th}$ spliced video. If j≤K, the file name of the source file (the video file before splicing) of the $j^{th}$ video clip is obtained from the spliced video (S3610), and then it is determined whether the file name of the source file already exists (S3611). If not, the file name of the new video file is set to the default file name, and the data between the $j^{th}$ and $j+1^{th}$ splicing points is read and saved into the file named with the default file name (S3612); if so, the file name of the source file is still used to name the new video file, and the data between the $j^{th}$ and $j+1^{th}$ splicing points is read and saved into the new video file (S3613). After S3612, S3614 is performed: incrementing the loop parameter j by 1, and then returning to S3608 to perform the splitting operation of the $j+1^{th}$ video clip in the $i^{th}$ spliced video.

The video clips a and c can be obtained after the spliced video P is split according to the splicing point P. The video clip a is stored in the video file AAAA, the video clip c is stored in the video file CCCC, and the splicing file PPPP is deleted. In this case, the PVR video file includes the video file A, the video file B, the video file C, the video file AAAA and the video file CCCC. The display apparatus 200 updates the video list in the video processing interface based on the PVR video file, as shown by ② in FIG. 37 (same as ④ in FIG. 27).

In some embodiments, the user can also recombine some of the video clips and/or first videos to obtain a new spliced video after splitting the spliced video based on the above process, thereby realizing the effect of deleting the video clips and/or first videos from the original spliced video.

In some embodiments, the user can also recombine all or portion of the video clips and/or first videos in the original spliced video and other video clips and/or first videos into a new spliced video after splitting the spliced video based on the above process, thereby realizing the effect of adding the video clips and/or first videos to the original spliced video.

In some embodiments, the user can also delete the video clips and/or first videos that are no longer used based on the delete option in the video processing interface.

Furthermore, the embodiments of the disclosure also provide a display control method for a display apparatus. The display control method based on the display apparatus according to the embodiments of the disclosure will be described in detail below with reference to FIG. 38.

The display control method of the embodiments of the disclosure can be applied to the display apparatus 200 as shown in FIG. 1. The display apparatus can include a display, a communicating device, and at least one processor in connection with the display 260 and the communicating device 220 respectively, as shown in FIG. 2.

According to the display control method according to the embodiments, when controlling the display to display an interface from a first channel, the display apparatus can turn on the first time-shift function of the display apparatus and record the content from the first channel in response to a first turning-on operation input from a user, and then determines whether a second application supports the background time-shift function in response to a first switching operation input from the user through the communicating device. If the second application supports the background time-shift function, the display is controlled to display an interface of the second application and record the content from the first channel based on the first switching operation. The user can switch applications according to his own requirements without interrupting the time-shift function of the application before switching, so the recording continuity of the channel interface of the application before switching can be ensured. When the user switches back to the original application, the continuity of the viewed content can be ensured by viewing the recorded video, thus improving the user's viewing experience.

As shown in FIG. 38, at least one processor in the controller is configured to perform the following steps S3801 to S3802.

S3801: while displaying an interface from a first channel on a display of the display apparatus, in response to a first turning-on operation input from a user, turning on a first time-shift function of the display apparatus and recording the content from the first channel.

In the embodiments, the time-shift function is a way to watch live broadcast programs. Using the time-shift function, the at least one processor can record the live program firstly and then cache the live broadcast program. When the user needs to watch, the recorded video can be read from the cache to view, realizing the function of recording while playing. Here, the first time-shift function is a mode that supports the time-shift function, and corresponds to the strong time-shift mode of the display apparatus. When the display apparatus turns on a plurality of applications, the applications running in the background of the operating system in the display apparatus can be controlled to continue running the time-shift function.

The first channel may be a channel corresponding to the aforementioned scheduled recording task. The interface from the first channel refers to an interface displayed when the first channel is played, and may be the playing interface of the TV program from the first channel, or a user interface from the first channel, such as the home page of the first channel, etc. The first turning-on operation refers to an operation input from the user to turn on the first time-shift function of the display apparatus, and may be triggered for selecting a corresponding function turning-on control (such as the option "permanent time-shift function") in the user interface on the display. That is, when the user chooses to select the option "permanent time-shift function", the at least one processor detects that the user inputs the first turning-on operation. Alternatively, the first turning-on operation can also be triggered by the user through a control device external to the display, such as a mouse, a keyboard, a remote control, etc. For example, when the user uses the remote control to control the display to display the "system settings" interface and then choose to select the option "permanent time-shift function" in this interface, the at least one processor detects that the user inputs the first turning-on operation. Alternatively, the user can also input a voice command through the voice control function on a remote control or in the display apparatus, to generate the first turning-on operation.

When controlling the display to display the interface from the first channel, the display apparatus may receive the first turning-on operation input from the user, and turn on the first time-shift function of the display apparatus in response to the operation when the display apparatus receives the first turning-on operation input from the user. While turning on the first time-shift function, the at least one processor can start recording the content from the first channel.

It should be noted that, when the at least one processor records the content from the first channel, the interface from the first channel may be displayed or may not be displayed on the display. That is to say, the at least one processor can record the content from the first channel by recording the display screen of the display or by obtaining the media file of the interface from the first channel.

S3802: in response to a first switching operation input from the user through a communicating device, if a second application supports a background time-shift function, displaying an interface of the second application on the display and recording the content from the first channel based on the first switching operation.

Here, the first switching operation is used to switch the display apparatus from a first application to the second application, and the first application includes the first channel. That is to say, the first application may include a plurality of channels, and the first channel may be any channel in the first application. The first switching operation can be used to switch the display apparatus from any channel in the first application to the second application, such as any video classification page or a certain video playing page of the second application. Correspondingly, the first switching operation can also be generated by selecting a program switching control in user interface on the display or through a control device external to the display, such as a keyboard, a remote control, etc.; or the user can also input a voice command through the voice control function on the remote control or in the display apparatus, to generate the first switching operation.

The background time-shift function refers to the time-shift function that runs when the application is running in the background of the operating system, not in the frontend. In this case, although the application is running in the background, the application can also perform the time-shift function. For example, the display apparatus can still record the content from the application running in the background.

When the display apparatus receives the first switching operation input from the user through the communicating device, it means that the user wants to switch the first channel in the first application to a certain interface in the second application. In order to determine whether the first channel can continue running the time-shift function, the at least one processor can control the display to display an interface of the second application in response to the first switching operation input from the user when the second application supports the background time-shift function. Meanwhile, since the second application supports the background time-shift function, the display apparatus runs in the background time-shift state while displaying the interface of the second application, that is, the first application runs in the background, and the at least one processor can continue to perform the time-shift function regarding the first application, that is, record the content from the first channel.

In some embodiments, the at least one processor may determine whether the second application supports the background time-shift function when receiving the first switching operation input from the user.

The at least one processor may determine, based on the types of the first application and the second application, whether the first application can run the background time-shift function while running in the background when the second application is running in the foreground, to determine whether the second application can support the background time-shift function. If the first application can run the background time-shift function while running in the background when the second application is running in the foreground, the second application supports the background time-shift function. Otherwise, the second application does not support the background time-shift function.

Here, the types of the first application and the second application can be configured by the developer during the development process, and can include a type that supports the background time-shift function and a type that does not support the background time-shift function.

Through the above S3801 to S3802, the display apparatus can control the first application to run in the background when receiving the first switching operation input from the user, and can run the time-shift function of the first application in the background when the second application supports the background time-shift function, without affecting its own time-shift function when the first application switches to run in the background. The content from the first channel is recorded through the time-shift function of the first application, so that the user can watch the image(s) from the first channel when the first application switches to run in the background through the recorded video when the user needs to watch the first channel, thus ensuring the continuity of the user's viewing of the video. Also, the user can watch the recorded video at any time without being restricted by the play time of the program, thus improving the flexibility and convenience of video viewing, and meeting the user's personalized viewing requirement.

In some embodiments, the recorded video of the interface from the first channel can be stored in the built-in hard disk of the display apparatus, or other storage device connected with the display apparatus, such as a USB memory, a hard disk, etc. In other words, the display apparatus can support the time-shift function of the built-in hard disk or the time-shift function of the external storage device.

The user can set the maximum storage space for recorded videos. For example, based on the type of the storage device of the display apparatus, the minimum storage space of the built-in hard disk can be set to 10G, and the storage space of the external storage device can be set to 20G or directly set to the maximum storage space of the storage device. When the storage space of the display apparatus occupied by the recorded videos reaches the maximum, the loop recording can be turned on, that is, the earliest stored recorded video can be deleted to store the latest recorded video in the chronological order of the recorded videos.

In some embodiments, referring to FIG. 39, the at least one processor may further perform the following method.

S3901: if the second application does not support the background time-shift function, determining a time-shift state of the display apparatus before receiving the first switching operation input from the user.

Here, the time-shift state includes an implicit time-shift state and an explicit time-shift state. The implicit time-shift state means that the time-shift function is in the implicit state, and the user will not perceive that the display apparatus is running the time-shift function; and the explicit time-shift state means that the time-shift function is in the explicit state, and the user can learn that the display apparatus is running the time-shift function through a time-shift information bar or a time-shift window in the interface displayed on the display. As shown in FIG. 40, a time-shift window 610 may also be displayed on the interface 600 corresponding to the first channel, and the time-shift window 610 may also include: the name of the played video, the progress bar of the played video, the elapsed playing duration, the total playing duration, the recording key, the fast forward key, the rewind key and other options. In the explicit time-shift state, the user can also control the interface being displayed on the display to be time-shifted through a control option in the time-shift information bar or the time-shift window. For example, the user may drag the progress bar in the time-shift window to adjust the playing progress of the video played on the display, or may control the video played on the display to fast-forward by selecting the fast forward key in the time-shift window.

If the second application does not support the background time-shift function, it means that the first application cannot continue to run the time-shift function in the background after switching to the second application. In this case, in order to facilitate application switching, the at least one processor can further determine the time-shift state of the display apparatus before receiving the first switching operation input from the user is the implicit time-shift state or the explicit time-shift state.

For example, the at least one processor can determine whether the display apparatus is in the implicit time-shift state or the explicit time-shift state based on whether the time-shift information bar or time-shift window is displayed on the display before the display apparatus receives the first switching operation input from the user. When no time-shift information bar or time-shift window is displayed on the display, it can be determined that the display apparatus is in the implicit time-shift state. When the time-shift information bar or the time-shift window is presented on the display, it can be determined that the display apparatus is in the explicit time-shift state.

S3902: if the display apparatus is in the implicit time-shift state before receiving the first switching operation input from the user, controlling the display to display the interface of the second application, and stopping recording the content from the first channel.

If the display apparatus is in the implicit time-shifting state before receiving the first switching operation input from the user, it means that the display apparatus is performing the time-shifting operation (that is, recording the content from the first channel) before the user inputs the first switching operation, but the user is not aware of this recording process.

Therefore, when receiving the first switching operation input from the user, the at least one processor can control the display to directly display the interface of the second application, to realize application switching. Meanwhile, the user does not know that the display apparatus is recording the content from the first channel before receiving the first switching operation, so the display apparatus can automatically turn off the time shift of the interface from the first channel in the first application, that is, stop recording the content from the first channel, while switching to the interface of the second application.

In this way, when the first application runs in the implicit time-shift state, if the first switching operation input from the user is received, the display apparatus can directly switch to the second application in response to the first switching operation, to realize application switching.

S3903: if the display apparatus is in the explicit time-shift state before receiving the first switching operation input from the user, displaying a prompt information for stopping time shift on the display of the display apparatus; and, in response to an operation of confirmation for stopping the time shift input from the user through the prompt informa-tion from stopping the time shift, displaying the interface of the second application on the display, and stopping record-ing the content from the first channel.

If the display apparatus is in the explicit time-shift state before receiving the first switching operation from the user, it means that the display apparatus is performing the time-shifting operation (that is, recording the content from the first channel) before the user inputs the first switching operation, and the user can also control the interface from the first channel to perform time-shifting (such as fast forward, pause, etc.) through the time-shift information bar or the time-shift window displayed on the display. That is to say, in the explicit time-shift state, the user can know that the time-shift function is running through the time-shift infor-mation bar or the time-shift window displayed on the display.

In this case, when receiving the first switching operation from the user, the at least one processor can control the display to display the prompt information for stopping the time shift, so that the user can determine whether to turn off the time-shift function of the first application and switch to the second application.

Figure 41:
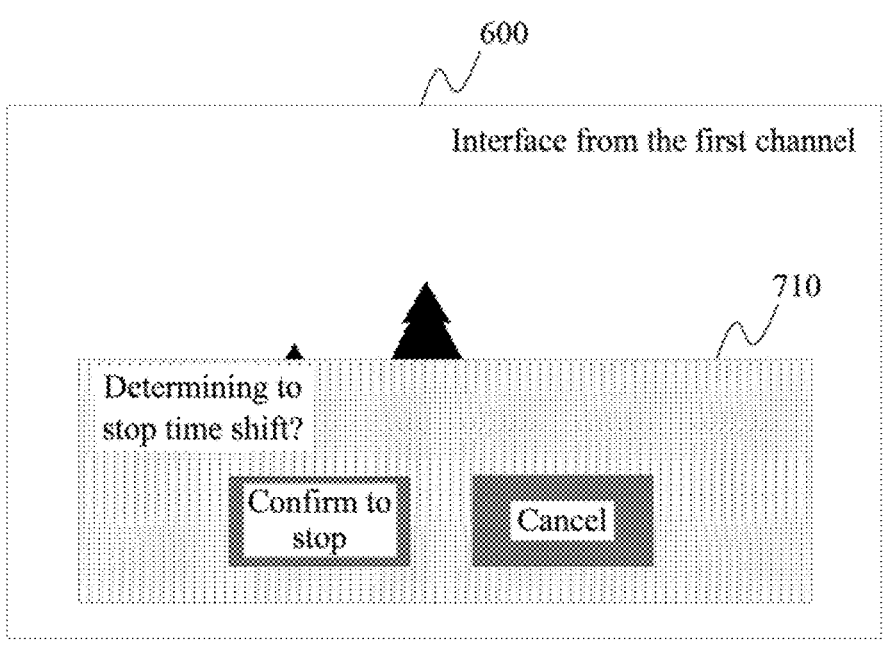
FIG. 41 is a schematic diagram of another display interface according to an embodiment of the disclosure.

Referring to FIG. 41, the prompt information 710 for stopping the time shift can be displayed in the interface from the first channel, where the prompt information 710 for stopping the time shift also includes two options "confirm to stop" and "cancel". If the user selects the option "confirm to stop", it indicates that the user enters the operation of confirming to stop the time shift through the prompt infor-mation for stopping the time shift, and then the at least one processor can control the display to display the interface of the second application and simultaneously stop recording the content from the first channel, that is, close the time shift of the interface from the first channel in the first application. If the user selects the option "cancel", it indicates that the user does not want to stop the time shift of the interface from the first channel in the first application. In this case, the program switching can be canceled to continue the time shift of the interface from the first channel in the first application.

In some embodiments, after controlling the display to display the interface of the second application and recording the interface from the first channel based on the first switch-ing operation, the at least one processor may further perform the following method:

in response to a second switching operation input from the user through the communicating device, controlling the display to switch back to the interface from the first channel, and recording the content from the first chan-nel.

Here, the second switching operation may be used to switch the display apparatus from the second application back to the first application. That is, after the user switches the interface from the first channel in the first application to the second application through the first switching operation, the user can further switch the second application back to the interface from the first channel in the first application through the second switching operation. Correspondingly, the second switching operation can also be generated by selecting a program switching control in the display image on the display or by the use through a control device (such as a keyboard, a remote control, etc.) external to the display, or the user can also issue the second switching operation through the voice control function on a control device or in the display apparatus.

When the user issues the second switching operation, the at least one processor may receive the second switching operation input from the user through the communicating device. In order to switch back to the first application, the at least one processor may control the display to switch back to the first application and present an interface from the first channel, so that the user can continue watching the first channel. Meanwhile, the display apparatus can enable the time-shift function of the first application to record the content from the first channel.

In this way, after the user switches the second application back to the first application, the user can continue to run the time-shift function of the first application to record the content from the first channel, realizing the continuation of the time-shift function.

Figure 42:
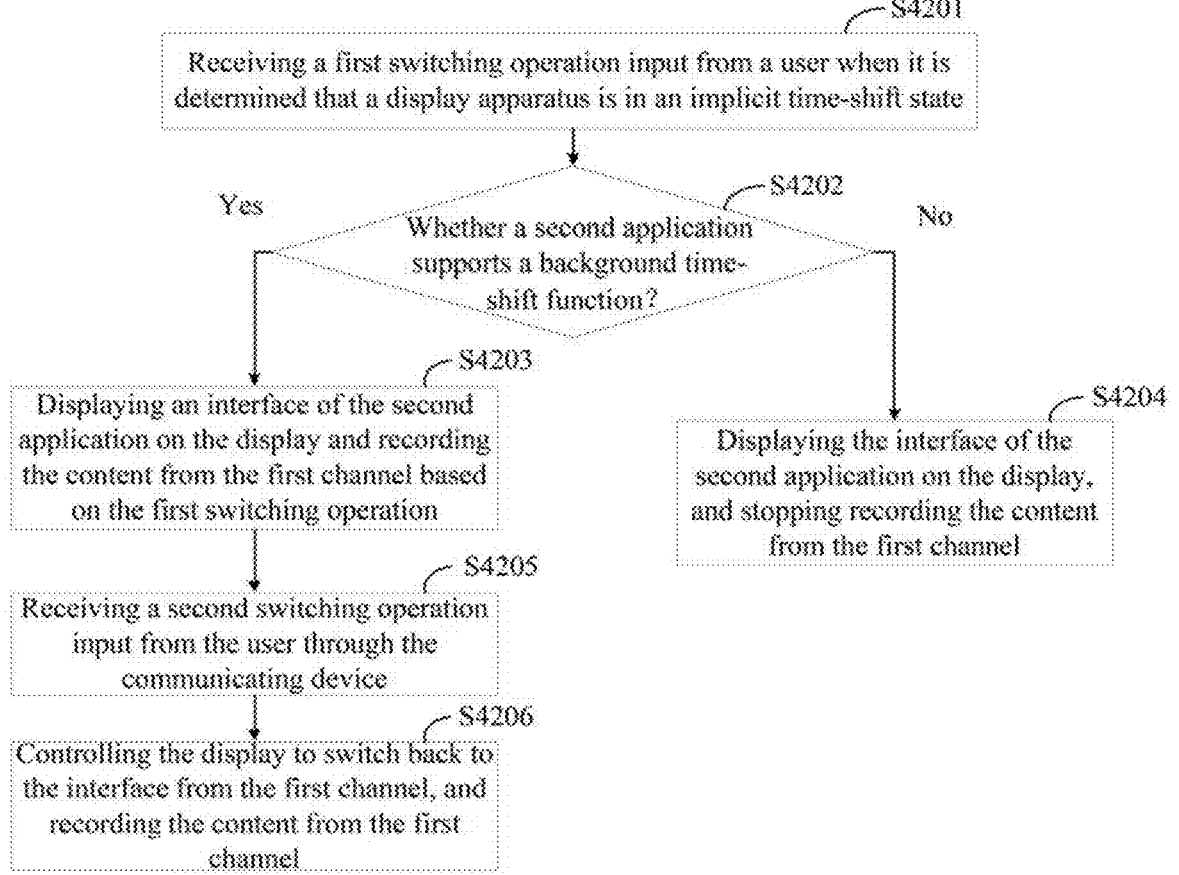
FIG. 42 is a flowchart of yet another display control method according to an embodiment of the disclosure.

FIG. 42 shows a flowchart of yet another display control method according to the embodiments. As shown in FIG. 42, this method may include the following steps.

S4201: receiving a first switching operation input from a user when it is determined that a display apparatus is in an implicit time-shift state.

S4202: determining whether a second application supports a background time-shift function in response to receiving the first switching operation input from the user. If so, S4203 is performed; if not, S4204 is performed.

When the display apparatus is in the implicit time-shift state, if the first switching operation input from the user is received, it indicates that the user has triggered application switching. In this case, it can be further determined whether the second application to which the user wants to switch supports the background time-shift function.

If the second application supports the background time-shift function, it means that the first application can run the time-shift function while running in the background when the display switches the first application to the background and switches the second application to the foreground. Therefore, the S4203 may be performed, to control the display to display the interface of the second application and record the content from the first channel based on the first switching operation. On the contrary, if the second application does not support the background time-shift function, it means that the first application cannot run the time-shift function while running in the background when the display switches the first application to the background and switches the second application to the foreground. Therefore, the S4204 may be performed so that the display can switch to the interface of the second application and stop the time-shift function of the interface from the first channel in the first application, that is, stop recording the content from the first channel.

S4203: displaying an interface of the second application on the display and recording the content from the first channel based on the first switching operation.

When displaying the interface of the second application on the display and recording the interface from the first channel, the display apparatus is in the background time-shift state, that is, the first application runs the time-shift function while running in the background.

S4204: displaying the interface of the second application on the display, and stopping recording the content from the first channel.

S4205: receiving a second switching operation input from the user through the communicating device.

When receiving the second switching operation input from the user, it indicates that the user wants to switch the second application back to the interface from the first channel in the first application.

S4206: controlling the display to switch back to the interface from the first channel, and recording the content from the first channel.

When receiving the second switching operation, in order to facilitate the user to continue viewing the interface from the first channel, the at least one processor may control the display to switch back to the interface from the first channel in the first application, and continue to record the content from the first channel. In this case, the display apparatus is in the implicit time-shift state, that is, the first application is running in the foreground and runs the time-shift function, but the user does not perceive that the time-shift function is in the running state.

In some embodiments, after switching back to the interface from the first channel through the above steps S4201 to S4206, the at least one processor may clear the previously recorded video of the interfaces from the first channel, and restart recording the content from the first channel when switching back to the interfaces from the first channel. Alternatively, the at least one processor may also retain the previously recorded video of the interfaces from the first channel, and continue to record the content from the first channel when switching back to an interface from the first channel.

FIG. 43 is a flowchart of yet another display control method according to an embodiment of the disclosure. As shown in FIG. 43, this method may include the following steps.

S4301: receiving a first switching operation input from a user when it is determined that a display apparatus is in an explicit time-shift state.

S4302: determining whether a second application supports a background time-shift function when receiving the first switching operation input from the user. If so, S4303 is performed; if not, S4304 is performed.

When the display apparatus is in the explicit time-shift state, if the first switching operation input from the user is received, it indicates that the user has triggered application switching. In this case, it can be further determined whether the second application to which the user wants to switch supports the background time-shift function.

If the second application supports the background time-shift function, it means that the first application can run the time-shift function while running in the background when the display switches the first application to the background and switches the second application to the foreground. Therefore, the S4303 may be performed, to display the interface(s) from the second application on the display and record the content from the first channel based on the first switching operation. On the contrary, if the second application does not support the background time-shift function, it means that the first application cannot run the time-shift function while running in the background when the display switches the first application to the background and switches the second application to the foreground. Therefore, the S4304 may be performed to display the prompt information for stopping the time shift on the display, so that the user can choose whether to stop the time-shift function of the interface(s) from the first channel in the first application through the prompt information for stopping time shift, to switch to an interface from the second application.

S4303: displaying an interface of the second application on the display and recording the content from the first channel based on the first switching operation.

When displaying an interface of the second application on the display and recording the content from the first channel, the display apparatus is in the background time-shift state, that is, the first application runs the time-shift function while running in the background.

S4304: displaying the prompt information for stopping time shift on the display.

S4305: in response to an operation of confirming to stop time shift input from the user through the prompt information for stopping the time shift, displaying the interface of the second application on the display, and stopping recording the content from the first channel.

When the user selects the operation of confirming to stop time shift through the prompt information for stopping the time shift, it indicates that the user wants to switch to the second application, and the display apparatus does not need to continue executing the time-shift function of the first application. Therefore, the at least one processor can control the display to display the interface of the second application and stop the time-shift function of the first application, that is, stop recording the content from the first channel.

S4306: receiving a second switching operation input from the user through the communicating device.

When receiving the second switching operation input from the user, it indicates that the user wants to switch the second application back to an interface from the first channel in the first application.

S4307: controlling the display to switch back to the interface from the first channel, and recording the content from the first channel.

Correspondingly, when receiving the second switching operation, in order to facilitate the user to continue viewing the interface(s) from the first channel, the at least one processor may control the display to switch back to the interface(s) from the first channel in the first application, and continue to record the content from the first channel. In this case, the display apparatus is in the implicit time-shift state, that is, the first application is running in the foreground and runs the time-shift function, but the user does not perceive that the time-shift function is in the running state.

In some embodiments, after switching back to the interface(s) from the first channel through the above S4301 to S4307, the at least one processor may retain the previously recorded video of the interface(s) from the first channel, and continue to record the content from the first channel when switching back to the interface(s) from the first channel. Alternatively, the at least one processor may also clear the previously recorded video of the interface(s) from the first channel, and restart recording the content from the first channel when switching back to the interface(s) from the first channel.

Through the above method, the at least one processor can cause the display apparatus to switch between different applications according to the switching operation from the user, and enter different time-shift states, so the continuity of the time-shift function between different applications can be realized without forcibly stopping the time-shift function of the application before switching, and the user is not required to perform too many operations. This method can not only meet the operational requirement of the user, but also ensure the continuity of the time-shift function of the application, and provide convenience for the user to subsequently watch the recorded video generated through the time-shift function.

In some embodiments, referring to FIG. 44, the at least one processor may further perform the following method.

S4401: while displaying an interface from the first channel on the display, in response to a second turning-on operation input from the user, turning on a second time-shift function of the display apparatus.

The second time-shift function is another mode that supports the time-shift function, and corresponds to a weak time-shift mode of the display apparatus. When the display apparatus switches the displayed interface, the user can choose whether to stop the time shift to complete switching. The second turning-on operation refers to an operation input from the user to turn on the second time-shift function of the display apparatus, and may be generated by selecting a corresponding function turning-on control in the user interface on the display. For example, when the user chooses to close the option "Permanent time-shift function", the at least one processor detects that the user inputs the second turning-on operation. Alternatively, the second turning-on operation can also be generated through a control device (such as a keyboard, a remote control, etc.) outside the display apparatus. For example, when the user uses the remote control to control the display to show the "system settings" interface and then choose to close the option "permanent time-shift function" in this interface, the at least one processor detects that the user inputs the second turning-on operation.

When displaying an interface from the first channel on the display, if the second turning-on operation input from the user is received, it means that the display apparatus has turned on the weak time-shift mode, that is, the second time-shift function has been turned on.

S4402: displaying the interface from the first channel on the display in response to a time-shift control operation input from the user.

Here, the time-shift control operation refers to an operation input from the user to display the time-shift information bar or the time-shift window. The user can select a corresponding time-shift option in the interface displayed on the display, such as the "time-shift bar", to generate the time-shift control operation; or the user also can input a key operation through a control device outside the display to generate the time-shift control operation.

After the display apparatus turns on the second time-shift function, the display apparatus enters the normal time-shift state. In this case, if the time-shift control operation input from the user is received, it means that the user needs to view the time-shift state of the first application or control an interface from the first channel to perform time-shifting. In this case, the at least one processor can control the first application to enter the explicit time-shift state. In this case, the time-shift information bar or the time-shift window can be presented on the display, and the user can control the interface from the first channel to perform time-shifting through the time-shift information bar or the time-shift window. Taking the interface from the first channel being a video playing interface as an example, the user can check the playing progress of the video through the time-shift information bar or the time-shift window, and can also control the played video to fast forward, etc., through the operation options on the interface.

Through the above method, the second time-shift function of the display apparatus can be turned on in response to the second turning-on operation input from the user, and then the display is controlled to enter the explicit time-shift state when receiving the time-shift control operation input from the user, thus achieving the explicit time-shift control based on the time-shift function of the display apparatus, and facilitating the user to view the time-shift state of the application.

In some embodiments, in the normal time-shift state, if the user needs to switch applications or switch channels within the same application, the prompt information for stopping the time shift can be displayed when the switching operation input from the user is received. When the user chooses to stop the time-shift function of the previous application or the previous channel through the prompt information for stopping the time shift, the next application or the next channel is switched to. On the contrary, if the user chooses to continue the time-shift function of the previous application or the previous channel through the prompt information for stopping time shift or there is no operation is performed within a preset time period during which the prompt information for stopping the time shift is displayed, the time-shift function of the previous application or the previous channel can be continued without switching the application or the channel.

In other words, depending on whether the display apparatus turns on the first time-shift function or the second time-shift function, the method for controlling the time shift used by the display apparatus will be different. When the display apparatus turns on the first time-shift function and switches applications, if the application to be switched to supports the background time-shift function, the display apparatus can directly switch to the corresponding application in the implicit time-shift state without asking the user. When the display apparatus turns on the second time-shift function, regardless of switching applications or switching channels within the same application, the user needs to be asked whether the time shift of the previous time-shift interface needs to be stopped. The next application or the next channel can be switched to only when determining that the time-shift function of the previous time-shift interface needs to be stopped. It should be understood that the first time-shift function and the second time-shift function cannot be turned on at the same time.

Through the two ways, the user can choose to turn on the strong time-shift mode or the weak time-shift mode to control the display apparatus to perform different time shift control methods, to achieve the flexible switching of time shift control and make it more adapt to the user's requirements.

In order to facilitate the user to check the time-shift state of the first channel and control the interface of the first channel to perform time-shifting, in some embodiments, after turning on the first time-shift function of the display apparatus is turned on and recording the control from the first channel in response to the first turning-on operation input from the user, the at least one processor can also control the interface from the first channel to display in response to a time-shift control operation input from the user.

As mentioned above, the time-shift control operation refers to an operation input from the user to display the time-shift information bar or the time-shift window. Exemplarily, the time-shift control operation may include operations for controlling the content displayed on the interface to be paused, played, fast forwarded, rewound, double-speed played, etc.

When the user inputs a time-shift control operation through the time-shift information bar or the time-shift window, the at least one processor may control the interface from the first channel presented on the display to display in response to the time-shift control operation. For example, when the user inputs a playing pause operation through the time-shift information bar, the at least one processor may control the video in the interface from the first channel to pause in response to this operation.

As a result, the user can control the interface on the display to perform the corresponding time-shift operation when the display enters the explicit time-shift state, so that the user can flexibly choose the video playing mode.

In some embodiments, the interface from the first channel may be used to play a program of the first channel that is any program from the first channel. The time-shift control operation may include at least one of a fast forward operation, a rewind operation, a playing pause operation and a playing operation. Therefore, as shown in FIG. 45, the at least one processor may further perform any one of the following S4501 to S4504.

S4501: controlling the program of the first channel to fast forward in response to the fast forward operation input from the user.

S4502: controlling the program of the first channel to rewind in response to the rewind operation input from the user.

For example, when the user selects and presses the "fast forward" key in the time-shift information bar on an interface from the first channel, the at least one processor can control the program of first channel to fast forward. As time during which the user presses the "fast forward" key is continuously increased, the speed used to fast forward the program of the first channel can be continuously increased. When the user selects and presses the "rewind" key in the time-shift information bar on an interface from the first channel, the at least one processor can control the program of the first channel to rewind. As the time during which the user presses the "rewind" key is continuously increased, the rewind speed of the program of the first channel can be continuously increased.

S4503: controlling the program of the first channel to pause in response to a pause operation input from the user.

S4504: controlling the program of the first channel to start being played in response to a play operation input from the user.

For example, when the user selects the "playing pause" key on an interface from the first channel, the at least one processor may control the program of the first channel to pause. When the user selects the "playing pause" key again, the at least one processor may control the program of the first channel to continue to play.

Through the above method, the user can control the program of the first channel to be played when the display is in the explicit time-shift state, thus meeting the diverse video playing requirements of the user, and providing convenience for the user to view.

In some embodiments, referring to FIG. 46, the at least one processor may further perform the following method.

S4601: displaying the prompt information for stopping the time shift in response to a third switching operation input from the user through the communicating device, where the third switching operation is used to switch the display apparatus from the first channel to a second channel.

Here, the first application may include the second channel. That is to say, the second channel is another channel different from the first channel in the first application. The third switching operation may be used to switch the display apparatus from one channel to another channel in the same application. That is, the user may switch from the first channel to the second channel in the first application through the third switching operation. Correspondingly, the third switching operation can also be generated by selecting a program switching control in the user interface on the display or through a control device, such as a keyboard, a remote control, etc., external to the display.

When the third switching operation input from the user is received, it indicates that the user has issued the channel switching operation. The channel switching corresponds to the same application, and the same application can only support the time shift of one channel. Therefore, in order to facilitate the user to switch channels, the at least one processor can control the display to show the prompt information for stopping the time shift, so that the user can choose whether to stop the time shift of the first channel to switch to the second channel.

S4602: stopping recording content from a first channel in response to an operation of confirming to stop time shift input from the user through the prompt information for stopping the time shift, and switching to an interface from the second channel.

When the user inputs the operation of confirming to stop time shift through the prompt information for stopping the time shift, it can be determined that the user decides to switch channels. In this case, the at least one processor can control the display apparatus to stop recording the content from the first channel and switch to the interface from the second channel, so that the user can conveniently choose whether to stop the time shift of one channel to switch to another channel when switching channels.

After switching to another channel, the at least one processor can automatically start the time shift of another channel, that is, start recording the content from another channel.

Figure 47:
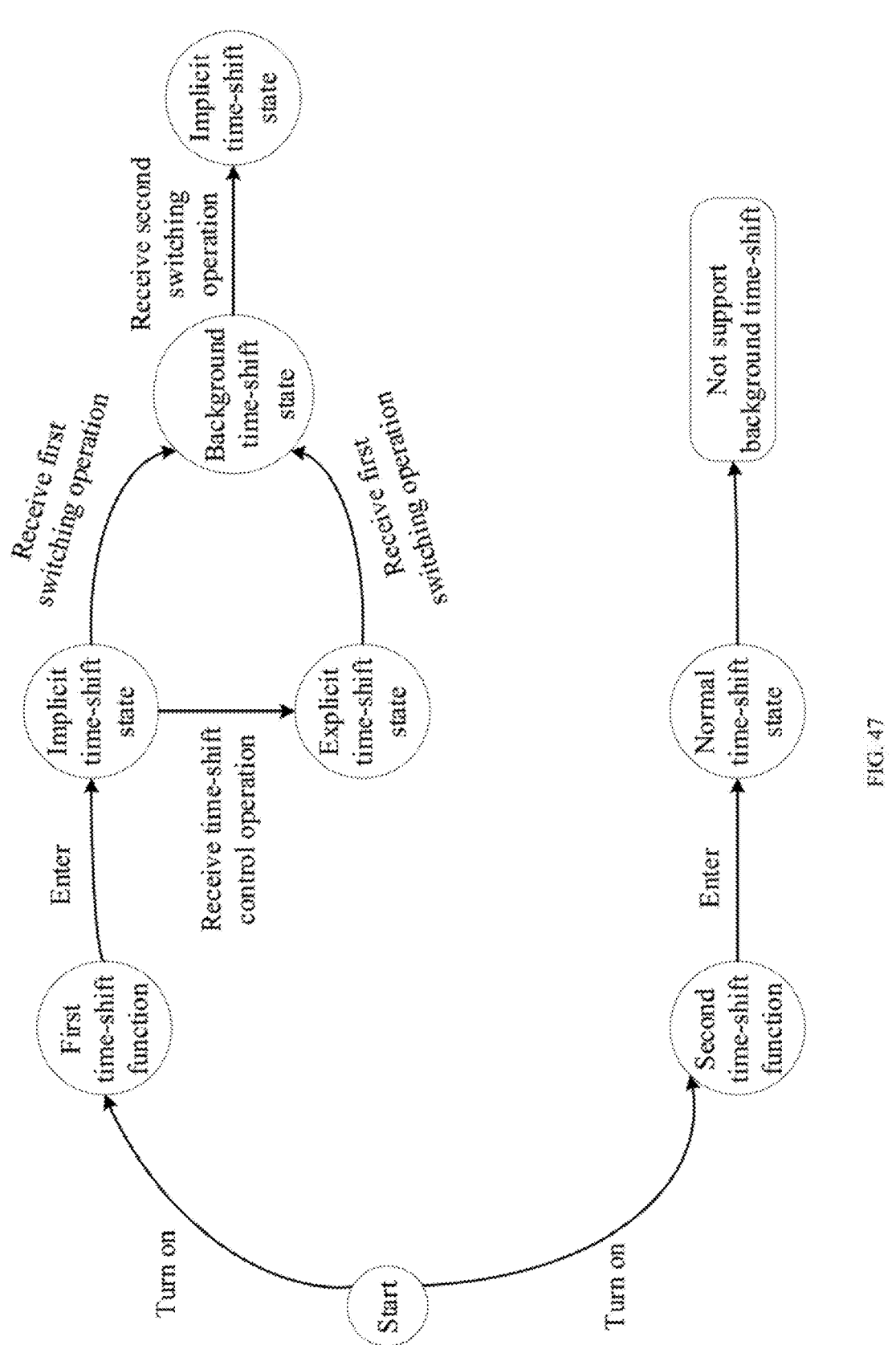
FIG. 47 is a schematic diagram of switching the time-shift state according to an embodiment of the disclosure.

FIG. 47 is a schematic diagram of switching the time-shift state according to an embodiment of the disclosure. As shown in FIG. 47, the user can turn on the first time-shift function of the display apparatus through the first turning-on operation and turn on the second time-shift function of the display apparatus through the second turning-on operation, the first time-shift function corresponds to the strong time-shift function of the display apparatus, and the second time-shift function corresponds to the weak time-shift function of the display apparatus.

It is assumed that the application currently run and displayed on the display apparatus is the first application. When the first time-shift function is turned on, if the display apparatus is in the implicit time-shift state, that is, the first application is performing time-shifting but the user does not perceive this case, then the reception of the first switching operation input from the user indicates that the user wants to switch the first application to the second application. In this case, the at least one processor can control the display apparatus to enter the background time-shift state, that is, the first application runs in the background while running the time-shift function to continue recording the content from the first application, and the second application runs in the foreground and the display displays an interface from the second application. Then, the reception of the second switching operation input from the user indicates that the user wants to switch an interface from the second application back to the first application. In this case, the at least one processor can control the display apparatus to enter the implicit time-shift state, that is, the first application runs in the foreground, the display shows an interface from the first application, and the time-shift function is run simultaneously, to record the content from the first application. In this case, the second application may run in the background or may be closed.

When the display apparatus is in the implicit time-shift state, if the time-shift control operation input from the user is received, the at least one processor can control the display apparatus to enter the explicit time-shift state. In this case, the user can perform a time-shift operation, such as controlling the video interface from the first application to play, pause or fast forward, etc., according to the time-shift information bar or the time-shift window presented on the display. Next, if the first switching operation input from the user is received, the at least one processor can perform the same method for controlling the time-shift to cause the display apparatus to enter the background time-shift state, that is, the first application runs in the background while running the time-shift function to continue recording the content from the first application, and the second application runs in the foreground and the display shows the interface(s) from the second application.

When the second time-shift function is turned on, the display apparatus is in the normal time-shift state, and the normal time-shift state does not support the background time shift. Therefore, when switching applications or channels within the same application, there is a need to stop the time-shift function of the previous application or channel to switch to the next application or the next channel.

In order to facilitate the generation of a recorded video of a live program and facilitate the user to view, in some embodiments, as shown in FIG. 48, the at least one processor may further perform the following method.

S4801: if a scheduled recording time of a target multimedia resource is reached, receiving a recording selection operation from a user through a communicating device.

Here, the target multimedia resource is any multimedia resource from the first application or the second application, and is a multimedia resource scheduled by the user, and may include any one or more of an image, a text, sound, a video, an animation and derivatives. The recording selection operation refers to an operation to confirm recording or cancel recording from a user.

After the user schedules the target multimedia resource, the at least one processor can start a countdown. When the scheduled recording time of the target multimedia resource is reached, the at least one processor can receive the recording selection operation from a user through the communicating device within the next preset time period.

For example, when the scheduled recording time of the target multimedia resource is reached, the at least one processor can control the display to display the recording reminder information. The recording reminder information may include selection controls, such as options for "confirm recording" and "cancel recording". The user can input the recording selection operation by clicking the option "confirm recording" or the option "cancel recording".

S4802: if the recording selection operation indicates to start recording, controlling the display apparatus to stop recording content from the first channel and start recording the target multimedia resource in response to the recording selection operation.

For example, when the user clicks the option "confirm recording" in the recording reminder information, the at least one processor may determine that the recording selection operation indicates to start recording. In this case, the at least one processor may control the display apparatus to stop recording content from the first channel and start recording the target multimedia resource in response to the recording selection operation.

It should be noted that, when the display apparatus is controlled to stop recording the content from the first channel and start recording the target multimedia resource, the display may show the target multimedia resource, or continue to show an interface from the first channel, or simultaneously display the target multimedia resource and an interface from the first channel. For example, the interface from the first channel may be presented on the display in the full-screen manner, and the target multimedia resource may be presented on the display in the form of a small window.

S4803: if the recording selection operation indicates to cancel recording, cancelling the recording of the target multimedia resource to continue recording the content from the first channel.

For example, when the user clicks the option "cancel recording" in the recording reminder information, the at least one processor may determine that the recording selection operation indicates to cancel recording. In this case, the at least one processor may control the display apparatus to continue recording the content from the first channel and cancel the recording of the target multimedia resource in response to the recording selection operation.

In some cases, if the user does not perform any operation within a preset time period, such as 2 minutes from starting to display the recording reminder information, the recording selection operation is a null value, which indicates that the recording selection operation indicates to cancel recording.

Through the above method, the user can schedule the recording of the target multimedia resource in advance according to his own requirements, so as to watch the recorded video of the target multimedia resource when it is convenient to watch, thus providing great convenience to the user.

According to the embodiments of the disclosure, in the process of running the time-shift function, no matter what time-shift state the display apparatus is in, the at least one processor can receive a video viewing operation input from the user on the interface from the application running the time-shift function. When receiving the video viewing operation input from the user, the at least one processor may generate a recorded video of the interface(s) from the corresponding application in response to this operation. Specifically, as shown in FIG. 49, the following method may be included.

S4901: receiving a video viewing operation from a user while an application is running a time-shift function.

When the application is running the time-shift function, the at least one processor can receive a video viewing operation input from the user, regardless of whether the application runs in the foreground or the background. For example, when the user inputs a voice command "I want to watch XX video from XX application" through an external device, it can be determined that the user inputs a video viewing operation for the XX video in the application while the application is running the time-shift function.

S4902: converting cached data of an interface from the application generated by the time-shift function into a recorded video.

When the application runs the time-shift function, content of a corresponding interface, such as the content of the interface displayed on the display when the time-shift function is started, can be recorded, and the cache data can be generated and stored in the memory space of the display apparatus. When receiving the video viewing operation input from the user, the at least one processor may convert the cached data into a recorded video in a video format.

S4903: determining whether the conversion of the cached data is completed. If so, the flow goes to S4904 for modifying a time-shifted state of the interface from the application to a recording state; if not, the flow goes to S4905 for detecting whether the conversion of the cached data has timed out.

S4904: modifying a time-shift state of the interface from the application to a recording state.

When the time-shift state of the application changes to the recording state, a recording identifier can be presented on an interface from the application, so that the user can know that the recorded video has been generated and can be watched at any time.

S4905: detecting whether a conversion of the cached data has timed out. If so, S4906 is performed to stop the conversion operation of the recorded video; if not, S4903 of determining whether the conversion of the cached data is completed continues to be performed.

S4906: stopping the conversion of the cache data.

Through the above method, the recorded video can be controlled to be stored and converted, providing convenience for the user to watch the recorded video; and the cached data can be flexibly stored according to the running condition of the display apparatus and the user's operational requirements. For example, if the user has not triggered the video viewing operation within the preset time period after the cached data is generated, it indicates that the user may not have the need to watch the recorded video corresponding to the cached data, so the cached data can be deleted after the preset time period is reached, to save the storage space.

According to the display control method discussed in the above embodiments, the display apparatus can turn on the first time-shift function of the display apparatus and record the content from the first channel in response to the first turning-on operation input from the user when displaying an interface from the first channel, and then in response to the first switching operation input from the user through the communicating device, control the display to display the interface(s) from the second application and record the content from the first channel based on the first switching operation when determining that the second application supports the background time-shift function. The user can switch applications according to his own requirements without interrupting the time-shift function of the application before switching, so the recording continuity of the content from the channel of the application before switching can be ensured. When the user switches back to the original application, the continuity of the viewed content can be ensured by viewing the recorded video, thus improving the user's viewing experience.

The embodiments of the disclosure also provide a computer-readable non-volatile storage medium storing executable instructions which, when executed on one or more processors, cause a display apparatus to perform the method described in any above-mentioned method embodiments.

For the convenience of explanation, the above descriptions have been made in combination with specific embodiments. However, the above exemplary discussions are not intended to be exhaustive or to limit implementations to the specific forms disclosed above. Numerous modifications and variations can be obtained in light of the above teachings. The above embodiments are chosen and described in order to better explain the principles and practical applications, to enable those skilled in the art to better utilize the described embodiments and various variant embodiments suitable for specific use considerations.

What is claimed is:

1. A display apparatus, comprising:
a display, configured to display an image and/or a user interface; and
at least one processor, configured to execute instructions to cause the display apparatus to:
in response to an instruction for adding a first scheduled recording task, add the first scheduled recording task to a scheduled recording task queue;
query first recording time information of the first scheduled recording task and second recording time information of each of one or more second scheduled recording tasks, wherein a first recording start time of the first scheduled recording task is adjacent to a second recording start time of each of the one or more second scheduled recording tasks in the scheduled recording task queue, the first recording time information comprises the first recording start time, first recording end time, first pre-recording time and first post-recording time, and the second recording time information comprises the second recording start time, second recording end time, second pre-recording time and second post-recording time, wherein the one or more second scheduled recording tasks are historical scheduled recording tasks in the scheduled recording task queue;

set task execution time and/or task completion time for the first scheduled recording task according to the first recording time information of the first scheduled recording task and the second recording time information of the one or more second scheduled recording tasks; and execute the first scheduled recording task according to the task execution time and/or the task completion time.

2. The display apparatus according to claim 1, wherein the at least one processor is further configured to execute the instructions to cause the display apparatus to:

obtain a quantity of tasks in the scheduled recording task queue;

in response to the quantity of tasks in the scheduled recording task queue being equal to 1, set the task execution time of the first scheduled recording task to the first pre-recording time of the first scheduled recording task, and set the task completion time of the first scheduled recording task to the first post-recording time of the first scheduled recording task; and in response to the quantity of tasks in the scheduled recording task queue being greater than 1, execute operations of querying the first recording time information of the first scheduled recording task and the second recording time information of the one or more second scheduled recording tasks.

3. The display apparatus according to claim 1, wherein the at least one processor is further configured to execute the instructions to cause the display apparatus to:

obtain a first conflict determination interval of the first scheduled recording task and a second conflict determination interval of each of the one or more second scheduled recording tasks in the scheduled recording task queue, wherein the first conflict determination interval is a time interval composed of the first recording start time and the first recording end time of the first scheduled recording task, and the second conflict determination interval is a time interval composed of the second recording start time and the second recording end time of the second scheduled recording task;

in response to determining that the first conflict determination interval overlaps with the second conflict determination interval of any one of the one or more second scheduled recording tasks, control the display to display conflict prompt information, wherein the conflict prompt information is used to prompt a user that a conflict is between the first scheduled recording task and the one or more second scheduled recording tasks in the scheduled recording task queue;

in response to determining that the first conflict determination interval does not overlap with the second conflict determination interval of each of the one or more second scheduled recording tasks, execute operations of setting the task execution time and/or the task completion time for the first scheduled recording task according to the first recording time information of the first scheduled recording task and the second recording time information of each of the one or more second scheduled recording tasks.

4. The display apparatus according to claim 3, wherein the at least one processor is further configured to execute the instructions to cause the display apparatus to:

generate a task adjustment interface according to the conflict prompt information;

control the display to display the task adjustment interface;

in response to a first adjustment command input by the user from the task adjustment interface, delete the second recording task that conflicts with the first scheduled recording task in the scheduled recording task queue; or in response to a second adjustment command input by the user from the task adjustment interface, delete the first scheduled recording task added currently in the scheduled recording task queue.

5. The display apparatus according to claim 4, wherein the at least one processor is further configured to execute the instructions to cause the display apparatus to:

in response to a third adjustment command input by the user from the task adjustment interface, modify recording start time and/or recording end time of a target scheduled recording task, wherein the target scheduled recording task is the first scheduled recording task added currently and/or the second scheduled recording task that conflicts with the first scheduled recording task in the scheduled recording task queue.

6. The display apparatus according to claim 1, wherein the at least one processor is further configured to execute the instructions to cause the display apparatus to:

compare the first recording end time of the first scheduled recording task with the second recording start time of the second scheduled recording task;

in response to determining that the first recording end time of the first scheduled recording task is same as the second recording start time of the second scheduled recording task, set task execution time of the second scheduled recording task to the second recording start time of the second scheduled recording task; or in response to determining that the first recording end time of the first scheduled recording task is earlier than the second recording start time of the second scheduled recording task, set the task completion time of the first scheduled recording task and task execution time of the second scheduled recording task according to the first post-recording time of the first scheduled recording task and the second recording start time of the second scheduled recording task.

7. The display apparatus according to claim 6, wherein the at least one processor is further configured to execute the instructions to cause the display apparatus to:

in response to determining that the first recording end time of the first scheduled recording task is earlier than the second recording start time of the second scheduled recording task, obtain an advance duration and a delay duration set uniformly by a user for scheduled recording tasks;

calculate the first pre-recording time based on the first recording start time and the advance duration, calculate the second pre-recording time based on the second recording start time and the advance duration, calculate the first post-recording time based on the first recording end time and the delay duration, and calculate the second post-recording time based on the second recording end time and the delay duration;

compare the first post-recording time of the first scheduled recording task with the second recording start time of the second scheduled recording task;

in response to determining that the first post-recording time of the first scheduled recording task is earlier than the second recording start time of the second scheduled recording task, set the task execution time of the second scheduled recording task according to the first post-recording time of the first scheduled recording task; and in response to determining that the first post-recording time of the first scheduled recording task is later than the second recording start time of the second scheduled recording task, set the task completion time of the first scheduled recording task to the second recording start time of the second scheduled recording task, and set the task execution time of the second scheduled recording task to the second recording start time of the second scheduled recording task.

8. The display apparatus according to claim 7, wherein the at least one processor is further configured to execute the instructions to cause the display apparatus to:

compare the first post-recording time of the first scheduled recording task with the second pre-recording time of the second scheduled recording task;

in response to determining that the first post-recording time of the first scheduled recording task is earlier than or equal to the second pre-recording time of the second scheduled recording task, set the task execution time of the second scheduled recording task to the second pre-recording time of the second scheduled recording task; and in response to determining that the first post-recording time of the first scheduled recording task is later than the second pre-recording time of the second scheduled recording task, set the task execution time of the second scheduled recording task to the first post-recording time of the first scheduled recording task.

9. The display apparatus according to claim 6, wherein the at least one processor is further configured to execute the instructions to cause the display apparatus to:

monitor task execution progress of the first scheduled recording task;

in response to determining that an end identifier of the first scheduled recording task is monitored before the task execution time of the second scheduled recording task, obtain the task completion time of the first scheduled recording task from the end identifier; and reset the task execution time of the second scheduled recording task according to the task completion time.

10. The display apparatus according to claim 1, wherein the user interface comprises a time point setting page that comprises a progress bar of a first video, and after executing the first scheduled recording task according to the task execution time and/or the task completion time to obtain a video, the at least one processor is further configured to execute the instructions to cause the display apparatus to:

in a first recording mode, in response to a time point request from a user, insert a time point in the first video, and display the time point on the progress bar;

in response to a cutting command from the user, cut a video clip from a second video according to a time point group when the second video contains a time point meeting a preset condition, wherein the second video is the first video to be cut, the time point group comprises two adjacent time points, and each time point group has no repeated time point; and in response to a splicing command from the user, splice a third video according to a specified order to obtain a spliced video, and display a splicing point on a progress bar of the spliced video, wherein the third video comprises video clips to be spliced, and the video clips to be spliced belong to a same first video or different first videos.

11. The display apparatus according to claim 10, wherein the time point setting page further comprises a recording interface of the first video or a playback interface of the first video, and in the first recording mode, the at least one processor is configured to execute the instructions to cause the display apparatus to:

obtain current playing progress of the first video in response to the time point request;

determine whether a time point has been set in the current playing progress;

in response to determining that a time point has been set, delete the set time point and not display a corresponding time point on the progress bar; and in response to determining that no time point is set, insert a time point into the current playing progress of the first video, and add and display the time point at a position corresponding to the current playing progress on the progress bar.

12. The display apparatus according to claim 1, wherein in a process of executing the first scheduled recording task according to the task execution time and/or the task completion time, the user interface comprises:

an interface from a first channel that is a channel corresponding to the first scheduled recording task; and the at least one processor is configured to execute the instructions to cause the display apparatus to:

display the interface from the first channel on the display, turn on a first time-shift function of the display apparatus and record content from the first channel in response to a first turning-on operation input from a user; and in response to a first switching operation input from the user and an second application supporting a background time-shift function, display an interface of the second application on the display and record content from the first channel based on the first switching operation;

wherein the first switching operation is used to switch from a first application to the second application, and the first application comprises the first channel.

13. The display apparatus according to claim 12, wherein the at least one processor is further configured to execute the instructions to cause the display apparatus to:

in response to determining that the second application does not support the background time-shift function, determine a time-shift state of the display apparatus before receiving the first switching operation input from the user, wherein the time-shift state comprises an implicit time-shift state and an explicit time-shifted state;

in response to determining that the display apparatus is in the implicit time-shift state before receiving the first switching operation input from the user, display the interface from the second application on the display, and stop recording content from the first channel; and in response to determining that the display apparatus is in the explicit time-shift state before receiving the first switching operation input from the user, display prompt information for stopping time shift on the display;

and, in response to an operation of confirming to stop time shift through the prompt information for stopping the time shift, display an interface from the second application on the display, and stop recording the content from the first channel.

14. A scheduled recording method, comprising:

in response to an instruction for adding a first scheduled recording task, adding the first scheduled recording task to a scheduled recording task queue;

querying first recording time information of the first scheduled recording task and second recording time information of each of one or more second scheduled recording tasks, wherein a first recording start time of the first scheduled recording task is adjacent to a second recording start time of each of the one or more second scheduled recording tasks in the scheduled recording task queue, the first recording time information comprises the first recording start time, first recording end time, first pre-recording time and first post-recording time, and the second recording time information comprises the second recording start time, second recording end time, second pre-recording time and second post-recording time, wherein the one or more second scheduled recording tasks are historical scheduled recording tasks in the scheduled recording task queue;

setting task execution time and/or task completion time for the first scheduled recording task according to the first recording time information of the first scheduled recording task and the second recording time information of the one or more second scheduled recording tasks; and executing the first scheduled recording task according to the task execution time and/or the task completion time.

15. The method according to claim 14, further comprising:

obtaining a quantity of tasks in the scheduled recording task queue;

in response to the quantity of tasks in the scheduled recording task queue being equal to 1, setting the task execution time of the first scheduled recording task to the first pre-recording time of the first scheduled recording task, and setting the task completion time of the first scheduled recording task to the first post-recording time of the first scheduled recording task; and in response to the quantity of tasks in the scheduled recording task queue being greater than 1, executing operations of querying the first recording time information of the first scheduled recording task and the second recording time information of the one or more second scheduled recording tasks.

16. The method according to claim 14, further comprising:

obtaining a first conflict determination interval of the first scheduled recording task and a second conflict determination interval of each of the one or more second scheduled recording tasks in the scheduled recording task queue, wherein the first conflict determination interval is a time interval composed of the first recording start time and the first recording end time of the first scheduled recording task, and the second conflict determination interval is a time interval composed of the second recording start time and the second recording end time of the second scheduled recording task;

in response to determining that the first conflict determination interval overlaps with the second conflict determination interval of any one of the one or more second scheduled recording tasks, controlling the display to display conflict prompt information, wherein the conflict prompt information is used to prompt a user that a conflict is between the first scheduled recording task and the one or more second scheduled recording tasks in the scheduled recording task queue;

in response to determining that the first conflict determination interval does not overlap with the second conflict determination interval of each of the one or more second scheduled recording tasks, executing operations of setting the task execution time and/or the task completion time for the first scheduled recording task according to the first recording time information of the first scheduled recording task and the second recording time information of each of the one or more second scheduled recording tasks.

17. The method according to claim 16, further comprising:

generating a task adjustment interface according to the conflict prompt information;

controlling the display to display the task adjustment interface;

in response to a first adjustment command input by the user from the task adjustment interface, deleting the second recording task that conflicts with the first scheduled recording task in the scheduled recording task queue; or in response to a second adjustment command input by the user from the task adjustment interface, deleting the first scheduled recording task added currently in the scheduled recording task queue.

18. The method according to claim 17, further comprising:

in response to a third adjustment command input by the user from the task adjustment interface, modifying recording start time and/or recording end time of a target scheduled recording task, wherein the target scheduled recording task is the first scheduled recording task added currently and/or the second scheduled recording task that conflicts with the first scheduled recording task in the scheduled recording task queue.

19. The method according to claim 14, further comprising:

comparing the first recording end time of the first scheduled recording task with the second recording start time of the second scheduled recording task;

in response to determining that the first recording end time of the first scheduled recording task is same as the second recording start time of the second scheduled recording task, setting task execution time of the second scheduled recording task to the second recording start time of the second scheduled recording task; or in response to determining that the first recording end time of the first scheduled recording task is earlier than the second recording start time of the second scheduled recording task, setting the task completion time of the first scheduled recording task and task execution time of the second scheduled recording task according to the first post-recording time of the first scheduled recording task and the second recording start time of the second scheduled recording task.

20. The method according to claim 19, further comprising:

in response to determining that the first recording end time of the first scheduled recording task is earlier than the second recording start time of the second scheduled recording task, obtaining an advance duration and a delay duration set uniformly by a user for scheduled recording tasks;

calculating the first pre-recording time based on the first recording start time and the advance duration, calculating the second pre-recording time based on the second recording start time and the advance duration, calculating the first post-recording time based on the first recording end time and the delay duration, and calculating the second post-recording time based on the second recording end time and the delay duration;

comparing the first post-recording time of the first scheduled recording task with the second recording start time of the second scheduled recording task;

in response to determining that the first post-recording time of the first scheduled recording task is earlier than the second recording start time of the second scheduled recording task, setting the task execution time of the second scheduled recording task according to the first post-recording time of the first scheduled recording task; and in response to determining that the first post-recording time of the first scheduled recording task is later than the second recording start time of the second scheduled recording task, setting the task completion time of the first scheduled recording task to the second recording start time of the second scheduled recording task, and setting the task execution time of the second scheduled recording task to the second recording start time of the second scheduled recording task.

\* \* \* \* \*